(12) United States Patent
Sollie et al.

(10) Patent No.: US 11,479,403 B2
(45) Date of Patent: Oct. 25, 2022

(54) INSULATED BOX ASSEMBLY AND TEMPERATURE-REGULATING LID THEREFOR

(71) Applicant: Pratt Retail Specialties, LLC, Brookhaven, GA (US)

(72) Inventors: Greg Sollie, Sharpsburg, GA (US); Jamie Waltermire, Peachtree City, GA (US); Shifeng Chen, Newport News, VA (US)

(73) Assignee: Pratt Retail Specialties, LLC, Brookhaven, GA (US)

( * ) Notice: Subject to any disclaimer, the term of this patent is extended or adjusted under 35 U.S.C. 154(b) by 0 days.

(21) Appl. No.: 17/185,616

(22) Filed: Feb. 25, 2021

(65) Prior Publication Data

US 2021/0179337 A1 Jun. 17, 2021

Related U.S. Application Data

(63) Continuation of application No. 16/408,981, filed on May 10, 2019, now Pat. No. 11,066,228.
(Continued)

(51) Int. Cl.
*B65D 81/38* (2006.01)
*B65D 81/18* (2006.01)
(Continued)

(52) U.S. Cl.
CPC ............ *B65D 81/3823* (2013.01); *B65B 5/06* (2013.01); *B65D 5/321* (2013.01); *B65D 5/64* (2013.01);
(Continued)

(58) Field of Classification Search
CPC ............ B65D 81/3858; B65D 81/3848; B65D 81/386; B65D 81/3823; B65D 81/3897;
(Continued)

(56) References Cited

U.S. PATENT DOCUMENTS

| 265,985 A | 10/1882 | Seabury |
| 1,061,531 A | 5/1913 | Emmons |

(Continued)

FOREIGN PATENT DOCUMENTS

| CA | 2019104 | 12/1991 |
| CA | 2145953 | 10/1996 |

(Continued)

OTHER PUBLICATIONS

US 10,562,676 B2, 02/2020, Waltermire et al. (withdrawn)
(Continued)

*Primary Examiner* — Nathan J Newhouse
*Assistant Examiner* — Phillip D Schmidt
(74) *Attorney, Agent, or Firm* — Taylor English Duma LLP

(57) ABSTRACT

Example aspects of an insulated box assembly and a method of assembling an insulated box assembly are disclosed. The insulated box assembly can comprise a plurality of outer lateral sidewalls, the outer lateral sidewalls defining an inner surface, the inner surface defining an inner cavity; a plurality of inner lateral sidewalls received in the inner cavity, the inner lateral sidewalls defining an outer surface; and a monolithic sidewall liner received in the inner cavity between the outer lateral sidewalls and the inner lateral sidewalls, the sidewall liner defining a liner outer surface and a continuous, uninterrupted liner inner surface opposite the liner outer surface, the liner outer surface facing the inner surface of the outer lateral sidewalls, and the liner inner surface facing the outer surface of the inner lateral sidewalls.

22 Claims, 36 Drawing Sheets

Related U.S. Application Data

(60) Provisional application No. 62/760,614, filed on Nov. 13, 2018, provisional application No. 62/802,480, filed on Feb. 7, 2019.

(51) Int. Cl.
*B65B 5/06* (2006.01)
*F25D 3/14* (2006.01)
*B65D 5/64* (2006.01)
*B65D 5/32* (2006.01)

(52) U.S. Cl.
CPC ......... *B65D 81/18* (2013.01); *B65D 81/3858* (2013.01); *F25D 3/14* (2013.01)

(58) Field of Classification Search
CPC .. B65D 81/38; B65D 81/3834; B65D 81/361; F25D 2303/0844; F25D 3/14; B31B 2120/40; B31B 2120/402; B31B 2120/4045; B31B 2120/406; B31B 2120/407; B31B 2120/408; B31B 2120/50
USPC .... 229/103.11, 120.01, 120.37, 120.38, 901, 229/117.27, 117.28, 122.32, 5.84, 229/195–197
See application file for complete search history.

(56) References Cited

U.S. PATENT DOCUMENTS

| | | |
|---|---|---|
| 1,150,105 A | 8/1915 | Emmons |
| 1,527,167 A | 2/1925 | Birdseye |
| 1,677,565 A | 7/1928 | Oppenheim |
| 1,682,410 A | 8/1928 | Oppenheim |
| 1,747,980 A | 2/1930 | Kondolf |
| 1,753,813 A | 4/1930 | Washburn |
| 1,868,996 A | 7/1932 | Sharp |
| 1,896,393 A | 2/1933 | Devine |
| 1,899,892 A | 2/1933 | D'Este et al. |
| 1,930,680 A | 10/1933 | Hinton |
| 1,935,923 A | 11/1933 | Thoke |
| 1,937,263 A | 11/1933 | Bubb |
| 1,942,917 A | 1/1934 | D'Este et al. |
| 1,954,013 A | 4/1934 | Lilienfield |
| 2,018,519 A | 10/1935 | Hall |
| 2,070,747 A | 2/1937 | Ostrom |
| 2,116,513 A | 5/1938 | Frankenstein |
| 2,148,454 A | 2/1939 | Gerard |
| 2,165,327 A | 7/1939 | Zalkind |
| 2,289,060 A | 7/1942 | Merkle |
| 2,293,361 A | 8/1942 | Roberts |
| 2,360,806 A | 10/1944 | Van Rosen |
| 2,386,905 A | 10/1945 | Meitzen |
| 2,389,601 A | 11/1945 | De Witt |
| 2,485,643 A | 10/1949 | Norquist |
| 2,554,004 A | 5/1951 | Bergstein |
| 2,632,311 A | 3/1953 | Sullivan |
| 2,650,016 A | 8/1953 | McMillan |
| 2,753,102 A | 7/1956 | Paige |
| 2,867,035 A | 1/1959 | Patterson, Jr. |
| 2,899,103 A | 8/1959 | Ebert |
| 2,927,720 A | 3/1960 | Adams |
| 2,986,324 A | 5/1961 | Anderson, Jr. |
| 2,987,239 A | 6/1961 | Atwood |
| 3,003,680 A | 10/1961 | Wilcox, Jr. et al. |
| 3,029,008 A | 4/1962 | Membrino |
| 3,031,121 A | 4/1962 | Chase |
| 3,065,895 A | 11/1962 | Lipschutz |
| 3,096,879 A | 7/1963 | Schumacher |
| 3,097,782 A | 7/1963 | Koropatkin et al. |
| 3,182,913 A | 5/1965 | Brian |
| 3,193,176 A | 7/1965 | Gullickson et al. |
| 3,194,471 A | 7/1965 | Murphy |
| 3,206,103 A | 9/1965 | Bixler |
| 3,222,843 A | 12/1965 | Schneider |
| 3,236,206 A | 2/1966 | Willinger |
| 3,282,411 A | 11/1966 | Jardine |
| 3,286,825 A | 11/1966 | Laas |
| 3,335,941 A | 8/1967 | Gatward |
| 3,371,462 A | 3/1968 | Nordkvist et al. |
| 3,375,934 A | 4/1968 | Bates |
| 3,399,818 A | 9/1968 | Stegner |
| 3,420,363 A | 1/1969 | Blickensderfer |
| 3,435,736 A | 4/1969 | Reiche |
| 3,465,948 A | 9/1969 | Boyer |
| 3,503,550 A | 3/1970 | Main et al. |
| 3,551,945 A | 1/1971 | Eyberg et al. |
| 3,670,948 A | 6/1972 | Berg |
| 3,703,383 A | 11/1972 | Kuchenbecker |
| 3,734,336 A | 5/1973 | Rankow et al. |
| 3,747,743 A | 7/1973 | Hoffman, Jr. |
| 3,749,299 A | 7/1973 | Ingle |
| 3,836,044 A | 9/1974 | Tilp et al. |
| 3,843,038 A | 10/1974 | Sax |
| 3,880,341 A | 4/1975 | Bamburg et al. |
| 3,887,743 A | 6/1975 | Lane |
| 3,890,762 A | 6/1975 | Ernst et al. |
| 3,945,561 A | 3/1976 | Strebelle |
| 3,980,005 A | 9/1976 | Buonaiuto |
| 4,030,227 A | 6/1977 | Oftedahl |
| 4,050,264 A | 9/1977 | Tanaka |
| 4,068,779 A | 1/1978 | Canfield |
| 4,091,852 A | 5/1978 | Jordan et al. |
| 4,169,540 A | 10/1979 | Larsson et al. |
| 4,170,304 A | 10/1979 | Huke |
| 4,211,267 A | 7/1980 | Skovgaard |
| 4,213,310 A | 7/1980 | Buss |
| 4,335,844 A | 6/1982 | Egli |
| 4,342,416 A | 8/1982 | Philips |
| 4,380,314 A | 4/1983 | Langston, Jr. et al. |
| D270,041 S | 8/1983 | Vestal |
| 4,396,144 A | 8/1983 | Gutierrez et al. |
| 4,418,864 A | 12/1983 | Neilsen |
| 4,488,623 A | 12/1984 | Linnell, II et al. |
| 4,509,645 A | 4/1985 | Hotta |
| 4,679,242 A | 7/1987 | Brockhaus |
| 4,682,708 A | 7/1987 | Pool |
| 4,711,390 A | 12/1987 | Andrews et al. |
| 4,797,010 A | 1/1989 | Coelho |
| 4,819,793 A | 4/1989 | Willard et al. |
| 4,828,133 A | 5/1989 | Hougendobler |
| 4,830,282 A | 5/1989 | Knight, Jr. |
| 4,889,252 A | 12/1989 | Rockom et al. |
| 4,930,903 A | 6/1990 | Mahoney |
| 4,989,780 A | 2/1991 | Foote et al. |
| 5,016,813 A | 5/1991 | Simons |
| 5,020,481 A | 6/1991 | Nelson |
| 5,062,527 A | 11/1991 | Westerman |
| 5,094,547 A | 3/1992 | Graham |
| 5,102,004 A | 4/1992 | Hollander et al. |
| 5,154,309 A | 10/1992 | Wischusen, III et al. |
| 5,158,371 A | 10/1992 | Moravek |
| 5,165,583 A | 11/1992 | Kouwenberg |
| 5,185,904 A | 2/1993 | Rogers et al. |
| 5,226,542 A | 7/1993 | Boecker et al. |
| 5,230,450 A | 7/1993 | Mahvi et al. |
| 5,263,339 A | 11/1993 | Evans |
| 5,358,757 A | 10/1994 | Robinette et al. |
| 5,372,429 A | 12/1994 | Beaver, Jr. et al. |
| 5,417,342 A | 5/1995 | Hutchison |
| 5,418,031 A | 5/1995 | English |
| 5,441,170 A | 8/1995 | Bane, III |
| 5,454,471 A | 10/1995 | Norvell |
| 5,491,186 A | 2/1996 | Kean et al. |
| 5,493,874 A | 2/1996 | Landgrebe |
| 5,499,473 A | 3/1996 | Ramberg |
| 5,505,810 A | 4/1996 | Kirby et al. |
| 5,507,429 A | 4/1996 | Arlin |
| 5,511,667 A | 4/1996 | Carder |
| 5,512,345 A | 4/1996 | Tsutsumi et al. |
| 5,516,580 A | 5/1996 | Frenette et al. |
| 5,562,228 A | 10/1996 | Ericson |
| 5,573,119 A | 11/1996 | Luray |

(56) References Cited

U.S. PATENT DOCUMENTS

| | | |
|---|---|---|
| 5,596,880 A | 1/1997 | Welker et al. |
| 5,601,232 A | 2/1997 | Greenlee |
| 5,613,610 A | 3/1997 | Bradford |
| 5,615,795 A | 4/1997 | Tipps |
| 5,638,978 A | 6/1997 | Cadiente |
| 5,775,576 A | 7/1998 | Stone |
| 5,842,571 A | 12/1998 | Rausch |
| 5,906,290 A | 5/1999 | Haberkorn |
| 5,996,366 A | 12/1999 | Renard |
| 6,003,719 A | 12/1999 | Steward, III |
| D421,457 S | 3/2000 | Crofton |
| 6,041,958 A | 3/2000 | Tremelo |
| 6,048,099 A | 4/2000 | Muffett et al. |
| 6,050,410 A | 4/2000 | Quirion |
| 6,050,412 A | 4/2000 | Clough et al. |
| 6,138,902 A | 10/2000 | Welch |
| 6,164,526 A | 12/2000 | Dalvey |
| 6,168,040 B1 | 1/2001 | Sautner et al. |
| 6,220,473 B1 | 4/2001 | Lehman et al. |
| 6,223,551 B1 | 5/2001 | Mitchell |
| 6,238,091 B1 | 5/2001 | Mogil |
| 6,244,458 B1 | 6/2001 | Frysinger et al. |
| 6,247,328 B1 | 6/2001 | Mogil |
| 6,295,830 B1 | 10/2001 | Newman |
| 6,295,860 B1 | 10/2001 | Sakairi et al. |
| 6,296,134 B1 * | 10/2001 | Cardinale ............ B65D 5/3607 220/495.05 |
| 6,308,850 B1 | 10/2001 | Coom et al. |
| 6,325,281 B1 | 12/2001 | Grogan |
| 6,364,199 B1 | 4/2002 | Rose |
| 6,443,309 B1 | 9/2002 | Becker |
| 6,453,682 B1 | 9/2002 | Jennings et al. |
| 6,478,268 B1 | 11/2002 | Bidwell et al. |
| 6,510,705 B1 | 1/2003 | Jackson |
| 6,582,124 B2 | 6/2003 | Mogil |
| 6,618,868 B2 | 9/2003 | Minnick |
| 6,688,133 B1 | 2/2004 | Donefrio |
| 6,725,783 B2 | 4/2004 | Sekino |
| 6,726,017 B2 | 4/2004 | Maresh et al. |
| 6,736,309 B1 | 5/2004 | Westerman et al. |
| 6,771,183 B2 | 8/2004 | Hunter |
| 6,821,019 B2 | 11/2004 | Mogil |
| 6,837,420 B2 | 1/2005 | Westerman et al. |
| 6,868,982 B2 | 3/2005 | Gordon |
| 6,875,486 B2 | 4/2005 | Miller |
| 6,899,229 B2 | 5/2005 | Dennison et al. |
| 6,910,582 B2 | 6/2005 | Lantz |
| 6,913,389 B2 | 7/2005 | Kannankeril et al. |
| 6,971,539 B1 | 12/2005 | Abbe |
| 7,000,962 B2 | 2/2006 | Le |
| 7,019,271 B2 | 3/2006 | Wnek et al. |
| 7,070,841 B2 | 7/2006 | Benim et al. |
| 7,094,192 B2 | 8/2006 | Schoenberger et al. |
| 7,140,773 B2 | 11/2006 | Becker et al. |
| D534,797 S | 1/2007 | El-Afandi |
| D545,189 S | 6/2007 | El-Afandi |
| 7,225,632 B2 | 6/2007 | Derifield |
| 7,225,970 B2 | 6/2007 | Philips |
| 7,229,677 B2 | 6/2007 | Miller |
| D546,679 S | 7/2007 | El-Afandi |
| 7,264,147 B1 | 9/2007 | Benson et al. |
| 7,270,358 B2 | 9/2007 | Hirsch |
| 7,392,931 B2 | 7/2008 | Issler |
| 7,452,316 B2 | 11/2008 | Cals et al. |
| D582,676 S | 12/2008 | Rothschild |
| 7,484,623 B2 | 2/2009 | Goodrich |
| 7,597,209 B2 | 10/2009 | Rothschild et al. |
| 7,607,563 B2 | 10/2009 | Hanna et al. |
| 7,677,406 B2 | 3/2010 | Maxson |
| 7,681,405 B2 | 3/2010 | Williams |
| 7,784,301 B2 | 8/2010 | Sasaki et al. |
| 7,807,773 B2 | 10/2010 | Matsuoka et al. |
| 7,841,512 B2 | 11/2010 | Westerman et al. |
| 7,845,508 B2 | 12/2010 | Rothschild et al. |
| 7,870,992 B2 | 1/2011 | Schille et al. |
| 7,909,806 B2 | 3/2011 | Goodman et al. |
| 7,971,720 B2 | 7/2011 | Minkler |
| 8,118,177 B2 | 2/2012 | Drapela et al. |
| 8,209,995 B2 | 7/2012 | Kieling et al. |
| 8,210,353 B2 | 7/2012 | Epicureo |
| 8,343,024 B1 | 1/2013 | Contanzo, Jr. et al. |
| 8,365,943 B2 | 2/2013 | Bentley |
| 8,465,404 B2 | 6/2013 | Hadley |
| 8,567,662 B2 | 10/2013 | Costanzo, Jr. |
| 8,579,183 B2 | 11/2013 | Belfort et al. |
| 8,596,520 B2 | 12/2013 | Scott |
| 8,613,202 B2 | 12/2013 | Williams |
| 8,651,593 B2 | 2/2014 | Bezich et al. |
| 8,763,811 B2 | 7/2014 | Lantz |
| 8,763,886 B2 | 7/2014 | Hall |
| D710,692 S | 8/2014 | Genender |
| 8,795,470 B2 | 8/2014 | Henderson et al. |
| 8,875,983 B2 | 11/2014 | Lenhard et al. |
| 8,919,082 B1 | 12/2014 | Cataldo |
| 8,960,528 B2 | 2/2015 | Sadlier |
| 9,272,475 B2 | 3/2016 | Ranade et al. |
| 9,290,313 B2 | 3/2016 | De Lesseux et al. |
| 9,322,136 B2 | 4/2016 | Ostendorf et al. |
| D758,182 S | 6/2016 | Sponselee |
| 9,394,633 B2 | 7/2016 | Shimotsu et al. |
| D764,903 S | 8/2016 | Sanfilippo et al. |
| 9,408,445 B2 | 8/2016 | Mogil et al. |
| 9,429,350 B2 | 8/2016 | Chapman, Jr. |
| 9,499,294 B1 | 11/2016 | Contanzo, Jr. |
| 9,550,618 B1 * | 1/2017 | Jobe ........................ B65D 5/64 |
| 9,605,382 B2 | 3/2017 | Virtanen |
| 9,611,067 B2 | 4/2017 | Collison |
| 9,635,916 B2 | 5/2017 | Bezich et al. |
| 9,701,437 B2 | 7/2017 | Bugas et al. |
| 9,738,420 B2 | 8/2017 | Miller |
| 9,738,432 B1 | 8/2017 | Petrucci et al. |
| 9,834,366 B2 | 12/2017 | Giuliani |
| 9,908,680 B2 | 3/2018 | Shi et al. |
| 9,908,684 B2 | 3/2018 | Collison |
| 9,920,517 B2 | 3/2018 | Sollie et al. |
| 9,950,830 B2 | 4/2018 | De Lesseux et al. |
| 9,981,797 B2 | 5/2018 | Aksan et al. |
| 10,046,901 B1 | 8/2018 | Jobe |
| 10,094,126 B2 | 10/2018 | Collison et al. |
| 10,112,756 B2 | 10/2018 | Menzel, Jr. |
| 10,226,909 B2 | 3/2019 | Frem et al. |
| 10,266,332 B2 | 4/2019 | Aksan et al. |
| 10,273,073 B2 | 4/2019 | Collison |
| 10,357,936 B1 | 7/2019 | Vincent et al. |
| 10,435,194 B2 | 10/2019 | Sollie et al. |
| 10,442,600 B2 | 10/2019 | Waltermire et al. |
| 10,507,968 B2 | 12/2019 | Sollie et al. |
| 10,551,110 B2 | 2/2020 | Waltermire et al. |
| 10,583,977 B2 | 3/2020 | Collison et al. |
| 10,604,304 B2 | 3/2020 | Waltermire et al. |
| D881,690 S | 4/2020 | Smalley |
| 10,661,941 B2 | 5/2020 | Genender et al. |
| 10,800,595 B2 | 10/2020 | Waltermire et al. |
| 10,843,840 B2 | 11/2020 | Sollie et al. |
| 10,858,141 B2 | 12/2020 | Sollie et al. |
| 10,882,681 B2 | 1/2021 | Waltermire et al. |
| 10,882,682 B2 | 1/2021 | Collison et al. |
| 10,882,683 B2 | 1/2021 | Collison et al. |
| 10,882,684 B2 | 1/2021 | Sollie et al. |
| 10,926,939 B2 | 2/2021 | Collison et al. |
| 10,941,977 B2 | 3/2021 | Waltermire et al. |
| 10,947,025 B2 | 3/2021 | Sollie et al. |
| 10,954,057 B2 | 3/2021 | Waltermire et al. |
| 10,954,058 B2 | 3/2021 | Sollie et al. |
| 11,027,875 B2 | 6/2021 | Sollie et al. |
| 11,059,652 B2 | 7/2021 | Sollie et al. |
| 11,066,228 B2 | 7/2021 | Sollie et al. |
| 11,117,731 B2 | 9/2021 | Waltermire et al. |
| 11,124,354 B2 | 9/2021 | Waltermire et al. |
| D934,064 S | 10/2021 | Satnick |
| 11,137,198 B2 | 10/2021 | Waltermire et al. |
| 11,148,870 B2 | 10/2021 | Collison et al. |
| 11,203,458 B2 | 12/2021 | Sollie et al. |
| 11,214,427 B2 | 1/2022 | Collison et al. |

(56) References Cited

U.S. PATENT DOCUMENTS

| | | |
|---|---|---|
| 11,215,393 B2 | 1/2022 | Waltermire et al. |
| 11,230,404 B2 | 1/2022 | Sollie et al. |
| 11,247,806 B2 | 2/2022 | Sollie et al. |
| 11,255,596 B2 | 2/2022 | Waltermire et al. |
| 11,261,017 B2 | 3/2022 | Waltermire et al. |
| 11,267,641 B2 | 3/2022 | Collison et al. |
| 11,286,099 B2 | 3/2022 | Sollie et al. |
| 11,325,772 B2 | 5/2022 | Sollie et al. |
| 2001/0010312 A1 | 8/2001 | Mogil |
| 2002/0020188 A1 | 2/2002 | Sharon et al. |
| 2002/0064318 A1 | 5/2002 | Malone et al. |
| 2002/0162767 A1 | 11/2002 | Ohtsubo |
| 2003/0145561 A1 | 8/2003 | Cals et al. |
| 2004/0004111 A1 | 1/2004 | Cardinale |
| 2004/0031842 A1 | 2/2004 | Westerman et al. |
| 2004/0079794 A1 | 4/2004 | Mayer |
| 2005/0109655 A1 | 5/2005 | Vershum et al. |
| 2005/0117817 A1 | 6/2005 | Mogil et al. |
| 2005/0189404 A1 | 9/2005 | Xiaohai et al. |
| 2005/0214512 A1 | 9/2005 | Fascio |
| 2005/0224501 A1 | 10/2005 | Folkert et al. |
| 2005/0279963 A1 | 12/2005 | Church et al. |
| 2006/0053828 A1 | 3/2006 | Shallman et al. |
| 2006/0078720 A1 | 4/2006 | Toas et al. |
| 2006/0096978 A1 | 5/2006 | Lafferty et al. |
| 2006/0193541 A1 | 8/2006 | Norcom |
| 2006/0243784 A1 | 11/2006 | Glaser et al. |
| 2007/0000932 A1 | 1/2007 | Cron et al. |
| 2007/0000983 A1 | 1/2007 | Spurrell et al. |
| 2007/0051782 A1 | 3/2007 | Lantz |
| 2007/0193298 A1 | 8/2007 | Derifield |
| 2007/0209307 A1 | 9/2007 | Andersen |
| 2007/0257040 A1 | 11/2007 | Price et al. |
| 2008/0095959 A1 | 4/2008 | Warner et al. |
| 2008/0135564 A1 | 6/2008 | Romero |
| 2008/0148245 A1 | 6/2008 | Gutz |
| 2008/0173703 A1 | 7/2008 | Westerman et al. |
| 2008/0190940 A1 | 8/2008 | Scott |
| 2008/0203090 A1 | 8/2008 | Dickinson |
| 2008/0289302 A1 | 11/2008 | Vulpitta |
| 2008/0296356 A1 | 12/2008 | Hatcher et al. |
| 2008/0308616 A1 | 12/2008 | Phung |
| 2008/0314794 A1 | 12/2008 | Bowman |
| 2009/0034883 A1 | 2/2009 | Giuliani |
| 2009/0114311 A1 | 5/2009 | McDowell |
| 2009/0193765 A1 | 8/2009 | Lantz |
| 2009/0214142 A1 | 8/2009 | Bossel et al. |
| 2009/0283578 A1 | 11/2009 | Miller |
| 2009/0288791 A1 | 11/2009 | Hammer et al. |
| 2010/0001056 A1 | 1/2010 | Chandaria |
| 2010/0006630 A1 | 1/2010 | Humphries et al. |
| 2010/0062921 A1 | 3/2010 | Veiseh |
| 2010/0072105 A1 | 3/2010 | Glaser et al. |
| 2010/0139878 A1 | 6/2010 | Clemente |
| 2010/0151164 A1 | 6/2010 | Grant et al. |
| 2010/0219232 A1 | 9/2010 | Smith |
| 2010/0258574 A1 | 10/2010 | Bentley |
| 2010/0270317 A1 | 10/2010 | Kieling et al. |
| 2010/0282827 A1 | 11/2010 | Padovani |
| 2010/0284634 A1 | 11/2010 | Hadley |
| 2010/0314397 A1 | 12/2010 | Williams et al. |
| 2010/0314437 A1 | 12/2010 | Dowd |
| 2011/0042449 A1* | 2/2011 | Copenhaver .......... B65D 81/382 229/103.11 |
| 2011/0100868 A1 | 5/2011 | Lantz |
| 2011/0114513 A1 | 5/2011 | Miller |
| 2011/0235950 A1 | 9/2011 | Lin |
| 2011/0284556 A1 | 11/2011 | Palmer et al. |
| 2011/0311758 A1 | 12/2011 | Burns et al. |
| 2011/0317944 A1 | 12/2011 | Liu |
| 2012/0031957 A1 | 2/2012 | Whitaker |
| 2012/0074823 A1 | 3/2012 | Bezich et al. |
| 2012/0145568 A1 | 6/2012 | Collison et al. |
| 2012/0243808 A1 | 9/2012 | De Lesseux et al. |
| 2012/0248101 A1 | 10/2012 | Tumber et al. |
| 2012/0251818 A1 | 10/2012 | Axrup et al. |
| 2012/0279896 A1 | 11/2012 | Lantz |
| 2013/0026215 A1 | 1/2013 | Lenhard et al. |
| 2013/0112694 A1* | 5/2013 | Bentley .............. B65D 81/3823 220/592.2 |
| 2013/0112695 A1 | 5/2013 | Hall |
| 2013/0140317 A1 | 6/2013 | Roskoss |
| 2014/0000306 A1* | 1/2014 | Chapman, Jr. ............ F25D 3/00 62/440 |
| 2014/0021208 A1 | 1/2014 | Anti et al. |
| 2014/0093697 A1 | 4/2014 | Perry et al. |
| 2014/0248003 A1 | 9/2014 | Mogil et al. |
| 2014/0300026 A1 | 10/2014 | Taccolini |
| 2014/0319018 A1 | 10/2014 | Collison |
| 2014/0367393 A1 | 12/2014 | Ranade |
| 2015/0110423 A1 | 4/2015 | Fox et al. |
| 2015/0111011 A1 | 4/2015 | Hoekstra et al. |
| 2015/0166244 A1 | 6/2015 | Wood et al. |
| 2015/0175338 A1 | 6/2015 | Culp et al. |
| 2015/0238033 A1 | 8/2015 | Zavitsanos |
| 2015/0239639 A1 | 8/2015 | Wenner et al. |
| 2015/0255009 A1 | 9/2015 | Akhter et al. |
| 2015/0259126 A1 | 9/2015 | McGoff et al. |
| 2015/0284131 A1 | 10/2015 | Genender et al. |
| 2015/0345853 A1 | 12/2015 | Oeyen |
| 2016/0015039 A1 | 1/2016 | Pierce |
| 2016/0052696 A1 | 2/2016 | Cook et al. |
| 2016/0060017 A1 | 3/2016 | De Lesseux et al. |
| 2016/0264294 A1 | 9/2016 | Bacon |
| 2016/0304267 A1* | 10/2016 | Aksan ................ B65D 5/46096 |
| 2016/0318648 A1 | 11/2016 | Kuninobu |
| 2016/0325915 A1 | 11/2016 | Aksan |
| 2017/0015080 A1 | 1/2017 | Collison et al. |
| 2017/0021961 A1 | 1/2017 | Humphrey et al. |
| 2017/0043937 A1 | 2/2017 | Lantz |
| 2017/0121052 A1 | 5/2017 | Morimoto |
| 2017/0144792 A1 | 5/2017 | Block |
| 2017/0198959 A1 | 7/2017 | Morris |
| 2017/0225870 A1 | 8/2017 | Collison |
| 2017/0233134 A9 | 8/2017 | Grajales et al. |
| 2017/0233165 A1 | 8/2017 | Kuhn |
| 2017/0283157 A1 | 10/2017 | Jobe |
| 2017/0305639 A1 | 10/2017 | Kuhn et al. |
| 2017/0320653 A1 | 11/2017 | Mogil et al. |
| 2017/0334622 A1 | 11/2017 | Menzel, Jr. |
| 2017/0341847 A1 | 11/2017 | Chase et al. |
| 2017/0361973 A1 | 12/2017 | Padilla |
| 2017/0369226 A1 | 12/2017 | Chase et al. |
| 2018/0050857 A1 | 2/2018 | Collison |
| 2018/0051460 A1 | 2/2018 | Sollie et al. |
| 2018/0148245 A1 | 5/2018 | Aggarwal et al. |
| 2018/0148246 A1 | 5/2018 | Fu et al. |
| 2018/0194534 A1 | 7/2018 | Jobe |
| 2018/0215525 A1 | 8/2018 | Vogel et al. |
| 2018/0229917 A1 | 8/2018 | Jobe |
| 2018/0237207 A1 | 8/2018 | Aksan et al. |
| 2018/0274837 A1 | 9/2018 | Christensen |
| 2018/0290813 A1 | 10/2018 | Waltermire et al. |
| 2018/0290815 A1 | 10/2018 | Waltermire et al. |
| 2018/0299059 A1 | 10/2018 | McGoff et al. |
| 2018/0319569 A1 | 11/2018 | McGoff et al. |
| 2018/0327171 A1 | 11/2018 | Waltermire et al. |
| 2018/0327172 A1 | 11/2018 | Waltermire et al. |
| 2018/0334308 A1 | 11/2018 | Moore et al. |
| 2018/0335241 A1 | 11/2018 | Li et al. |
| 2019/0009946 A1 | 1/2019 | Nixon et al. |
| 2019/0032991 A1 | 1/2019 | Waltermire et al. |
| 2019/0047775 A1 | 2/2019 | Waltermire et al. |
| 2019/0144155 A1 | 5/2019 | Geng et al. |
| 2019/0185246 A1 | 6/2019 | Sollie et al. |
| 2019/0185247 A1 | 6/2019 | Sollie et al. |
| 2019/0193916 A1 | 6/2019 | Waltermire et al. |
| 2019/0210790 A1* | 7/2019 | Rizzo .................. B65D 81/383 |
| 2019/0234679 A1 | 8/2019 | Waltermire et al. |
| 2019/0248573 A1 | 8/2019 | Collison et al. |
| 2019/0270572 A1 | 9/2019 | Collison et al. |
| 2019/0270573 A1 | 9/2019 | Collison et al. |
| 2019/0352075 A1 | 11/2019 | Waltermire et al. |
| 2019/0352076 A1 | 11/2019 | Waltermire et al. |

(56) References Cited

U.S. PATENT DOCUMENTS

| | | |
|---|---|---|
| 2019/0352080 A1 | 11/2019 | Waltermire et al. |
| 2019/0359412 A1 | 11/2019 | Sollie et al. |
| 2019/0359413 A1 | 11/2019 | Sollie et al. |
| 2019/0359414 A1 | 11/2019 | Sollie et al. |
| 2019/0367209 A1 | 12/2019 | Jobe |
| 2019/0376636 A1 | 12/2019 | Fellinger et al. |
| 2019/0382186 A1 | 12/2019 | Sollie et al. |
| 2019/0390892 A1 | 12/2019 | Waltermire et al. |
| 2020/0071056 A1 | 3/2020 | Henderson et al. |
| 2020/0088458 A1 | 3/2020 | Waltermire et al. |
| 2020/0103159 A1 | 4/2020 | Waltermire et al. |
| 2020/0122896 A1 | 4/2020 | Waltermire et al. |
| 2020/0148409 A1 | 5/2020 | Sollie et al. |
| 2020/0148410 A1 | 5/2020 | Sollie et al. |
| 2020/0148453 A1 | 5/2020 | Sollie et al. |
| 2020/0283188 A1 | 9/2020 | Sollie et al. |
| 2020/0346816 A1 | 11/2020 | Sollie et al. |
| 2020/0346841 A1 | 11/2020 | Sollie et al. |
| 2021/0039869 A1 | 2/2021 | Waltermire et al. |
| 2021/0039870 A1 | 2/2021 | Sollie et al. |
| 2021/0039871 A1 | 2/2021 | Sollie et al. |
| 2021/0070527 A1 | 3/2021 | Sollie et al. |
| 2021/0070529 A1 | 3/2021 | Sollie et al. |
| 2021/0070530 A1 | 3/2021 | Sollie et al. |
| 2021/0078755 A1 | 3/2021 | Sollie et al. |
| 2021/0101734 A1 | 4/2021 | Collison et al. |
| 2021/0101735 A1 | 4/2021 | Collison et al. |
| 2021/0101736 A1 | 4/2021 | Waltermire et al. |
| 2021/0101737 A1 | 4/2021 | Waltermire et al. |
| 2021/0102746 A1 | 4/2021 | Waltermire et al. |
| 2021/0155367 A1 | 5/2021 | Sollie et al. |
| 2021/0163210 A1 | 6/2021 | Waltermire et al. |
| 2021/0179313 A1 | 6/2021 | Sollie et al. |
| 2021/0347553 A1 | 11/2021 | Sollie et al. |
| 2022/0017260 A1 | 1/2022 | Sollie et al. |
| 2022/0024634 A1 | 1/2022 | Sollie et al. |
| 2022/0024635 A1 | 1/2022 | Sollie et al. |
| 2022/0026140 A1 | 1/2022 | Waltermire et al. |
| 2022/0026141 A1 | 1/2022 | Waltermire et al. |
| 2022/0033167 A1 | 2/2022 | Collison et al. |
| 2022/0081152 A1 | 3/2022 | Sollie et al. |
| 2022/0081186 A1 | 3/2022 | Waltermire et al. |
| 2022/0177216 A1 | 6/2022 | Sollie et al. |
| 2022/0251783 A1 | 8/2022 | Anagnostopoulos et al. |

FOREIGN PATENT DOCUMENTS

| | | |
|---|---|---|
| CN | 1073993 | 7/1993 |
| CN | 1503962 | 6/2004 |
| CN | 102264961 | 11/2011 |
| CN | 206494316 | 9/2017 |
| CN | 108001787 | 5/2018 |
| DE | 1897846 | 7/1964 |
| DE | 102011016500 | 10/2012 |
| DE | 202017103230 | 7/2017 |
| DE | 202017003908 | 10/2017 |
| DE | 202018101998 | 7/2019 |
| DE | 202019003407 | 11/2019 |
| EP | 0133539 | 2/1985 |
| EP | 0537058 | 4/1993 |
| EP | 2990196 | 3/2016 |
| EP | 3144248 | 3/2017 |
| EP | 3348493 | 7/2018 |
| EP | 3538708 | 1/2022 |
| FR | 1241878 | 9/1960 |
| FR | 2705317 | 11/1994 |
| FR | 2820718 | 8/2002 |
| FR | 2821786 | 9/2002 |
| FR | 3016352 | 7/2015 |
| GB | 217683 | 6/1924 |
| GB | 235673 | 6/1925 |
| GB | 528289 | 1/1940 |
| GB | 713640 | 8/1954 |
| GB | 1204058 | 9/1970 |
| GB | 1305212 | 1/1973 |
| GB | 1372054 | 10/1974 |
| GB | 2400096 | 5/2006 |
| GB | 2516490 | 1/2015 |
| GB | 2528289 | 1/2016 |
| JP | 01254557 | 10/1989 |
| JP | 2005139582 | 6/2005 |
| JP | 2005247329 | 9/2005 |
| JP | 2012126440 | 7/2012 |
| KR | 101730461 | 4/2017 |
| WO | 8807476 | 10/1988 |
| WO | 9726192 | 7/1997 |
| WO | 9932374 | 7/1999 |
| WO | 2001070592 | 9/2011 |
| WO | 2014147425 | 9/2014 |
| WO | 2016187435 A2 | 5/2016 |
| WO | 2016187435 A3 | 11/2016 |
| WO | 2017207974 | 12/2017 |
| WO | 2018089365 | 5/2018 |
| WO | 2018093586 | 5/2018 |
| WO | 2018227047 | 12/2018 |
| WO | 2019113453 | 6/2019 |
| WO | 2019125904 | 6/2019 |
| WO | 2019125906 | 6/2019 |
| WO | 2019226199 | 11/2019 |
| WO | 2020101939 | 5/2020 |
| WO | 2020102023 | 5/2020 |
| WO | 2020122921 | 6/2020 |
| WO | 2020222943 | 11/2020 |

OTHER PUBLICATIONS

US 10,899,530 B2, 01/2021, Sollie et al. (withdrawn)
US 10,899,531 B2, 01/2021, Sollie et al. (withdrawn)
US 11,027,908 B2, 06/2021, Sollie et al. (withdrawn)
US 11,040,817 B2, 06/2021, Sollie et al. (withdrawn)
US 11,072,486 B2, 07/2021, Waltermire et al. (withdrawn)
US 11,079,168 B2, 08/2021, Waltermire et al. (withdrawn)
US 11,084,644 B2, 08/2021, Waltermire et al. (withdrawn)
US 11,167,877 B2, 11/2021, Sollie et al. (withdrawn)
US 11,167,878 B2, 11/2021, Sollie et al. (withdrawn)
US 11,247,836 B2, 02/2022, Sollie et al. (withdrawn)
US 11,292,656 B2, 04/2022, Sollie et al. (withdrawn)
US D959,977 S, 08/2022, Sollie et al. (withdrawn)
Stinson, Elizabeth; Article entitled: "A Pizza Geek Discovers the World's Smartest Pizza Box", published Jan. 17, 2014, 8 pgs.
Sollie, Greg; Non-Final Office Action for U.S. Appl. No. 16/408,981, filed May 10, 2019, dated Aug. 20, 2019, 50 pgs.
Sollie, Greg; Final Office Action for U.S. Appl. No. 16/408,981, filed May 10, 2019, dated Feb. 24, 2020, 29 pgs.
Sollie, Greg; Non-Final Office Action for U.S. Appl. No. 16/408,981, filed May 10, 2019, dated Sep. 16, 2020, 40 pgs.
Sollie, Greg; Final Office Action for U.S. Appl. No. 16/408,981, filed May 10, 2019, dated Dec. 29, 2020, 22 pgs.
Sollie, Greg; Notice of Allowance for U.S. Appl. No. 16/408,981, filed May 10, 2019, dated Feb. 23, 2021, 6 pgs.
Sollie, Greg; Corrected Notice of Allowance for U.S. Appl. No. 16/408,981, filed May 10, 2019, dated Apr. 29, 2021, 6 pgs.
Sollie, Greg; Corrected Notice of Allowance for U.S. Appl. No. 16/408,981, filed May 10, 2019, dated Mar. 15, 2021, 9 pgs.
Sollie, Greg; Non-Final Office Action for U.S. Appl. No. 16/886,040, filed May 28, 2020, dated Mar. 30, 2021, 39 pgs.
Sollie, Greg; Requirement for Restriction/Election for U.S. Appl. No. 16/886,040, filed May 28, 2020, dated Dec. 23, 2020, 6 pgs.
Waltermire, Jamie; International Search Report and Written Opinion for PCT Application No. PCT/US18/65464, filed Dec. 13, 2018, dated Mar. 11, 2019, 9 pgs.
Sollie, Greg; International Search Report and Written Opinion for PCT Application No. PCT/US 18/65459, filed Dec. 13, 2018, dated May 1, 2019, 15 pgs.
Sollie, Greg; International Preliminary Report on Patentability for PCT Application No. PCT/US18/65459, filed Dec. 13, 2018, dated Jul. 2, 2020, 11 pgs.
Sollie, Greg; International Preliminary Report on Patentability for PCT Application No. PCT/US18/65461, filed Dec. 13, 2018, dated Jul. 2, 2020, 12 pgs.

(56) References Cited

OTHER PUBLICATIONS

Sollie, Greg; International Search Report and Written Opinion for PCT Application No. PCT/US18/65461, filed Dec. 13, 2018, dated Mar. 21, 2019, 13 pgs.
MP Global Products, LLC; First Examination Report for Australian patent application No. 2017359035, filed Nov. 7, 2017, dated Nov. 27, 2020, 3 pgs.
MP Global Products LLC: European Office Action Response for application No. 17868605.1, filed Jan. 19, 2021, 15 pgs.
MP Global Products LLC: European Office Action for application No. 17868605.1, dated Dec. 3, 2020, 4 pgs.
MP Global Products LLC: European Office Action for application No. 17868605.1, dated Apr. 13, 2021, 3 pgs.
MP Global Products LLC: European Search Report Response for serial No. 17868605.1, filed Oct. 2, 2020, 15 pgs.
Sollie, Greg; International Preliminary Reporton Patentability for PCT/US18/65463, filed Dec. 13, 2018, dated Dec. 3, 2020, 9 pgs.
Sollie, Greg; International Search Report and Written Opinion for PCT Application No. PCT/US20/24820, filed Mar. 26, 2020, dated Jul. 2, 2020, 14 pgs.
Sollie, Greg; International Search Report and Written Opinion for PCT Application No. PCT/US19/60486, filed Nov. 18, 2019, dated Jan. 13, 2020, 10 pgs.
Sollie, Greg; Invitation to Pay Additional Fees for PCT/US19/59764, filed Nov. 5, 2019, dated Jan. 2, 2020, 2 pgs.
Sollie, Greg; International Search Report and Written Opinion for PCT Application No. PCT/US19/59764, filed Nov. 5, 2019, dated Jul. 1, 2020, 13 pgs.
Sollie, Greg; International Search Report and Written Opinion for PCT/US18/65463, filed Dec. 13, 2018, dated Mar. 25, 2019, 11 pgs.
Collison, Alan B.; Applicant-Initiated Interview Summary for U.S. Appl. No. 17/123,676, filed Dec. 16, 2020, dated May 4, 2021, 4 pgs.
Waltermire, Jamie; Certificate of Correction for U.S. Appl. No. 15/482,186, filed Apr. 7, 2017, dated Dec. 29, 2020, 1 pg.
Waltermire, Jamie; Corrected Notice of Allowance for U.S. Appl. No. 15/482,186, filed Apr. 7, 2017, dated Jun. 2, 2020, 10 pgs.
Waltermire, Jamie; Corrected Notice of Allowance for U.S. Appl. No. 15/482,186, filed Apr. 7, 2017, dated Sep. 2, 2020, 12 pgs.
Waltermire, Jamie; Non-Final Office Action for U.S. Appl. No. 15/482,186, filed Apr. 7, 2017, dated Mar. 20, 2019, 81 pgs.
Waltermire, Jamie; Notice of Allowance for U.S. Appl. No. 15/482,186, filed Apr. 7, 2017, dated Mar. 5, 2020, 29 pgs.
Waltermire, Jamie; Requirement for Restriction/Election for U.S. Appl. No. 15/482,186, filed Jan. 7, 2017, dated Apr. 17, 2019, 7 pgs.
Waltermire, Jamie; Applicant-Initiated Interview Summary for U.S. Appl. No. 16/526,511, filed Jul. 30, 2019, dated Jun. 12, 2020, 5 pgs.
Waltermire, Jamie; Corrected Notice of Allowance for U.S. Appl. No. 16/526,511, filed Jul. 30, 2019, dated Oct. 30, 2020, 14 pgs.
Waltermire, Jamie; Corrected Notice of Allowance for U.S. Appl. No. 16/526,511, filed Jul. 30, 2019, dated Nov. 30, 2020, 9 pgs.
Waltermire, Jamie; Final Office Action for U.S. Appl. No. 16/526,511, filed Jul. 30, 2019, dated May 19, 2020, 39 pgs.
Waltermire, Jamie; Non-Final Office Action for U.S. Appl. No. 16/526,511, filed Jul. 30, 2019, dated Dec. 9, 2019, 55 pgs.
Waltermire, Jamie; Non-Final Office Action for U.S. Appl. No. 16/526,511, filed Jul. 30, 2019, dated Jul. 10, 2020, 23 pgs.
Waltermire, Jamie; Notice of Allowance for U.S. Appl. No. 16/526,511, filed Jul. 30, 2019, dated Sep. 14, 2020, 18 pgs.
Waltermire, Jamie; Final Office Action for U.S. Appl. No. 15/482,200, filed Apr. 7, 2017, dated Jan. 2, 2019, 23 pgs.
Waltermire, Jamie; Non-Final Office Action for U.S. Appl. No. 15/482,200, filed Apr. 7, 2017, dated May 11, 2018, 36 pgs.
Waltermire, Jamie; Notice of Allowance for U.S. Appl. No. 15/482,200, filed Apr. 7, 2017, dated May 14, 2019, 25 pgs.
Waltermire, Jamie; Supplemental Notice of Allowance for U.S. Appl. No. 15/482,200, filed Apr. 7, 2017, dated Jul. 26, 2019, 9 pgs.
Waltermire, Jamie; Supplemental Notice of Allowance for U.S. Appl. No. 15/482,200, filed Apr. 7, 2017, dated Aug. 12, 2019, 7 pgs.
Waltermire, Jamie; Supplemental Notice of Allowance for U.S. Appl. No. 15/482,200, filed Apr. 7, 2017, dated Sep. 10, 2019, 8 pgs.
Waltermire, Jamie; Applicant-Initiated Interview Summary for U.S. Appl. No. 16/530,045, filed Mar. 2, 2019, dated Jun. 15, 2020, 3 pgs.
Waltermire, Jamie; Final Office Action for U.S. Appl. No. 16/530,045, filed Aug. 2, 2019, dated Nov. 24, 2020, 40 pgs.
Waltermire, Jamie; Non-Final Office Action for U.S. Appl. No. 16/530,045, filed Aug. 2, 2019, dated Dec. 20, 2019, 61 pgs.
Waltermire, Jamie; Non-Final Office Action for U.S. Appl. No. 16/530,045, filed Aug. 2, 2019, dated May 27, 2020, 38 pgs.
Waltermire, Jamie; Non-Final Office Action for U.S. Appl. No. 16/164,933, filed Oct. 19, 2018, dated Nov. 18, 2020, 104 pgs.
Waltermire, Jamie; Corrected Notice of Allowance for U.S. Appl. No. 15/590,345, filed May 9, 2017, dated Feb. 18, 2020, 9 pgs.
Waltermire, Jamie; Final Office Action for U.S. Appl. No. 15/590,345, filed May 9, 2017, dated Mar. 19, 2019, 42 pgs.
Waltermire, Jamie; Non-Final Office Action for U.S. Appl. No. 15/590,345, filed May 9, 2017, dated Mar. 24, 2018, 41 pgs.
Waltermire, Jamie; Notice of Allowance for U.S. Appl. No. 15/590,345, filed May 9, 2017, dated Oct. 1, 2019, 28 pgs.
Waltermire, Jamie; Supplemental Notice of Allowance for U.S. Appl. No. 15/590,345, filed May 9, 2017, dated Jan. 9, 2020, 8 pgs.
Waltermire, Jamie; Supplemental Notice of Allowance for U.S. Appl. No. 15/590,345, filed May 9, 2017, dated Dec. 3, 2019, 14 pgs.
Waltermire, Jamie; Applicant-Initiated Interview Summary for U.S. Appl. No. 15/590,349, filed May 9, 2017, dated Dec. 3, 2019, 3 pgs.
Waltermire, Jamie; Corrected Notice of Allowance for U.S. Appl. No. 15/590,349, filed May 9, 2017, dated Nov. 2, 2020, 9 pgs.
Waltermire, Jamie; Corrected Notice of Allowance for U.S. Appl. No. 15/590,349, filed May 9, 2017, dated Dec. 22, 2020, 9 pgs.
Waltermire, Jamie; Corrected Notice of Allowance for U.S. Appl. No. 15/590,349, filed May 9, 2017, dated Feb. 5, 2021, 9 pgs.
Waltermire, Jamie; Final Office Action for U.S. Appl. No. 15/590,349, filed May 9, 2017, dated Jan. 6, 2020, 26 pgs.
Waltermire, Jamie; Final Office Action for U.S. Appl. No. 15/590,349, filed May 9, 2017, dated May 9, 2019, 31 pgs.
Waltermire, Jamie; Non-Final Office Action for U.S. Appl. No. 15/590,349, filed May 9, 2017, dated Nov. 5, 2018, 41 pgs.
Waltermire, Jamie; Non-Final Office Action for U.S. Appl. No. 15/590,349, filed May 9, 2017, dated Mar. 12, 2020, 30 pgs.
Waltermire, Jamie; Non-Final Office Action for U.S. Appl. No. 15/590,349, filed May 9, 2017, dated Sep. 5, 2019, 25 pgs.
Waltermire, Jamie; Notice of Allowance for U.S. Appl. No. 15/590,349, filed May 9, 2017, dated Oct. 20, 2020, 20 pgs.
Waltermire, Jamie; Requirement for Restriction/Election for U.S. Appl. No. 15/590,349, filed May 9, 2017, dated Aug. 30, 2018, 10 pgs.
Waltermire, Jamie; Final Office Action for U.S. Appl. No. 16/293,716, filed Mar. 6, 2019, dated Oct. 29, 2020, 19 pgs.
Waltermire, Jamie; Final Office Action for U.S. Appl. No. 16/293,716, filed Mar. 6, 2019, dated Sep. 10, 2020, 24 pgs.
Waltermire, Jamie; Non-Final Office Action for U.S. Appl. No. 16/293,716, filed Mar. 6, 2019, dated Feb. 5, 2021, 18 pgs.
Waltermire, Jamie; Non-Final Office Action for U.S. Appl. No. 16/293,716, filed Mar. 6, 2019, dated May 5, 2020, 70 pgs.
Waltermire, Jamie; Requirement for Restriction/Election for U.S. Appl. No. 16/293,716, filed Mar. 6, 2019, dated Feb. 26, 2020, 6 pgs.
Waltermire, Jamie; Final Office Action for U.S. Appl. No. 16/526,555, filed Jul. 30, 2019, dated Mar. 8, 2021, 25 pgs.
Waltermire, Jamie; Non-Final Office Action for U.S. Appl. No. 16/526,555, filed Jul. 30, 2019, dated Oct. 27, 2020, 39 pgs.
Waltermire, Jamie; Non-Final Office Action for U.S. Appl. No. 16/526,555, filed Jul. 30, 2019, dated Jan. 2, 2020, 63 pgs.
Waltermire, Jamie; Requirement for Restriction/Election for U.S. Appl. No. 16/526,555, filed Jul. 30, 2019, dated Jan. 17, 2020, 7 pgs.
Solie, Greg; Corrected Notice of Allowance for U.S. Appl. No. 15/845,540, filed Dec. 18, 2017, dated Dec. 21, 2020, 9 pgs.
Sollie, Greg; Corrected Notice of Allowance for U.S. Appl. No. 15/845,540, filed Dec. 18, 2017, dated Feb. 12, 2021, 8 pgs.
WEIKU.COM; Article entitled: "100% Biodegradable Packing materials Green Cell Foam Stock Coolers", located at <http://www.

(56) References Cited

OTHER PUBLICATIONS weiku.com/products/18248504/100_Biodegradable_Packing_materials_Green_Cell_Foam_Stock_Coolers.html>, accessed on Sep. 28, 2017, 7 pgs.
Salazar Packaging; Article entitle: "Custom Packaging and Design", located at <https://salazarpackaging.com/custom-packaging-and-design/>, accessed on Sep. 28, 2017, 2 pgs.
Sollie, Greg; Non-Final Office Action for U.S. Appl. No. 15/845,540, filed Dec. 18, 2017, dated Apr. 2, 2019, 50 pgs.
Collison, Alan B.; Notice of Allowance for U.S. Appl. No. 15/677,738, filed Aug. 15, 2017, dated Jun. 19, 2019, 10 pgs.
Collison, Alan B.; Corrected Notice of Allowance for U.S. Appl. No. 15/677,738, filed Aug. 15, 2017, dated Jul. 15, 2019, 7 pgs.
CooLiner ® Insulated Shipping Bags, available at <http://www/chem-tran.com/packaging/supplies/cooliner-insulated-shipping-bags.php>, accessed on Oct. 18, 2019, 4 pgs.
"Green Cell Foam Shipping Coolers", located at <https://www.greencellfoam.com/shipping-coolers>, accessed on Oct. 18, 2019, 4 pgs.
Collison, Alan B.; Notice of Allowance for U.S. Appl. No. 15/677,738, filed Aug. 15, 2017, dated Oct. 29, 2019, 14 pgs.
Collison, Alan B.; Supplemental Notice of Allowance for U.S. Appl. No. 15/677,738, filed Aug. 15, 2017, dated Dec. 10, 2019, 4 pgs.
MP Global Products, LLC; International Search Report and Written Opinion of the International Searching Authority for PCT/US2017/060403, filed Nov. 7, 2017, dated Feb. 19, 2018, 15 pgs.
Collison, Alan B.; Requirement for Restriction/Election for U.S. Appl. No. 15/677,738, filed Aug. 15, 2017, dated Jul. 3, 2018, 8 pgs.
Collison, Alan B.; Requirement for Restriction/Election for U.S. Appl. No. 15/677,738, filed Aug. 15, 2017, dated Jul. 31, 2018, 8 pgs.
Collison, Alan B.; Non-Final Office Action for U.S. Appl. No. 15/677,738, filed Aug. 15, 2017, dated Oct. 23, 2018, 11 pgs.
Collison, Alan B.; Applicant Interview Summary for U.S. Appl. No. 15/677,738, filed Aug. 15, 2017, dated Dec. 5, 2018, 4 pgs.
Collison, Alan B.; Final Office Action for U.S. Appl. No. 15/677,738, filed Aug. 15, 2017, dated Feb. 28, 2019, 14 pgs.
Collison, Alan B.; Applicant Interview Summary for U.S. Appl. No. 15/677,738, filed Aug. 15, 2017, dated Apr. 22, 2019, 4 pgs.
Voluntary Standard for Repulping and Recycling Corrugated Fiberboard Treated to Improve Its Performance in the Presence of Water and Water Vapor, (revises Aug. 16, 2013) Fibre Box Association (FBA), Elk Grove Village, IL, 1-23, Retrieved from http://www.corrugated.org/wp-content/uploads/PDFs/Recycling/Vol_Std_Protocol_2013.pdf.
MP Global Products LLC: European Search Report for serial No. 17868605.1, dated Mar. 16, 2020, 7 pgs.
Collison, Alan B.; Applicant Interview Summary for U.S. Appl. No. 16/658,756, filed Oct. 21, 2019, dated May 6, 2020, 3 pgs.
Collison, Alan B.; Final Office Action for U.S. Appl. No. 16/658,756, filed Oct. 21, 2019, dated Jun. 17, 2020, 10 pgs.
Collison, Alan B.; Applicant Interview Summary for U.S. Appl. No. 16/658,756, filed Oct. 21, 2019, dated Jun. 29, 2020, 3 pgs.
Collison, Alan B.; Non-Final Office Action for U.S. Appl. No. 16/658,756, filed Oct. 21, 2019, dated Feb. 4, 2020, 14 pgs.
Collison, Alan B.; Advisory Action for U.S. Appl. No. 16/658,756, filed Oct. 21, 2019, dated Sep. 25, 2020, 4 pgs.
Collison, Alan B.; Notice of Allowance for U.S. Appl. No. 16/658,756, filed Oct. 21, 2019, dated Oct. 23, 2020, 10 pgs.
Collison, Alan B.; Corrected Notice of Allowance for U.S. Appl. No. 16/658,756, filed Oct. 21, 2019, dated Jan. 28, 2021, 3 pgs.
MP Global Products, LLC; Office Action for Chinese patent application No. 201780081689.7, dated Nov. 2, 2020, 17 pgs.
MP Global Products LLC: Office Action for European application No. 17868605.1, dated Dec. 3, 2020, 4 pgs.
MP Global Products, LLC; Examination Report for Australian patent application No. 2017359035, dated Nov. 27, 2020, 3 pgs.
Collison, Alan B.; Non-Final Office Action for U.S. Appl. No. 16/414,309, filed May 16, 2019, dated Jul. 17, 2020, 77 pgs.
Collison, Alan B.; Applicant-Initiated Interview Summary for U.S. Appl. No. 16/414,309, filed May 16, 2019, dated Aug. 21, 2020, 3 pgs.
Collison, Alan B.; Requirement for Restriction/Election for U.S. Appl. No. 16/414,309, filed May 16, 2019, dated Jun. 16, 2020, 5 pgs.
Collison, Alan B.; Final Office Action for U.S. Appl. No. 16/414,309, filed May 16, 2019, dated Oct. 8, 2020, 15 pgs.
Collison, Alan B.; Applicant-Initiated Interview Summary for U.S. Patent Application No. 16/414/309, filed May 16, 2019, dated Oct. 15, 2020, 3 pgs.
Collison, Alan B.; Notice of Allowance for U.S. Patent Application No. 16/414/309, filed May 16, 2019, dated Oct. 21, 2020, 6 pgs.
Collison, Alan B.; Corrected Notice of Allowance for U.S. Appl. No. 16/414,309, filed May 16, 2019, dated Nov. 16, 2020, 10 pgs.
Collison, Alan B.; Corrected Notice of Allowance for U.S. Appl. No. 16/414,309, filed May 16, 2019, dated Nov. 27, 2020, 9 pgs.
Collison, Alan B.; Certificate of Correction for U.S. Patent Application No. 16/414/309, filed May 16, 2019, dated Mar. 9, 2021, 1 pg.
Collison, Alan B.; Non-Final Office Action for U.S. Appl. No. 17/123,673, filed Dec. 16, 2020, dated Mar. 23, 2021, 86 pgs.
Collison, Alan B.; Non-Final Office Action for U.S. Appl. No. 16/414,310, filed May 16, 2019, dated Jul. 8, 2020, 84 pgs.
Collison, Alan B.; Applicant-Initiated Interview Summary for U.S. Appl. No. 16/414,310, filed May 16, 2019, dated Jul. 30, 2020, 3 pgs.
Collison, Alan; Final Office Action for U.S. Appl. No. 16/414,310, filed May 16, 2019, dated Oct. 13, 2020, 30 pgs.
Collison, Alan B.; Notice of Allowance for U.S. Appl. No. 16/414,310, filed May 16, 2019, dated Nov. 13, 2020, 15 pgs.
Collison, Alan B.; Supplemental Notice of Allowance for U.S. Appl. No. 16/414,310, filed May 16, 2019, dated Dec. 3, 2020, 8 pgs.
Collison, Alan B.; Non-Final Office Action for U.S. Appl. No. 17/123,676, filed Dec. 16, 2020, dated Feb. 3, 2021, 23 pgs.
Sollie, Greg; Non-Final Office Action for U.S. Appl. No. 15/988,550, filed May 24, 2018, dated May 29, 2019, 18 pgs.
Sollie, Greg; Final Office Action for U.S. Appl. No. 15/988,550, filed May 24, 2018, dated Aug. 14, 2019, 19 pgs.
Sollie, Greg; Non-Final Office Action for U.S. Appl. No. 15/988,550, filed May 24, 2018, dated Oct. 9, 2019, 17 pgs.
Sollie, Greg; Applicant Initiated Interview Summary for U.S. Appl. No. 15/988,550, filed May 24, 2018, dated Dec. 27, 2019, 3 pgs.
TERA-PAK; Article entitled: "Insulated Shipping Containers", located at <http://www.tera-pak.com/>, accessed on Mar. 20, 2017, 3 pgs.
American Bag Company; Article entitled: "Cool Green Bag, Small", located at <http://hotcoldbags.com/items/Cool%20Green%20Bag,%20Small>, accessed on Mar. 20, 2017, 2 pgs.
DURO BAG; Article entitled: "The Load and Fold Bag", accessed on May 24, 2017, copyrighted Apr. 2017, 3 pgs.
Images of Novolex bag, including an outer paper bag, a corrugated cardboard insert, and an inner foil-covered bubble-wrap bag, publicly available prior to May 9, 2017, 7 pgs.
UN Packaging; Article entitled: "CooLiner® Insulated Shipping Bags", available at <http://www.chem-tran.com/packaging/supplies/cooliner-insulated-shipping-bags.php>, accessed on Aug. 30, 2017, 2 pgs.
GREENBLUE; "Environmental Technical Briefs of Common Packaging Materials- Fiber-Based Materials", Sustainable Packaging Solution, 2009.
MP Global Products; Article entitled: "Thermopod mailer envelopes and Thermokeeper insulated box liners", located at < http://www.mhpn.com/product/thermopod_mailer_envelopes_and_thermokeeper_insulated_box_liners/packaging>, accessed on Aug. 30, 2017, 2 pgs.
Singh, et al.; Article entitled: "Performance Comparison of Thermal Insulated Packaging Boxes, Bags and Refrigerants for Single-parcel Shipments", published Mar. 13, 2007, 19 pgs.
PERIWRAP; Article entitled: "Insulated Solutions", located at <https://www.peri-wrap.com/insulation/>, accessed on Dec. 3, 2018, 9 pgs.
Waltermire, Jamie; Non-Final Office Action for U.S. Appl. No. 15/663,905, filed Jul. 31, 2017, dated Jun. 25, 2019, 66 pgs.

(56) References Cited

OTHER PUBLICATIONS

Waltermire, Jamie; Final Office Action for U.S. Appl. No. 15/663,905, filed Jul. 31, 2017, dated Aug. 22, 2019, 23 pgs.
Waltermire, Jamie; Notice of Allowance for U.S. Appl. No. 15/663,905, filed Jul. 31, 2017, dated Nov. 4, 2019, 18 pgs.
Waltermire, Jamie; Corrected Notice of Allowance for U.S. Appl. No. 15/663,905, filed Jul. 31, 2017, dated Nov. 18, 2019, 6 pgs.
Waltermire, Jamie; Corrected Notice of Allowance for U.S. Appl. No. 15/663,905, filed Jul. 31, 2017, dated Dec. 26, 2019, 7 pgs.
Waltermire, Jamie; Requirement for Restriction/Election for U.S. Appl. No. 15/663,905, filed Jul. 31, 2017, dated Mar. 21, 2019, 8 pgs.
Waltermire, Jamie; Non-Final Office Action for U.S. Appl. No. 16/381,678, filed Apr. 11, 2019, dated Sep. 9, 2019, 50 pgs.
Waltermire, Jamie; Final Office Action for U.S. Appl. No. 16/381,678, filed Apr. 11, 2019, dated Dec. 30, 2019, 17 pgs.
Waltermire, Jamie; Advisory Action for U.S. Appl. No. 16/381,678, filed Apr. 11, 2019, dated Feb. 26, 2020, 3 pgs.
Waltermire, Jamie; Non-Final Office Action for U.S. Appl. No. 16/381,678, filed Apr. 11, 2019, dated Apr. 17, 2020, 30 pgs.
Waltermire, Jamie; Notice of Allowance for U.S. Appl. No. 16/381,678, filed Apr. 11, 2019, dated Jul. 30, 2020, 15 pgs.
Waltermire, Jamie; Final Office Action for U.S. Appl. No. 16/381,678, filed Apr. 11, 2019, dated Aug. 20, 2020, 21 pgs.
Waltermire, Jamie; Final Office Action for U.S. Appl. No. 16/381,678, filed Apr. 11, 2019, dated Jun. 16, 2020, 8 pgs.
Waltermire, Jamie; Final Office Action for U.S. Appl. No. 16/381,678, filed Apr. 11, 2019, dated Oct. 19, 2020, 24 pgs.
Waltermire, Jamie; Non-Final Office Action for U.S. Appl. No. 16/381,678, filed Apr. 11, 2019, dated Mar. 5, 2021, 36 pgs.
Waltermire, Jamie; Requirement for Restriction/Election for U.S. Appl. No. 16/561,203, filed Sep. 5, 2019, dated Feb. 26, 2020, 5 pgs.
Waltermire, Jamie; Non-Final Office Action for U.S. Appl. No. 16/561,203, filed Sep. 5, 2019, dated May 6, 2020, 59 pgs.
Waltermire, Jamie; Final Office Action for U.S. Appl. No. 16/561,203, filed Sep. 5, 2019, dated Sep. 10, 2020, 25 pgs.
Waltermire, Jamie; Notice of Allowance for U.S. Appl. No. 16/561,203, filed Sep. 5, 2019, dated Nov. 3, 2020, 14 pgs.
Waltermire, Jamie; Corrected Notice of Allowance for U.S. Appl. No. 16/561,203, filed Sep. 5, 2019, dated Jan. 5, 2021, 9 pgs.
Waltermire, Jamie; Corrected Notice of Allowance for U.S. Appl. No. 16/561,203, filed Sep. 5, 2019, dated Feb. 5, 2021, 8 pgs.
Waltermire, Jamie; Requirement for Restriction/Election for U.S. Appl. No. 16/689,407, filed Nov. 20, 2019, dated Oct. 29, 2020, 6 pgs.
Waltermire, Jamie; Non-Final Office Action for U.S. Appl. No. 16/689,407, filed Nov. 20, 2019, dated Jan. 8, 2021, 92 pgs.
Waltermire, Jamie; Final Office Action for U.S. Appl. No. 16/689,407, filed Nov. 20, 2019, dated Apr. 23, 2021, 18 pgs.
Waltermire, Jamie; Requirement for Restriction/Election for U.S. Appl. No. 16/689,433, filed Nov. 20, 2019, dated Oct. 16, 2020, 6 pgs.
Waltermire, Jamie; Non-Final Office Action for U.S. Appl. No. 16/689,433, filed Nov. 20, 2019, dated Feb. 23, 2021, 88 pgs.
Sollie, Greg; Notice of Allowance for U.S. Appl. No. 15/845,545, filed Dec. 18, 2017, dated Jun. 19, 2019, 20 pgs.
Sollie, Greg; Corrected Notice of Allowance for U.S. Appl. No. 15/845,545, filed Dec. 18, 2017, dated Oct. 1, 2019, 7 pgs.
Sollie, Greg; Corrected Notice of Allowance for U.S. Appl. No. 15/845,545, filed Dec. 18, 2017, dated Oct. 31, 2019, 12 pgs.
Sollie, Greg; Non-Final Office Action for U.S. Appl. No. 15/845,545, filed Dec. 18, 2017, dated Mar. 5, 2019, 41 pgs.
Sollie, Greg; Restriction Requirement for U.S. Appl. No. 16/552,277, filed Aug. 27, 2019, dated Apr. 20, 2020, 7 pgs.
Sollie, Greg; Non-Final Office Action for U.S. Appl. No. 16/552,277, filed Aug. 27, 2019, dated Jun. 3, 2020, 68 pgs.
Sollie, Greg; Final Office Action for U.S. Appl. No. 16/552,277, filed Aug. 27, 2019, dated Aug. 7, 2020, 19 pgs.
Sollie, Greg; Notice of Allowance for U.S. Appl. No. 16/552,277, filed Aug. 27, 2019, dated Aug. 31, 2020, 6 pgs.
Sollie, Greg; Corrected Notice of Allowance for U.S. Appl. No. 16/552,277, filed Aug. 27, 2019, dated Nov. 5, 2020, 9 pgs.
Sollie, Greg; Corrected Notice of Allowance for U.S. Appl. No. 16/552,277, filed Aug. 27, 2019, dated Dec. 22, 2020, 7 pgs.
Sollie, Greg; Corrected Notice of Allowance for U.S. Appl. No. 16/552,277, filed Aug. 27, 2019, dated Feb. 9, 2021, 9 pgs.
Sollie, Greg; Final Office Action for U.S. Appl. No. 15/845,540, filed Dec. 18, 2017, dated Oct. 30, 2019, 56 pgs.
Sollie, Greg; Non-Final Office Action for U.S. Appl. No. 15/845,540, filed Dec. 18, 2017, dated Feb. 19, 2020, 32 pgs.
Sollie, Greg; Final Office Action for U.S. Appl. No. 15/845,540, filed Dec. 18, 2017, dated Sep. 2, 2020, 28 pgs.
Sollie, Greg; Notice of Allowance for U.S. Appl. No. 15/845,540, filed Dec. 18, 2017, dated Sep. 17, 2020, 5 pgs.
Sollie, Greg; Non-Final Office Action for U.S. Appl. No. 15/988,550, filed May 24, 2018, dated Mar. 11, 2020, 35 pgs.
Sollie, Greg; Final Office Action for U.S. Appl. No. 15/988,550, filed May 24, 2018, dated Aug. 27, 2020, 27 pgs.
Sollie, Greg; Applicant-Initiated Interview Summary for U.S. Appl. No. 15/988/550, filed May 24, 2018, dated Dec. 24, 2020, 2 pgs.
Sollie, Greg; Notice of Allowance for U.S. Appl. No. 15/988,550, filed May 24, 2018, dated Apr. 13, 2021, 21 pgs.
Cold Keepers; Article entitled: "Insulated Shipping Boxes—Coldkeepers, Thermal Shipping Solutions", located at <https://www.coldkeepers.com/product-category/shipping/>, (Accessed: Jan. 12, 2017), 3 pgs.
Needles 'N' Knowledge; Article entitled: "Tall Box With Lid", located at <http://needlesnknowledge.blogspot.com/2017/10/tall-box-with-lid.html> (Accessed: Jan. 12, 2017), 10 pgs.
Sollie, Greg; Non-Final Office Action for U.S. Appl. No. 16/280,595, filed Feb. 20, 2019, dated May 29, 2019, 60 pgs.
Sollie, Greg; Final Office Action for U.S. Appl. No. 16/280,595, filed Feb. 20, 2019, dated Oct. 3, 2019, 19 pgs.
Sollie, Greg; Non-Final Office Action for U.S. Appl. No. 16/280,595, filed Feb. 20, 2019, dated Dec. 19, 2019, 23 pgs.
Sollie, Greg; Final Office Action for U.S. Appl. No. 16/280,595, filed Feb. 20, 2019, dated Mar. 24, 2020, 20 pgs.
Sollie, Greg; Applicant-Initiated Interview Summary for U.S. Appl. No. 16/280,595, filed Feb. 20, 2019 dated May 6, 2020, 3 pgs.
Sollie, Greg; Advisory Action for U.S. Appl. No. 16/280,595, filed Feb. 20, 2019, dated Jul. 6, 2020, 3 pgs.
Sollie, Greg; Non-Final Office Action for U.S. Appl. No. 16/280,595, filed Feb. 20, 2019, dated Aug. 28, 2020, 26 pgs.
Sollie, Greg; Final Office Action for U.S. Appl. No. 16/280,595, filed Feb. 20, 2019, dated Dec. 30, 2020, 25 pgs.
Sollie, Greg; Non-Final Office Action for U.S. Appl. No. 16/280,595, filed Feb. 20, 2019, dated Apr. 9, 2021, 20 pgs.
Sollie, Greg; Non-Final Office Action for U.S. Appl. No. 16/530,052, filed Aug. 2, 2019, dated Oct. 2, 2019, 12 pgs.
Sollie, Greg; Final Office Action for U.S. Appl. No. 16/530,052, filed Aug. 2, 2019, dated Dec. 27, 2019, 49 pgs.
Sollie, Greg; Applicant-Initiated Interview Summary for U.S. Appl. No. 16/530,052, filed Aug. 2, 2019, dated Feb. 5, 2020, 2 pgs.
Sollie, Greg; Non-Final Office Action for U.S. Appl. No. 16/530,052, filed Aug. 2, 2019, dated Mar. 3, 2020, 24 pgs.
Sollie, Greg; Final Office Action for U.S. Appl. No. 16/530,052, filed Aug. 2, 2019, dated Aug. 28, 2020, 29 pgs.
Sollie, Greg; Non-Final Office Action for U.S. Appl. No. 16/530,052, filed Aug. 2, 2019, dated Dec. 18, 2020, 17 pgs.
Sollie, Greg; Final Office Action for U.S. Appl. No. 16/530,052, filed Aug. 2, 2019, dated Apr. 20, 2021, 27 pgs.
Sollie, Greg; Requirement for Restriction/Election for U.S. Appl. No. 16/401,603, filed May 2, 2019, dated Feb. 18, 2020, 6 pgs.
Sollie, Greg; Non-Final Office Action for U.S. Appl. No. 16/401,603, filed May 2, 2019, dated Mar. 10, 2020, 67 pgs.
Sollie, Greg; Applicant-Initiated Interview Summary for U.S. Appl. No. 16/401,603, filed May 2, 2019, dated May 15, 2020, 3 pgs.
Sollie, Greg; Notice of Allowance for U.S. Appl. No. 16/401,603, filed May 2, 2019, dated Aug. 31, 2020, 14 pgs.
Sollie, Greg; Final Office Action for U.S. Appl. No. 16/401,603, filed May 2, 2019, dated Jun. 30, 2020, 13 pgs.
Sollie, Greg; Corrected Notice of Allowance for U.S. Appl. No. 16/401,603, filed May 2, 2019, dated Nov. 24, 2020, 8 pgs.

(56) References Cited

OTHER PUBLICATIONS

Sollie, Greg; Corrected Notice of Allowance for U.S. Appl. No. 16/401,603, filed May 2, 2019, dated Nov. 3, 2020, 9 pgs.
Cellulose Material Solutions, LLC; Brochure for Infinity Care Thermal Liner, accessed on Oct. 22, 2018, 2 pgs.
Sollie, Greg; Non-Final Office Action for U.S. Appl. No. 16/401,607, filed May 2, 2019, dated Aug. 19, 2020, 88 pgs.
Sollie, Greg; Notice of Allowance for U.S. Appl. No. 16/401,607, filed May 2, 2019, dated Dec. 4, 2020, 12 pgs.
Sollie, Greg; Corrected Notice of Allowance for U.S. Appl. No. 16/401,607, filed May 2, 2019, dated Jan. 4, 2021, 9 pgs.
Sollie, Greg; Corrected Notice of Allowance for U.S. Appl. No. 16/401,607, filed May 2, 2019, dated Mar. 15, 2021, 13 pgs.
Sollie, Greg; Corrected Notice of Allowance for U.S. Appl. No. 16/401,607, filed May 2, 2019, dated Apr. 29, 2021, 8 pgs.
ULINE; Article entitled: Corrugated Corner Protectors—4 x 4, accessed on Oct. 25, 2018, 1 pg.
Sollie, Greg; Requirement for Restriction/Election for U.S. Appl. No. 16/382,710, filed Apr. 12, 2019, dated Jul. 15, 2019, 6 pgs.
Sollie, Greg; Non-Final Office Action for U.S. Appl. No. 16/382,710, filed Apr. 12, 2019, dated Oct. 10, 2019, 49 pgs.
Sollie, Greg; Final Office Action for U.S. Appl. No. 16/382,710, filed Apr. 12, 2019, dated Apr. 6, 2020, 33 pgs.
Sollie, Greg; Notice of Allowance for U.S. Appl. No. 16/382,710, filed Apr. 12, 2019, dated Jun. 3, 2020, 12 pgs.
Sollie, Greg; Corrected Notice of Allowance for U.S. Appl. No. 16/382,710, filed Apr. 12, 2019, dated Sep. 24, 2020, 9 pgs.
Sollie, Greg; Notice of Allowance for U.S. Appl. No. 16/382,710, filed Apr. 12, 2019, dated Oct. 21, 2020, 5 pgs.
DHL Express; Brochure for Dry Ice Shipping Guidelines, accessed on Oct. 26, 2018, 12 pgs.
Sollie, Greg; Requirement for Restriction/Election for U.S. Appl. No. 16/879,811, filed May 21, 2020, dated Apr. 15, 2021, 6 pgs.
Sollie, Greg; Non-Final Office Action for U.S. Appl. No. 16/567,192, filed Sep. 11, 2019, dated Dec. 10, 2019, 49 pgs.
Sollie, Greg; Final Office Action for U.S. Appl. No. 16/567,192, filed Sep. 11, 2019, dated Jun. 8, 2020, 20 pgs.
Sollie, Greg; Notice of Allowance for U.S. Appl. No. 16/567,192, filed Sep. 11, 2019, dated Aug. 7, 2020, 14 pgs.
Sollie, Greg; Corrected Notice of Allowance for U.S. Appl. No. 16/567,192, filed Sep. 11, 2019, dated Oct. 20, 2020, 8 pgs.
Sollie, Greg; Certificate of Correction for U.S. Appl. No. 16/567,192, filed Sep. 11, 2019, dated Feb. 16, 2021, 1 pg.
Thomas Scientific; Article entitled: "Thermosafe: Test Tube Shipper/Rack", accessed on Oct. 26, 2018, 2 pgs.
Waltermire, Jamie; Notice of Allowance for U.S. Appl. No. 16/164,933, filed Oct. 19, 2018, dated May 14, 2021, 24 pgs.
Waltermire, Jamie; Supplemental Notice of Allowance for U.S. Appl. No. 16/164,933, filed Oct. 19, 2018, dated May 26, 2021, 10 pgs.
Waltermire, Jamie; Supplemental Notice of Allowance for U.S. Appl. No. 16/164,933, filed Oct. 19, 2018, dated Jun. 16, 2021, 7 pgs.
Waltermire, Jamie; Certificate of Correction for U.S. Appl. No. 15/590,349, filed May 9, 2017, dated Jun. 1, 2021, 1 pg.
Waltermire, Jamie; Non-Final Office Action for U.S. Appl. No. 16/293,716, filed Mar. 6, 2019, dated Jul. 26, 2021, 26 pgs.
Waltermire, Jamie; Notice of Allowance for U.S. Appl. No. 16/526,555, filed Jul. 30, 2019, dated May 21, 2021, 32 pgs.
Waltermire, Jamie; Supplemental Notice of Allowance for U.S. Appl. No. 16/526,555, filed Jul. 30, 2019, dated Jun. 8, 2021, 13 pgs.
Waltermire, Jamie; Supplemental Notice of Allowance for U.S. Appl. No. 16/526,555, filed Jul. 30, 2019, dated Jul. 6, 2021, 7 pgs.
Waltermire, Jamie; Notice of Allowance for U.S. Appl. No. 16/381,678, filed Apr. 11, 2019, dated Jun. 3, 2021, 14 pgs.
Waltermire, Jamie; Notice of Allowance for U.S. Appl. No. 16/689,407, filed Nov. 20, 2019, dated Jul. 19, 2021, 12 pgs.
Sollie, Greg; Certificate of Correction for U.S. Appl. No. 15/845,540, filed Dec. 18, 2017, dated Jun. 1, 2021, 1 pg.
Collison, Alan B.; Applicant-Initiated Interview Summary for U.S. Appl. No. 17/123,673, filed Dec. 16, 2020, dated Jun. 24, 2021, 2 pgs.
Collison, Alan B.; Notice of Allowance for U.S. Appl. No. 17/123,673, filed Dec. 16, 2020, dated Jul. 1, 2021, 12 pgs.
Collison, Alan B.; Notice of Allowance for U.S. Appl. No. 17/123,676, filed Dec. 16, 2020, dated May 13, 2021, 93 pgs.
Collison, Alan B.; Supplemental Notice of Allowance for U.S. Appl. No. 17/123,676, filed Dec. 16, 2020, dated Jun. 1, 2021, 10 pgs.
Collison, Alan B.; Supplemental Notice of Allowance for U.S. Appl. No. 17/123,676, filed Dec. 16, 2020, dated Jun. 24, 2021, 7 pgs.
Sollie, Greg; Corrected Notice of Allowance for U.S. Appl. No. 15/988,550, filed May 24, 2018, dated May 10, 2021, 9 pgs.
Sollie, Greg; Corrected Notice of Allowance for U.S. Appl. No. 15/988,550, filed May 24, 2018, dated Jun. 11, 2021, 7 pgs.
Sollie, Greg; Advisory Action for U.S. Appl. No. 16/530,052, filed Aug. 2, 2019, dated Jun. 29, 2021, 15 pgs.
Sollie, Greg; Non-Final Office Action for U.S. Appl. No. 16/879,811, filed May 21, 2020, dated Jun. 22, 2021, 93 pgs.
Sollie, Greg; Notice of Allowance for U.S. Appl. No. 16/879,811, filed May 21, 2020, dated Jul. 7, 2021, 5 pgs.
Sollie, Greg; Corrected Notice of Allowance for U.S. Appl. No. 16/408,981, filed May 10, 2019, dated Jun. 16, 2021, 9 pgs.
Sollie, Greg; Notice of Allowance for U.S. Appl. No. 16/886,040, filed May 28, 2020, dated Jul. 7, 2021, 12 pgs.
Waltermire, Jamie; International Preliminary Report on Patentability for PCT Application No. PCT/US18/65464, filed Dec. 13, 2018, dated Jun. 24, 2021, 8 pgs.
Collison, Alan. B.; Extended European Search Report for application No. 21160713.0, filed Nov. 7, 2017, dated May 10, 2021, 7 pgs.
Sollie, Greg; International Preliminary Report on Patentability for PCT Application No. PCT/US19/60486, filed Nov. 18, 2019, dated May 27, 2021, 9 pgs.
Sollie, Greg; International Preliminary Report on Patentability for PCT Application No. PCT/US19/59764, filed Nov. 5, 2019, dated May 27, 2021, 9 pgs.
Waltermire, Jamie; Non-Final Office Action for U.S. Appl. No. 17/079,437, filed Oct. 24, 2020, dated Sep. 20, 2021, 108 pgs.
Waltermire, Jamie; Notice of Allowance for U.S. Appl. No. 16/164,933, filed Oct. 19, 2018, dated Aug. 9, 2021, 10 pgs.
Waltermire, Jamie; Requirement for Restriction/Election for U.S. Appl. No. 16/721,995, filed Dec. 20, 2019, dated Aug. 13, 2021, 6 pgs.
Waltermire, Jamie; Supplemental Notice of Allowance for U.S. Appl. No. 16/526,555, filed Jul. 30, 2019, dated Aug. 11, 2021, 8 pgs.
Waltermire, Jamie; Corrected Notice of Allowance for U.S. Appl. No. 16/381,678, filed Apr. 11, 2019, dated Aug. 9, 2021, 8 pgs.
Waltermire, Jamie; Examiner-Initiated Interview Summary for U.S. Appl. No. 16/381,678, filed Apr. 11, 2019, dated Aug. 30, 2021, 2 pgs.
Waltermire, Jamie; Corrected Notice of Allowance for U.S. Appl. No. 16/689,407, filed Nov. 20, 2019, dated Oct. 20, 2021, 8 pgs.
Waltermire, Jamie; Corrected Notice of Allowance for U.S. Appl. No. 16/689,407, filed Nov. 20, 2019, dated Aug. 20, 2021, 9 pgs.
Waltermire, Jamie; Final Office Action for U.S. Appl. No. 16/689,433, filed Nov. 20, 2019, dated Aug. 5, 2021, 23 pgs.
Collison, Alan B.; Non-Final Office Action for U.S. Appl. No. 17/181,377, filed Feb. 22, 2021, dated Jul. 1, 2021, 22 pgs.
Collison, Alan B.; Restriction Requirement for U.S. Appl. No. 17/181,377, filed Feb. 22, 2021, dated Apr. 22, 2021, 6 pgs.
Waltermire, Jamie; Notice of Allowance for U.S. Appl. No. 16/689,433, filed Nov. 20, 2019, dated Oct. 15, 2021, 14 pgs.
Colison, Alan B.; Corrected Notice of Allowance for U.S. Appl. No. 17/123,673, filed Dec. 16, 2020, dated Oct. 6, 2021, 8 pgs.
Collison, Alan B.; Corrected Notice of Allowance for U.S. Appl. No. 17/123,673, filed Dec. 16, 2020, dated Aug. 23, 2021, 9 pgs.
Collison, Alan B.; Supplemental Notice of Allowance for U.S. Appl. No. 17/123,676, filed Dec. 16, 2020, dated Sep. 13, 2021, 10 pgs.
Sollie, Greg; Final Office Action for U.S. Appl. No. 16/280,595, filed Feb. 20, 2019, dated Aug. 16, 2021, 21 pgs.
Sollie, Greg; Non-Final Office Action for U.S. Appl. No. 16/530,052, filed Aug. 2, 2019, dated Aug. 13, 2021, 22 pgs.

(56) References Cited

OTHER PUBLICATIONS

Sollie, Greg; Non-Final Office Action for U.S. Appl. No. 17/078,884, filed Oct. 23, 2020, dated Aug. 12, 2021, 105 pgs.
Sollie, Greg; Non-Final Office Action for U.S. Appl. No. 17/078,891, filed Oct. 23, 2020, dated Aug. 23, 2021, 104 pgs.
Sollie, Greg; Non-Final Office Action for U.S. Appl. No. 17/187,239, filed Feb. 26, 2021, dated Sep. 21, 2021, 99 pgs.
Sollie, Greg; Notice of Allowance for U.S. Appl. No. 17/187,239, filed Feb. 26, 2021, dated Oct. 13, 2021, 5 pgs.
Sollie, Greg; Corrected Notice of Allowance for U.S. Appl. No. 16/879,811, filed May 21, 2020, dated Oct. 6, 2021, 8 pgs.
Sollie, Greg; Corrected Notice of Allowance for U.S. Appl. No. 16/886,040, filed May 28, 2020, dated Oct. 7, 2021, 8 pgs.
Sollie, Greg; Corrected Notice of Allowance for U.S. Appl. No. 16/886,040, filed May 28, 2020, dated Aug. 20, 2021, 9 pgs.
Carlson, Dave; Article entitled: "FBA Updates Voluntary Standard For Recyclable Wax Alternatives", dated Aug. 14, 2013, Fiber Box Association (Year: 2013), 2 pgs.
Sollie, Greg; Non-Final Office Action for U.S. Appl. No. 17/100,819, filed Nov. 21, 2020, dated Sep. 29, 2021, 107 pgs.
Waltermire, Jamie; Notice of Allowance for U.S. Appl. No. 16/293,716, filed Mar. 6, 2019, dated Nov. 3, 2021, 20 pgs.
Waltermire, Jamie; Certificate of Correction for U.S. Appl. No. 16/526,555, filed Jul. 30, 2019, dated Nov. 16, 2021, 1 pg.
Waltermire, Jamie; Corrected Notice of Allowance for U.S. Appl. No. 16/689,433, filed Nov. 20, 2019, dated Nov. 12, 2021, 9 pgs.
Collison, Alan B.; Notice of Allowance for U.S. Appl. No. 17/181,377, filed Feb. 22, 2021, dated Oct. 21, 2021, 6 pgs.
MP Global Products LLC; Office Action for Chinese Patent Application No. 201780081689.7, dated May 14, 2021, 17 pgs.
MP Global Products, LLC; Decision on Rejection for Chinese patent application No. 201780081689.7, dated Sep. 23, 2021, 15 pgs.
Collison, Alan B.; Non-Final Office Action for U.S. Appl. No. 17/502,599, filed Oct. 15, 2021, dated Nov. 30, 2021, 6 pgs.
Sollie, Greg; Non-Final Office Action for U.S. Appl. No. 16/280,595, filed Feb. 20, 2019, dated Dec. 8, 2021, 17 pgs.
Sollie, Greg; Final Office Action for U.S. Appl. No. 16/530,052, filed Aug. 2, 2019, dated Dec. 8, 2021, 17 pgs.
Sollie, Greg; Notice of Allowance for U.S. Appl. No. 17/078,884, filed Oct. 23, 2020, dated Nov. 22, 2021, 12 pgs.
Sollie, Greg; Applicant-Initiated Interview Summary for U.S. Appl. No. 17/078,891, filed Oct. 23, 2020, dated Oct. 25, 2021, 2 pgs.
Sollie, Greg; Notice of Allowance for U.S. Appl. No. 17/078,891, filed Oct. 23, 2020, dated Dec. 1, 2021, 12 pgs.
Sollie, Greg; Notice of Allowance for U.S. Appl. No. 16/886,040, filed May 28, 2020, dated Nov. 18, 2021, 10 pgs.
MP Global Products, LLC; Office Action for Canadian patent application No. 3,043,192, filed Nov. 7, 2017, dated Oct. 25, 2021, 11 pgs.
Sollie, Greg; International Preliminary Reporton Patentability for PCT Application No. PCT/US20/24820, filed Mar. 26, 2020, dated Nov. 11, 2021, 13 pgs.
Waltermire, Jamie; Final Office Action for U.S. Appl. No. 17/079,437, filed Oct. 24, 2020, dated Feb. 24, 2022, 24 pgs.
Waltermire, Jamie; Non-Final Office Action for U.S. Appl. No. 16/530,045, filed Aug. 2, 2019, dated Feb. 10, 2022, 82 pgs.
Waltermire, Jamie; Non-Final Office Action for U.S. Appl. No. 16/721,995, filed Dec. 20, 2019, dated Dec. 27, 2021, 133 pgs.
Collison, Alan B.; Certificate of Correction for U.S. Appl. No. 17/123,676, filed Dec. 16, 2020, dated Jan. 4, 2021, 1 pg.
Collison, Alan B.; Notice of Allowance for U.S. Appl. No. 17/502,599, filed Oct. 15, 2021, dated Mar. 9, 2022, 94 pgs.
Sollie, Greg; Advisory Action for U.S. Appl. No. 16/530,052, filed Aug. 2, 2019, dated Mar. 9, 2022, 4 pgs.
Sollie, Greg; Certificate of Correction for U.S. Appl. No. 16/879,811, filed May 21, 2020, dated Feb. 8, 2022, 1 pg.
Waltermire, Jamie; Requirement for Restriction/Election for U.S. Appl. No. 17/127,050, filed Dec. 18, 2020, dated Apr. 14, 2022, 5 pgs.
Waltermire, Jamie; Requirement for Restriction/Election for U.S. Appl. No. 17/127,102, filed Dec. 18, 2020, dated Apr. 14, 2022, 6 pgs.
Sollie, Greg; Non-Final Office Action for U.S. Appl. No. 16/951,465, filed Nov. 18, 2020, dated May 13, 2022, 123 pgs.
Sollie, Greg; Final Office Action for U.S. Appl. No. 17/100,819, filed Nov. 21, 2020, dated Apr. 13, 2022, 39 pgs.
Collison, Alan B.; Certificate of Correction for U.S. Appl. No. 11,214,427, filed Dec. 16, 2020, dated Mar. 29, 2022, 1 pg.
Sollie, Greg; Certificate of Correction for U.S. Appl. No. 17/187,239, filed Feb. 26, 2021, dated Apr. 26, 2022, 1 pg.
MP Global Products, LLC; Office Action for Canadian patent application No. 3,043,192, filed Nov. 7, 2017, dated Apr. 8, 2022, 9 pgs.
Sollie, Greg; Notice of Allowance for Design U.S. Appl. No. 29/745,881, filed Aug. 10, 2020, dated May 9, 2022, 139 pgs.
Any Custom Box. Perforated Dispenser Boxes. Publication date unavailable. Visited May 2, 2022. https://anycustombox.com/folding-cartons/perforated-dispenser-boxes/, 9 pgs.
Massage Warehouse. Cando® Low Powder 100 Yard Perforated Dispenser. Publication date unavailable. Visited May 2, 2022. https://www.massagewarehouse.com/products/cando-perf-low-powder-1 DO-yd-dispenser/, 2 pgs.
Premier Storage. Oil & Fuel Absorbent Pads. Publication date unavailable. Visited May 2, 2022. https://www.premier-storage.co.uk/oil-and-fuel-absorbent-pads-bonded-and-perforated-double-weight.html, 1 pg.
Waltermire, Jamie; Notice of Allowance for U.S. Appl. No. 17/079,437, filed Oct. 24, 2020, dated Jun. 2, 2022, 21 pgs.
Waltermire, Jamie; Final Office Action for U.S. Appl. No. 16/530,045, filed Aug. 2, 2019, dated Jun. 9, 2022, 20 pgs.
Waltermire, Jamie; Non-Final Office Action for U.S. Appl. No. 16/721,995, filed Dec. 20, 2019, dated Jul. 5, 2022, 28 pgs.
Waltermire, Jamie; Non-Final Office Action for U.S. Appl. No. 17/127,050, filed Dec. 18, 2020, dated Jun. 17, 2022, 147 pgs.
Waltermire, Jamie; Non-Final Office Action for U.S. Appl. No. 17/127,102, filed Dec. 18, 2020, dated Jun. 27, 2022, 128 pgs.
Sollie, Greg; Restriction Requirement for U.S. Appl. No. 16/951,454, filed Nov. 18, 2020, dated Jun. 14, 2022, 6 pgs.
Sollie, Greg; Final Office Action for U.S. Appl. No. 16/280,595, filed Feb. 20, 2019, dated May 31, 2022, 27 pgs.
Sollie, Greg; Non-Final Office Action for U.S. Appl. No. 17/492,285, filed Oct. 1, 2021, dated Jul. 11, 2022, 109 pgs.
Sollie, Greg; Non-Final Office Action for U.S. Appl. No. 17/493, filed Oct. 4, 2021, dated Jul. 14, 2022, 110 pgs.
Sollie, Greg; Non-Final Office Action for U.S. Appl. No. 17/493,474, filed Oct. 4, 2021, dated Jul. 11, 2022, 112 pgs.
Collison, Alan B.; Office Action for Chinese patent application No. 2021107289972, filed Nov. 7, 2017, dated May 7, 2022, 20 pgs.
Waltermire, Jamie; Certificate of Correction for U.S. Appl. No. 16/293,716, filed Mar. 6, 2019, dated Aug. 30, 2022, 1 pg.
Sollie, Greg; Non-Final Office Action for U.S. Appl. No. 16/951,454, filed Nov. 18, 2020, dated Aug. 4, 2022, 165 pgs.
Solie, Greg; Final Office Action for U.S. Appl. No. 16/951,465, filed Nov. 18, 2020, dated Aug. 18, 2022, 20 pgs.

* cited by examiner

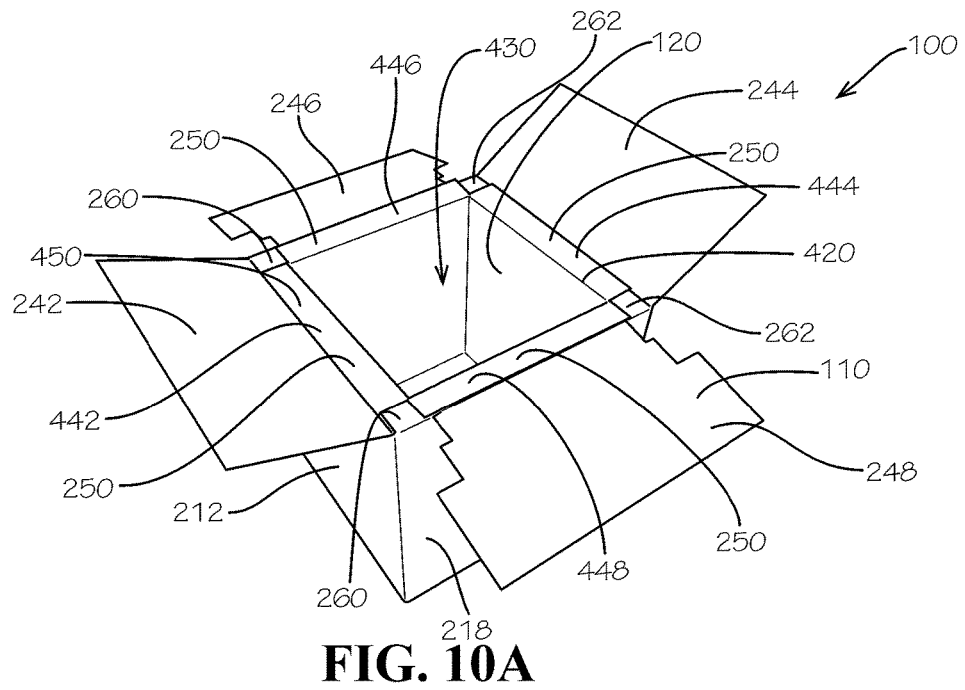
FIG. 10A
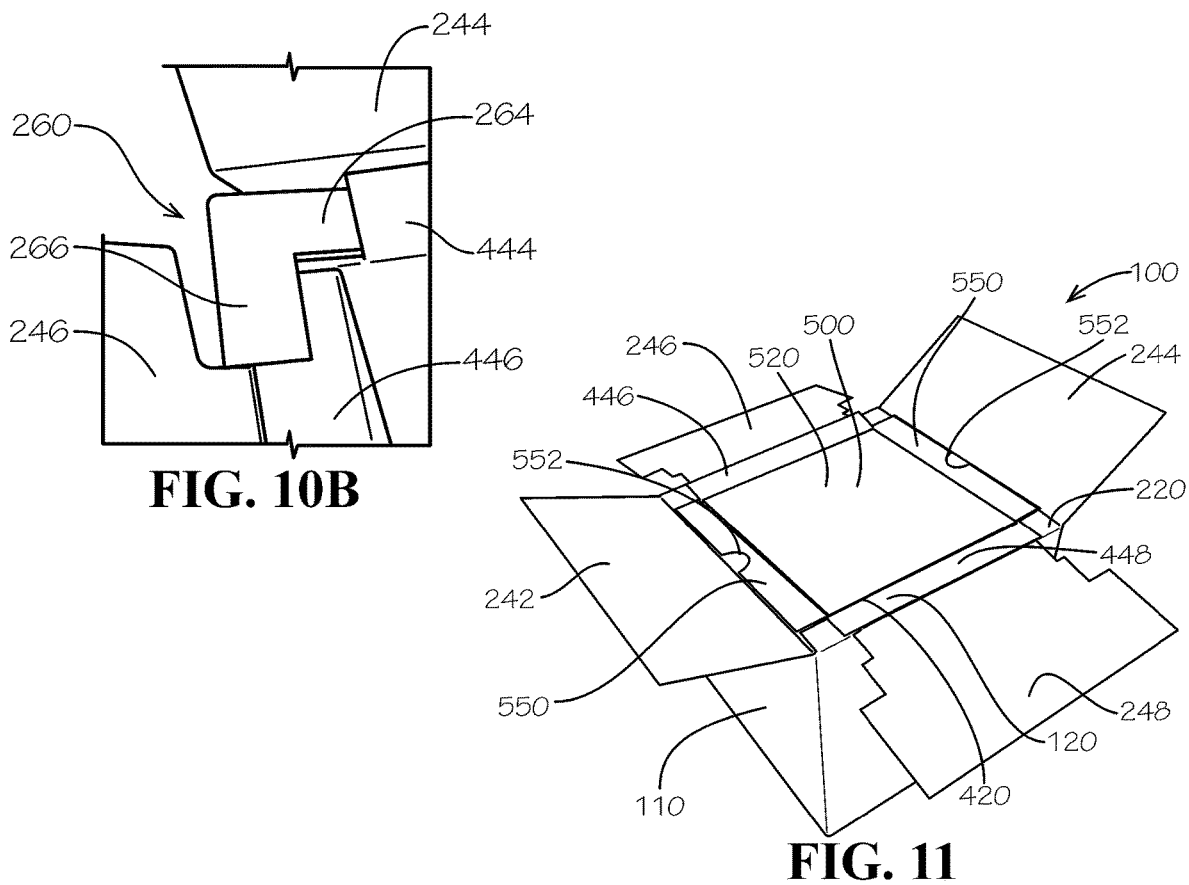
FIG. 10B
FIG. 11

INSULATED BOX ASSEMBLY AND TEMPERATURE-REGULATING LID THEREFOR

CROSS-REFERENCE TO RELATED APPLICATIONS

The present application is a continuation of U.S. application Ser. No. 16/408,981, filed May 10, 2019, which claims priority to U.S. Provisional Application No. 62/760,614, filed Nov. 13, 2018, and U.S. Provisional Application No. 62/802,480, filed Feb. 7, 2019, which are hereby specifically incorporated by reference herein in their entirety.

JOINT RESEARCH AGREEMENT

The subject matter disclosed was developed and the claimed invention was made by, or on behalf of, one or more parties to a joint research agreement between MP Global Products LLC of Norfolk, Nebr. and Pratt Retail Specialties, LLC of Conyers, Ga., that was in effect on or before the effective filing date of the claimed invention, and the claimed invention was made as a result of activities undertaken within the scope of the joint research agreement.

TECHNICAL FIELD

This disclosure relates to packaging. More specifically, this disclosure relates to an insulated box assembly and a temperature-regulating lid therefor.

BACKGROUND

Packaging perishable or temperature sensitive contents for storage or shipping can pose challenges. The contents can spoil, destabilize, freeze, melt, or evaporate during storage or shipping if the temperature of the contents is not maintained or the packaging is not protected from hot or cold environmental conditions. Contents such as food, pharmaceuticals, electronics, or other temperature sensitive items can be damaged if exposed to temperature extremes. Many insulated packages are bulky and difficult to store prior to use. Additionally, many insulated packages cannot be recycled and are often disposed of in landfills.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is temperature-regulating lid for an insulated box assembly comprising a lid box comprising a top panel, a bottom panel, and at least one side panel, and defining cavity; and a temperature-regulating insert positioned in the cavity.

Also disclosed is an insulated box assembly comprising an outer box comprising a bottom sidewall, a first top panel, and a first lateral sidewall extending between the bottom sidewall and the first top panel, the outer box defining an inner cavity and a top corner, the first top panel comprising a first cover tab adjacent to the top corner; and an insulating lining positioned within the inner cavity, the insulating lining defining a top corner portion, wherein the first cover tab of the first top panel covers the top corner portion.

A method for using an insulated box assembly is also disclosed, the method comprising providing an insulated box assembly, the insulated box assembly comprising an outer box defining an inner cavity, an inner box positioned in the inner cavity and defining a storage hollow, and an insulating lining positioned in the inner cavity between the outer box and the inner box; inserting contents into the storage hollow of the insulated box assembly; and sealing the insulating box assembly to retain the contents within the storage hollow.

Disclosed is an insulated box assembly comprising a plurality of outer lateral sidewalls, the outer lateral sidewalls defining an inner surface, the inner surface defining an inner cavity; a plurality of inner lateral sidewalls received in the inner cavity, the inner lateral sidewalls defining an outer surface; and a monolithic sidewall liner received in the inner cavity between the outer lateral sidewalls and the inner lateral sidewalls, the sidewall liner defining a liner outer surface and a continuous, uninterrupted liner inner surface opposite the liner outer surface, the liner outer surface facing the inner surface of the outer lateral sidewalls, and the liner inner surface facing the outer surface of the inner lateral sidewalls.

Disclosed is a method of assembling an insulated box assembly, the method comprising providing an outer box defining an inner cavity, an inner box defining a storage hollow, and an insulating lining comprising a resilient sidewall liner, the resilient sidewall liner defining a liner outer surface and a continuous, uninterrupted liner inner surface, each of the liner outer surface and liner inner surface extending from a first end of the sidewall liner to a second end of the sidewall liner; wrapping the sidewall liner around the inner box to position the first end adjacent to the second end, the liner inner surface facing the inner box; attaching the liner inner surface to the inner box; and inserting the inner box and sidewall liner into the inner cavity of the outer box, the sidewall liner oriented between the inner box and the outer box, the liner outer surface facing the outer box.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 10A illustrates a fourth step in the method of assembling the insulated box assembly of FIG. 1.

FIG. 10B illustrates the third step and fourth step according to another aspect of the present disclosure.

FIG. 11 illustrates a fifth step in the method of assembling the insulated box assembly of FIG. 1.

DETAILED DESCRIPTION

Figure 1:
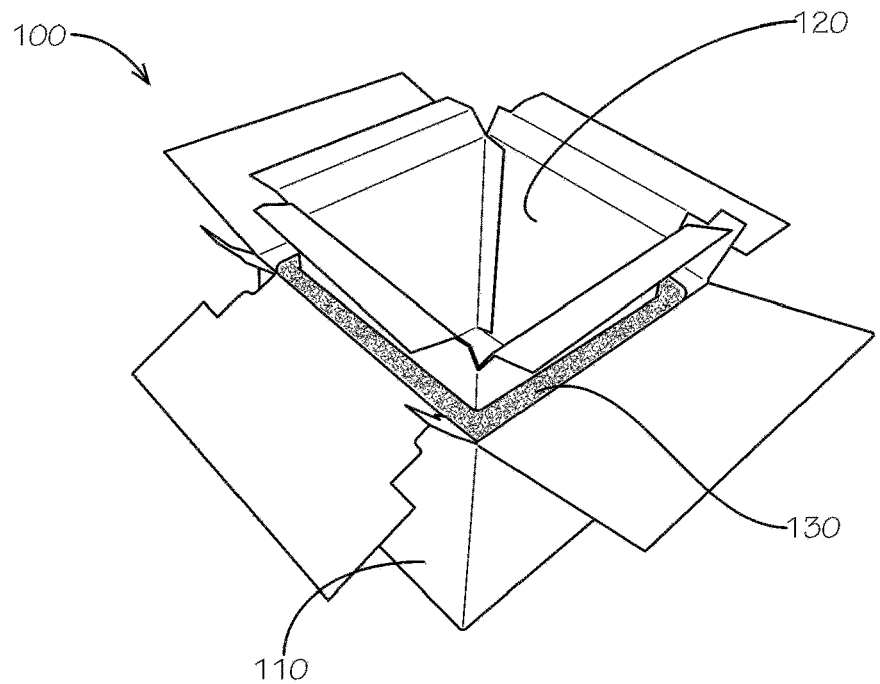
FIG. 1 is a top perspective view of an insulated box assembly comprising an outer box, and inner box, and an insulating lining, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a temperature-regulating lid and associated methods, systems, devices, and various apparatus. Example aspects of the temperature-regulating lid can comprise a lid box. Example aspects can also comprise a temperature-regulating insert. It would be understood by one of skill in the art that the disclosed insulating lid is described in but a few exemplary aspects among many. No particular terminology or description should be considered limiting on the disclosure or the scope of any claims issuing therefrom.

FIG. 1 illustrates top perspective view of a first aspect an insulated box assembly 100, according to the present disclosure. As shown, the insulated box assembly 100 can comprise an outer box 110, an inner box 120, and an insulating lining 130. According to example aspects, the inner box 120 can be positioned within an inner cavity 230 (shown in FIG. 2A) of the outer box 110, and the insulating lining 130 can be positioned therebetween. The inner box 120 can define a storage hollow 430 (shown in FIG. 4A) for housing contents therein, such as, for example, perishable foods, pharmaceuticals, and other temperature-sensitive items. The insulating lining 130 can provide cushioning and climate control for the inner box 120 and the contents therein.

Figure 2A:
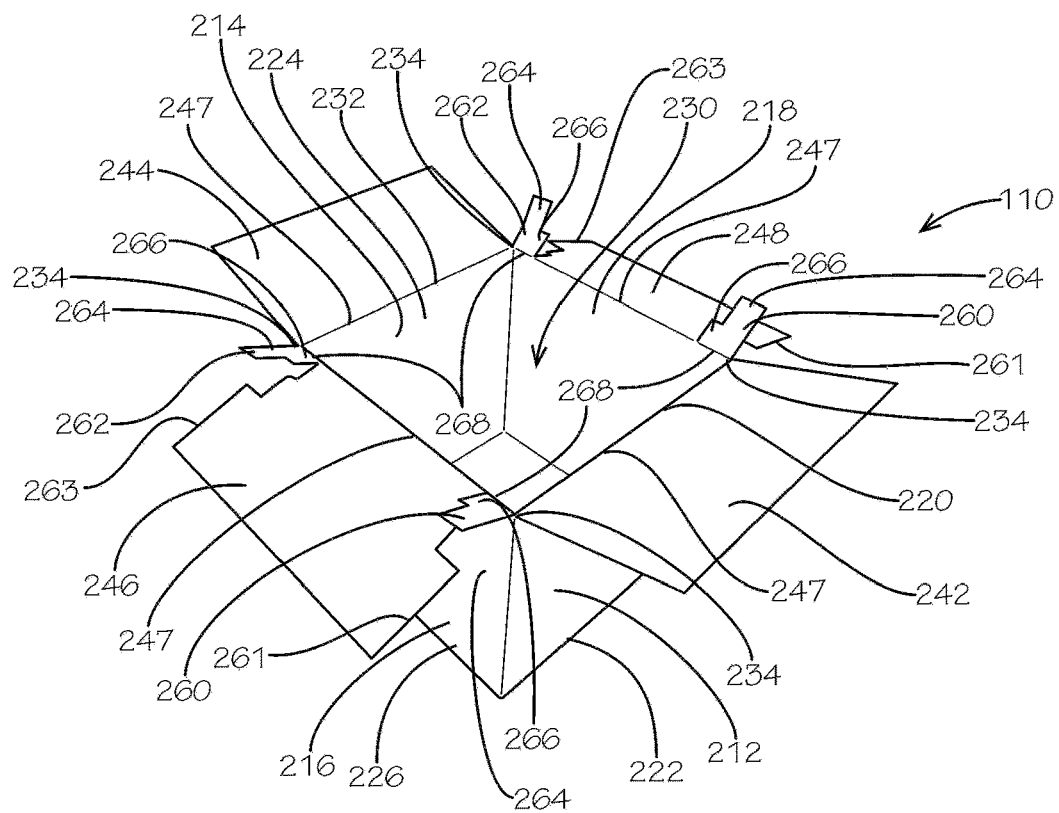
FIG. 2A is a top perspective view of the outer box of FIG. 1, wherein top panels of the outer box are in an open orientation.

FIG. 2A illustrates top perspective view of an example aspect of the outer box 110. The outer box 110 can define a front lateral sidewall 212, a back lateral sidewall 214, a left lateral sidewall 216, and a right lateral sidewall 218. The lateral sidewalls 212,214,216,218 can define a top end 220 of the outer box 110 and a bottom end 222 of the outer box 110. Further, the lateral sidewalls 212,214,216,218 can define an inner surface 224 and an outer surface 226 of the outer box 110. The inner surface 224 can define an inner cavity 230, as shown. Moreover, a top opening 232 can be formed at the top end 220 of the outer box 110, and a bottom opening 382 (shown in FIG. 3A) can be formed at the bottom end 222 of the outer box 110. The lateral sidewalls 212,214,216,218 can form four top corners 234 at the top opening 232 and four bottom corners 384 (shown in FIG. 3B) at the bottom opening 382. The use of the directional terms herein, such as right, left, front, back, top, bottom, and the like can refer to the orientation shown and described in the corresponding figures.

Example aspects of the outer box 110 can comprise a front top panel 242 extending from the front lateral sidewall 212 at the top end 220 of the outer box 110 and a back top panel 244 extending from the back lateral sidewall 214 at the top end 220 of the outer box 110. The outer box 110 also can comprise a left top panel 246 extending from the left lateral sidewall 216 at the top end 220 and a right top panel 248 extending from the right lateral sidewall 218 at the top end 220. According to example aspects, each of the top panels 242,244,246,248 can be monolithically formed with the outer box 110 and can be connected to the corresponding lateral sidewalls 212,214,216,218, respectively, at a bend line 247.

In example aspects, the right top panel 248 can define a first cover tab 260 at a first end 261 and a second cover tab 262 at a second end 263. The left top panel 246 can also define a first cover tab 260 at a first end 261 and a second cover tab 262 at a second end 263. As such, a first or second cover tab 260,262 can be formed proximate each of the top corners 234 of the outer box 110, respectively. In example aspects, each of the first and second cover tabs 260,262 can be substantially L-shaped, as shown. The L-shaped first and second cover tabs 260,262 can define a leg 264 extending in a first direction and an arm 266 extending in a substantially perpendicular second direction. In the present aspect, the arm 266 can define and arm length that can be shorter than a leg length of the leg 264. However, in other aspects, the arm length of the arm 266 can be about equal to or greater than the leg length of the leg 264. In other aspects, the first and second cover tabs 260,262 can define any other suitable shape, including, but not limited to, a lowercase l-shape.

Referring specifically to the right top panel 248, a proximal end of each of the first and second cover tabs 260,262 can be connected to the corresponding right lateral sidewall 218 at a bend line 268, such that the first and second cover tabs 260,262 can fold relative to the right lateral sidewall 218. In some aspects, the first and second cover tabs 260,262 can be monolithically formed with the right top panel 248 and can be connected to the right top panel 248 at a tear line (not shown). Example aspects of the tear line can be defined by perforations, slits, scoring, creases, or the like, which can facilitate tearing along the tear line, such that the first and second cover tabs 260,262 can be separated from the right top panel 248, as shown. In other aspects, the first and second cover tabs 260,262 can be monolithically formed with the right top panel 248 and can be cut away from the right top panel 248 by a cutting tool, such as a cutting machine, scissors, a blade, or the like. In still other aspects, the first and second cover tabs 260,262 can be separately formed from the right top panel 248. According to example aspects, the first and second cover tabs 260,262 of the left top panel 246 can be substantially the same as the first and second cover tabs 260,262 of the right top panel 248.

Figure 2B:
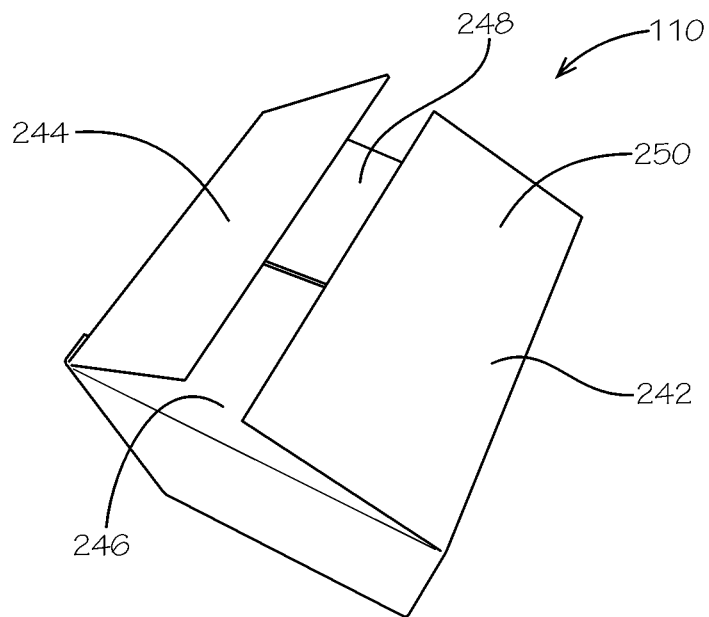
FIG. 2B is a top perspective view of the outer box of FIG. 1, wherein top panels of the outer box are in a partially closed orientation.

Example aspects of the top panels 242,244,246,248 can be oriented in an open orientation, as shown in FIG. 2A, wherein the top opening 232 is uncovered, and a closed orientation, wherein the top opening 232 is covered. FIG. 2B illustrates the top panels 242,244,246,248 in a partially closed orientation. According to example aspects, in the closed orientation, the right top panel 248 and left top panel 246, including the corresponding first and second cover tabs 260,262 (shown in FIG. 2A), can be configured to fold toward the top opening 232 (shown in FIG. 2A) to cover or partially cover the top opening 232. The front top panel 242 and back top panel 244 can then be folded towards the top opening 232 to cover or partially cover the right top panel 248 and the left top panel 246. In the fully closed orientation, the top opening 232 (shown in FIG. 2A) can be completely covered and the top panels 242,244,246,248 can define a top sidewall 250 of the outer box 110. Example aspects of the top sidewall 250 can be oriented about perpendicular to the lateral sidewalls 212,214,216,218 when the top panels 242, 244,246,248 are secured in the closed orientation.

In various aspects, the front and back top panels 242,244 can be secured to the left and right top panels 246,248 by a fastener, such as an adhesive. The adhesive can be, for example, glue, an epoxy, tape, or the like; however, in other aspects, the front and back top panels 242,244 can be secured to the left and right top panels 246,248 by another fastener, such as stitching, staples, snaps, hook and loop fasteners, ties, etc. In still other aspects, the front and back top panels 242,244 may not be secured to the left and right top panels 246,248. Example aspects of the front and back top panels 242,244 also can be secured to one another (or otherwise secured in the closed orientation) by a fastener, such as tape, or another adhesive. In other aspects, the front and back top panels 242,244 can be secured in the closed orientation by another suitable fastener, such as, stitching, staples, snaps, ties, hook and loop fasteners, etc., and in still other aspects, the front and back top panel 242,244 may not be secured to one another at all. In some aspects, any or all of the top panels 242,244,246,248 can be secured to one or all of the laterals sidewalls 212,214,216,218.

Figure 3A:
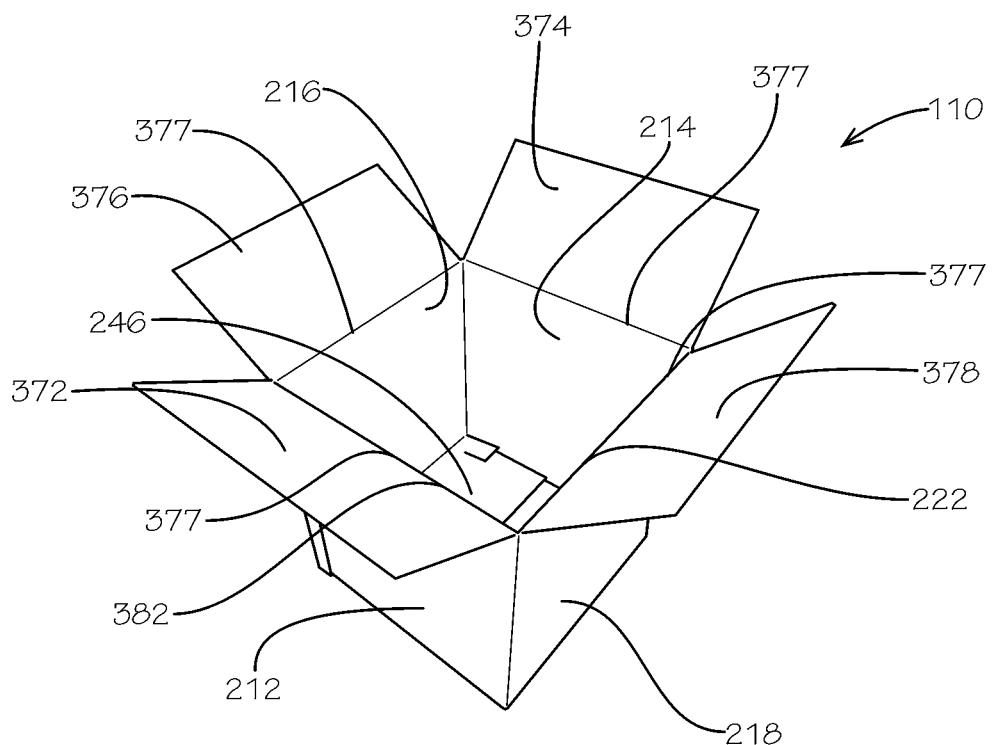
FIG. 3A is a bottom perspective view of the outer box of FIG. 1, wherein bottom panels of the outer box are in an open orientation.

FIG. 3A illustrates a bottom perspective view of the outer box 110. As shown, the outer box 110 can comprise a front bottom panel 372 extending from the front lateral sidewall 212 at the bottom end 222 of the outer box 110 and a back bottom panel 374 extending from the back lateral sidewall 214 at the bottom end 222 of the outer box 110. The outer box 110 also can comprise a left bottom panel 376 extending from the left lateral sidewall 216 at the bottom end 222 and a right bottom panel 378 extending from the right lateral sidewall 218 at the bottom end 222. According to example aspects, each of the bottom panels 372,374,376,378 can be connected to the corresponding lateral sidewalls 212,214, 216,218, respectively, by a bend line 377.

Figure 3B:
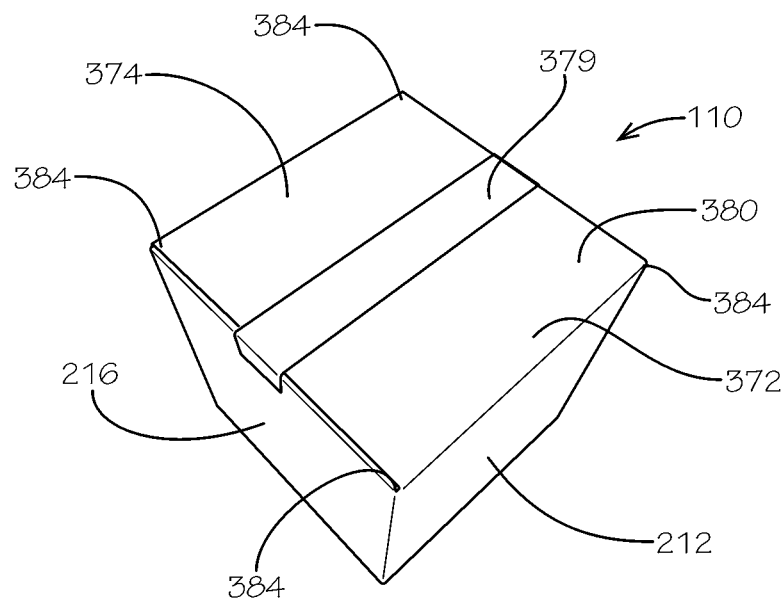
FIG. 3B is a bottom perspective view of the outer box of FIG. 1, wherein bottom panels of the outer box are in a closed orientation.

Example aspects of the bottom panels 372,374,376,378 can be oriented in an open orientation, as shown in FIG. 3A, wherein the bottom opening 382 is uncovered, and a closed orientation, as shown in FIG. 3B, wherein the bottom opening 382 is covered. According to example aspects, each of the front bottom panel 372, back bottom panel 374, left bottom panel 376, and right bottom panel 378 can be folded in substantially the same manner as the top panels 242,244, 246,248 (shown in FIG. 2A). Referring to FIG. 3B, in the closed orientation, the bottom opening 382 (shown in FIG. 3A) can be completely covered and the bottom panels 372,374,376,378 (left and right bottom panels 376,378 shown in FIG. 3A) can define a bottom sidewall 380 of the outer box 110. Example aspects of the bottom sidewall 380 can be oriented about perpendicular to the lateral sidewalls 212,214,216,218 (back and right lateral sides 214,218 shown in FIG. 2A). In various aspects, the front and back bottom panels 372,374 can be secured to the left and right bottom panels 376,378 by a fastener, as described above with respect to the left and right top panels 246,248. Furthermore, example aspects of the front and back bottom panels 372,374 can be secured to one another by a fastener, such as tape 379, as shown, as described above with respect to the front and back top panels 242,244 (shown in FIG. 2A).

The outer box 110 of the present aspect can comprise the four lateral sidewalls 212,214,216,218 and can define a substantially square cross-sectional shape. However, in other aspects, the number of lateral sidewalls can vary and/or the cross-section shape of the outer box 110 can vary—for example, the outer box 110 can define a triangular, rectangular, or circular cross-sectional shape, or any other suitable cross-sectional shape. The outer box 110 of the present aspect can also comprise the four top panels 242, 244,246,248 and the four bottom panels 372,374,376,378; however, other aspects of the outer box 110 can comprise more or fewer top panels and/or bottom panels.

Figure 4A:
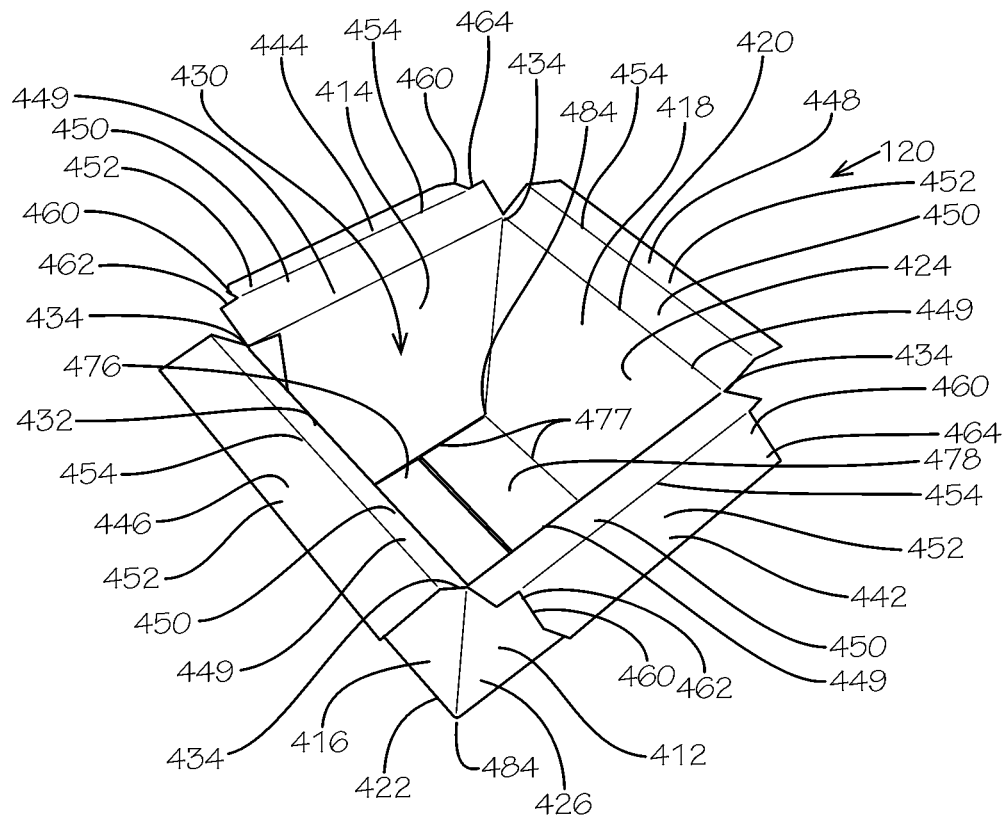
FIG. 4A is a top perspective view of the inner box of FIG. 1.

FIG. 4A illustrates a top perspective view of the inner box 120 of the insulated box assembly 100 (shown in FIG. 1). The inner box 120 can define a front lateral sidewall 412, a back lateral sidewall 414, a left lateral sidewall 416, and a right lateral sidewall 418. The lateral sidewalls 412,414,416, 418 can define a top end 420 of the inner box 120 and a bottom end 422 of the inner box 120. Further, the lateral sidewalls 412,414,416,418 can define an inner surface 424 of the inner box 120 and an outer surface 426 of the inner box 120. The inner surface 424 can define a storage hollow 430, as shown. Moreover, a top opening 432 can be formed at the top end 420 of the inner box 120, and a bottom opening (not shown) can be formed at the bottom end 422 of the inner box 120. The lateral sidewalls 412,414,416,418 can form four top corners 434 at the top opening 432 and four bottom corners 484 at the bottom opening (only two of the four bottom corners 484 are visible).

Example aspects of the inner box 120 can comprise a front top flap 442 extending from the front lateral sidewall 412 at the top end 420 of the inner box 120 and a back top flap 444 extending from the back lateral sidewall 414 at the top end 420 of the inner box 120. The inner box 120 also can comprise a left top flap 446 extending from the left lateral sidewall 416 at the top end 420 and a right top flap 448 extending from the right lateral sidewall 418 at the top end 420. According to example aspects, each of the top flaps 442,444,446,448 can be monolithically formed with the inner box 120 and can be connected to the corresponding lateral sidewall 412,414,416,418, respectively, at a bend line 449, such that each of the top flaps 442,444,446,448 can fold relative to the corresponding lateral sidewall 412,414,416, 418.

As shown, each of the top flaps 442,444,446,448 can define a first flap section 450 proximate to the corresponding lateral sidewall 412,414,416,418, and a second flap section 452 distal from the corresponding lateral sidewall 412,414, 416,418. The second flap section 452 can be connected to the first flap section 450 at a bend line 454, such that the second flap section 452 can fold relative to the first flap section 450. In some aspects of the top flaps 442,444,446, 448, an indentation 460 can be defined at a first end 462 and second end 464 of the second flap section 452, such that the second flap section 452 can define a width that can be less than a width of the first flap section 450. For example, as shown, the front and back top flaps 442,444 can comprise the second flap section 452 comprising an indentation 460 at each of the first end 462 and second end 464, and thus can define a shorter width than the first flap section 450.

The inner box 120 can comprise a front bottom panel 472 (shown in FIG. 4B) extending from the front lateral sidewall 412 at the bottom end 422 and a back bottom panel 474 (shown in FIG. 4B) extending from the back lateral sidewall 414 at the bottom end 422. The inner box 120 can also comprise a left bottom panel 476 extending from the left lateral sidewall 416 at the bottom end 422 of the inner box 120 and a right bottom panel 478 extending from the right lateral sidewall 418 at the bottom end 422 of the inner box 120. According to example aspects, each of the bottom panels 472,474,476,478 can be connected to the corresponding lateral sidewalls 412,414,416,418, respectively, by a bend line 477.

Figure 4B:
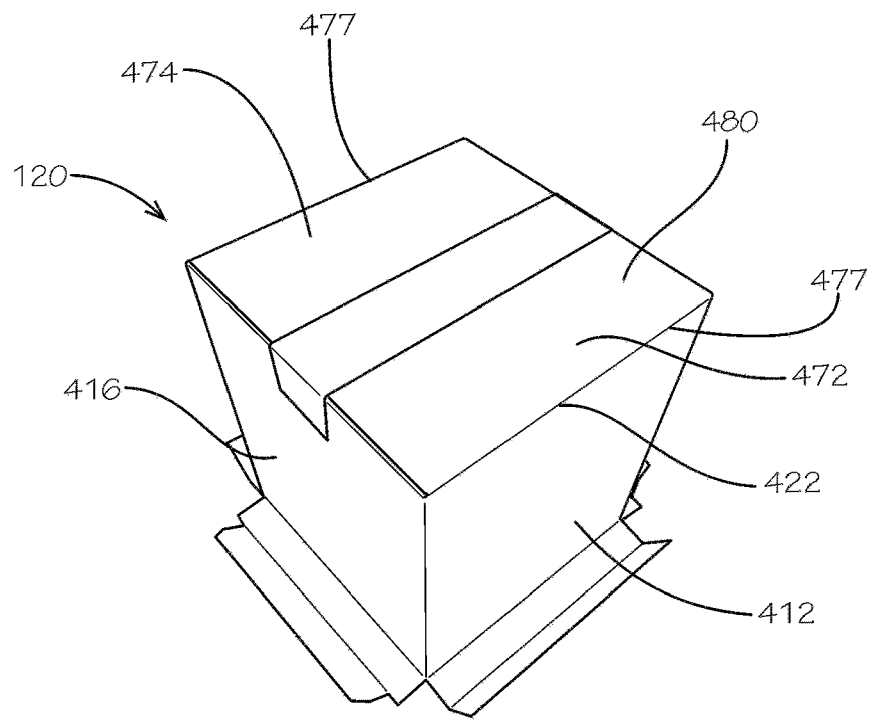
FIG. 4B is a bottom perspective view of the inner box of FIG. 1.

According to example aspects, each of the bottom panels 472,474,476,478 of the inner box 120 can be folded and secured in a closed orientation in substantially the same manner as the top panels 242,244,246,248 and bottom panels 372,374,376,378 of the outer box 110, as described above with reference to FIGS. 2B and 3B. Referring to FIG. 4B, in the closed orientation, the bottom opening (not shown) can be completely covered and the bottom panels 472,474,476,478 (left and right bottom panels 476,478 shown in FIG. 4A) can define a bottom sidewall 480 of the inner box 120. Example aspects of the bottom sidewall 480 can be oriented about perpendicular to the lateral sidewalls 412,414,416,418 (back and right lateral sidewalls 414,418 shown in FIG. 4A).

Figure 5A:
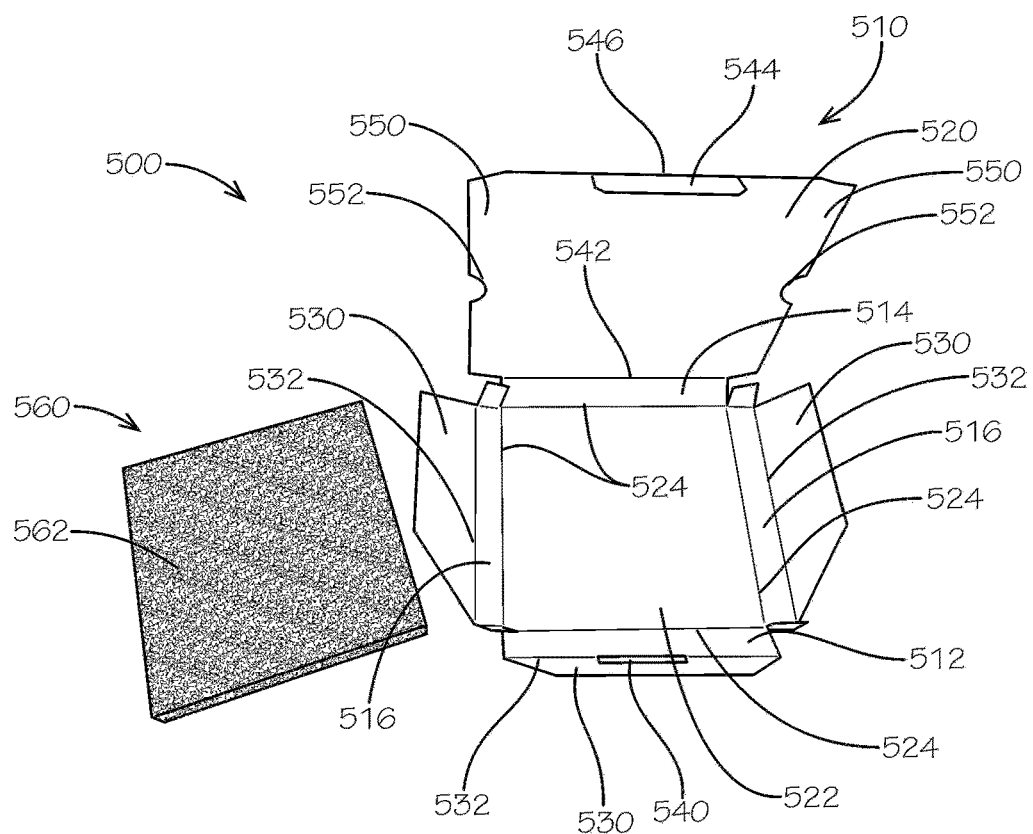
FIG. 5A is a top perspective view of an temperature-regulating lid in an open orientation, according to an aspect of the present disclosure.

Example aspects of the insulated box assembly 100 (shown in FIG. 1) can comprise an temperature-regulating lid 500, as shown in FIG. 5A. The temperature-regulating lid 500 can be oriented in an open orientation, as shown in FIG. 5A, and a closed orientation, as shown in FIG. 5C. The temperature-regulating lid 500 can comprise a lid box 510 and an insulating lid liner 560. Example aspects of the temperature-regulating lid 500 can define a front side flap 512, a back side flap 514, a left side flap 516, a right side flap 518, a top panel 520, and a bottom panel 522. Each of the side flaps 512,514,516,518 can be connected to the bottom panel 522 by a bend line 524. Each of the right side flap 518, left side flap 516, and front side flap 512 can define an extension flap 530 extending therefrom distal from the bottom panel 522. The extension flaps 530 can be connected to the corresponding side flaps 512,516,518 by a bend line 532. A slot 540 can be formed at the bend line 532 between the front side flap 512 and the corresponding extension flap 530, as shown.

Example aspects of the top panel 520 can extend from the back side flap 514 distal from the bottom panel 522 and can be connected to the back side flap 514 by a bend line 542. A locking tab 544 can extend from the top panel 520 distal from the back side flap 514 and can be connected thereto by a bend line 546. In some aspects, the top panel 520 can define a width great than a width of the bottom panel 522, as shown. The width of the bottom panel 522 can generally define a width of the lid box 510. The portions of the top panel 520 extending beyond the width of the lid box 510 can be defined as wings 550 of the top panel 520. Example aspects of the wings 550 can be monolithically formed with the top panel 520. In some aspects, one or each of the wings 550 can define a cut-out 552.

According to example aspects, as the lid liner 560 can define a bottom surface 562 and a top surface (not shown), which can be substantially planar and parallel to one another. The lid liner 560 can be received on the bottom panel 522, such that the bottom surface 562 of the lid liner 560 faces the bottom panel 522. Example aspects of the lid liner 560 can comprise, for example, R-4 poly-encapsulated thermal 100% recycled cotton. Other aspects of the lid liner 560 can comprise, for example, polyester film, such as polyethylene terephthalate (PET) film, foams, pellets, fabrics, nonwovens, polyethylene, polyurethane, polypropylene or any other suitable material that can contribute towards a cushioned and climate controlled protective layer in the insulated box assembly 100. In some aspects, the lid liner 560 can be biodegradable, and in some aspects, the lid liner 560 can be compostable.

Figure 5B:
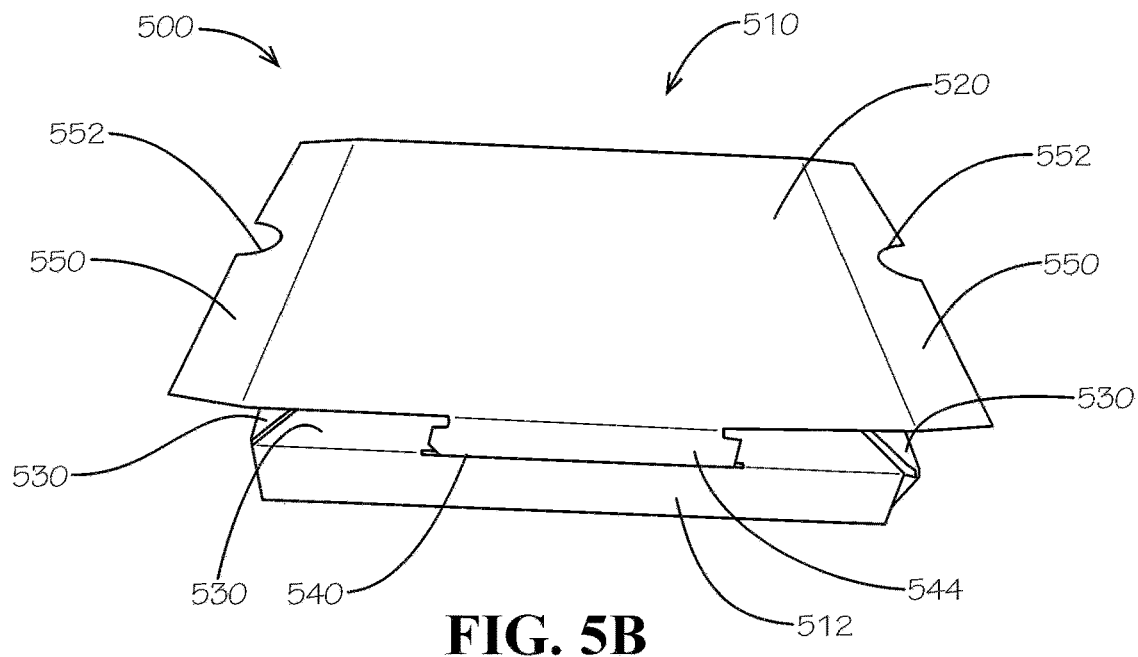
FIG. 5B is a top perspective view of the temperature-regulating lid of FIG. 5A in a closed orientation.

FIG. 5B illustrates the temperature-regulating lid 500 in the closed configuration. The extension flaps 530 can be folded over the lid liner 560 (shown in FIG. 5A) to rest on the top surface (not shown) of the lid liner 560. The top panel 520 of the lid box 510 can also be folded over the lid liner 560 to rest on the extension panels 530 and the top surface of the lid liner 560. The locking tab 544 can be inserted through the slot 540 to maintain the temperature-regulating lid 500 in an assembled configuration, as shown. The wings 550 can extend beyond the width of the of the lid box 510, as defined by the bottom panel 522 (shown in FIG. 5A).

Figure 6A:
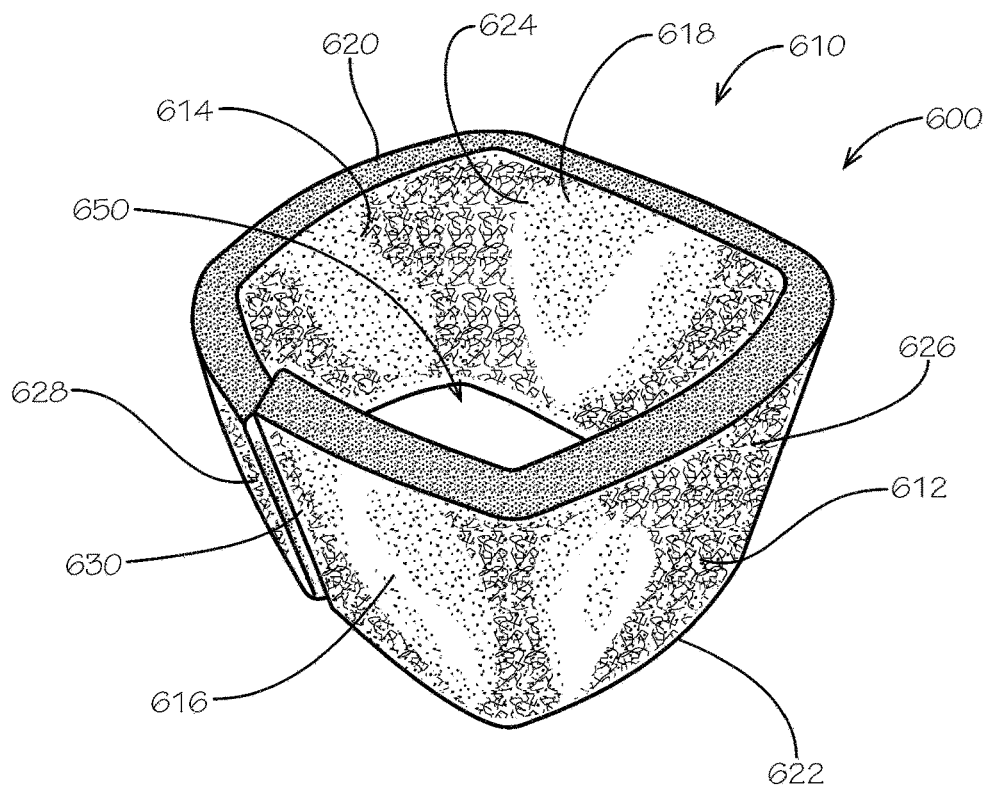
FIG. 6A is top perspective view of a sidewall liner of the insulating liner of FIG. 1.
Figure 6B:
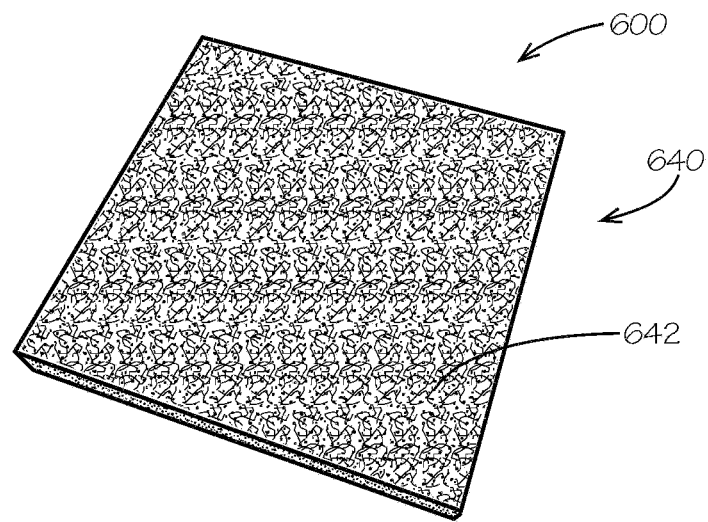
FIG. 6B is a top perspective view of a bottom wall liner of the insulating liner of FIG. 1.

Referring to FIG. 6A, example aspects of the insulating lining 130 (shown in FIG. 1) can comprise one or more liners 600. In the present aspect, the insulating lining 130 can comprise a sidewall liner 610, as shown in FIG. 6A, and a bottom wall liner 640, as shown in FIG. 6B. The sidewall liner 610 can define a top end 620, a bottom end 622, an inner surface 624, outer surface 626, a first end 628, and a second end 630. The first end 628 can be folded towards the second end 630 to generally form a front lateral side 612, a back lateral side 614, a left lateral side 616, and a right lateral side 618, as shown. As such, the sidewall liner 610 can generally define a square cross-sectional shape when folded and can define an inner lining cavity 650. Referring to FIG. 6B, the bottom wall liner 640 can define a substantially planar bottom liner surface 642 and a substantially planar top liner surface 744 (shown in FIG. 7). In example aspects, the sidewall liner 610 and bottom wall liner 640 can positioned between the outer box 110 (shown in FIG. 1) and the inner box 120 (shown in FIG. 1) to provide both cushioning and climate control for the inner box 120, as will be described in further detail below. In other aspects, the insulating lining 130 can comprise more or fewer separate liners 600 and/or the liners 600 can define a different configuration.

Various aspects of the liners 600 (e.g., the sidewall liner 610 and bottom wall liner 640) of the insulating lining 130 (shown in FIG. 1) and can comprise materials including, but not limited to, polyester film, such as polyethylene terephthalate (PET) film, foams, rubber, fiberglass, mineral wool, pellets, fabrics, nonwovens, polyethylene, polyurethane, polypropylene, paper, paper fiber, and any other suitable material that can contribute towards a cushioned and climate controlled protective layer in the insulated box assembly 100. In some aspects, the sidewall liner 610 and/or bottom wall liner 640 can be biodegradable, and in some aspects, the sidewall liner 610 and/or bottom wall liner 640 can be compostable. In a particular aspect, the sidewall liner 610 and bottom wall liner 640 can be formed from R-4 poly-encapsulated thermal 100% recycled cotton.

In the present application, the insulating lining 130 and insulating lid liner 560 can be repulpable. In the present aspect, the insulated box assembly 100 can be 100% recyclable. In the present aspect, the insulated box assembly 100 can be single-stream recyclable wherein all materials comprised by the insulated box assembly 100 can be recycled by a single processing train without requiring separation of any materials or components of the insulated box assembly 100. In the present aspect, the insulated box assembly 100 can be compostable. In the present aspect, the insulated box assembly 100 can be repulpable. In the present aspect, the insulated box assembly 100 and each of the outer box 110, inner box 120, insulating lining 130, and the temperature-regulating lid 500 can be repulpable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill. which is hereby incorporated in its entirety. In the present aspect, insulated box assembly 100 and each of the outer box 110, inner box 120, insulating lining 130, and the temperature-regulating lid 500 can be recyclable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill.

Recyclable and repulpable insulation materials are further described in U.S. patent application Ser. No. 15/677,738, filed Aug. 15, 2017, U.S. Provisional Patent Application No. 62/375,555, filed Aug. 16, 2016, U.S. Provisional Patent Application No. 62/419,894, filed Nov. 9, 2016, and U.S. Provisional Patent Application No. 62/437,365, filed Dec. 21, 2016, which are each incorporated by reference in their entirety herein.

Figure 7:
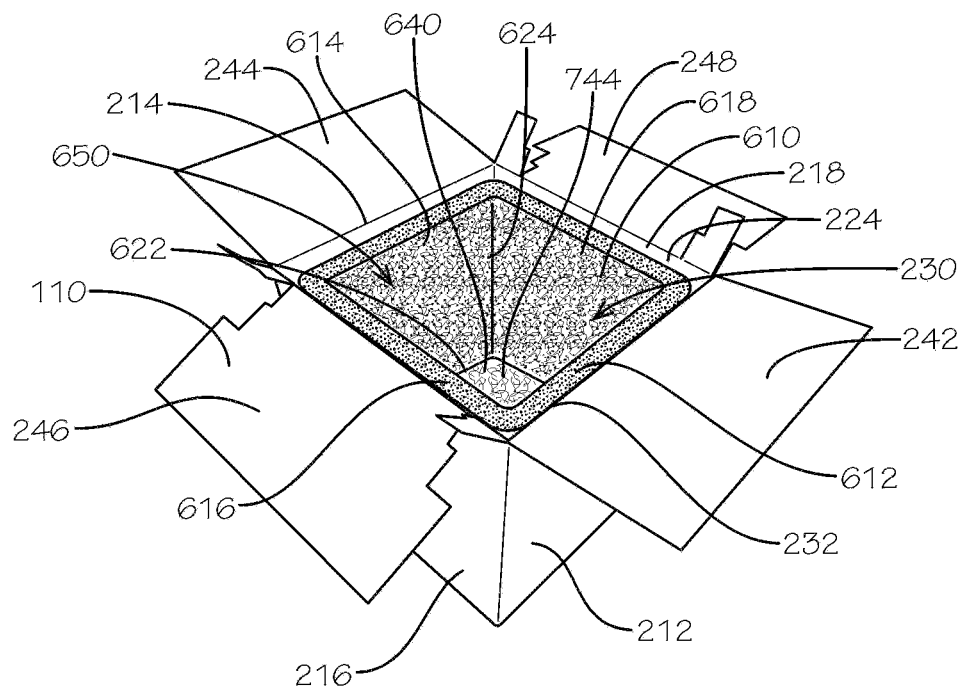
FIG. 7 illustrates a first step in a method of assembling the insulated box assembly of FIG. 1.

FIG. 7 illustrates a first step in assembling the insulated box assembly 100 (shown in FIG. 1). In the present aspect, the bottom panels 372,374,376,378 (shown in FIG. 3A) of the outer box 110 can be folded to the closed orientation define the bottom sidewall 380 (shown in FIG. 3B), as described above with reference to FIG. 3B, and the top panels 242,244,246,248 of the outer box 110 can be in the open orientation. The sidewall liner 610 and bottom wall liner 640 of the insulating lining 130 can be positioned within the inner cavity 230. With the insulating lining 130 positioned in the inner cavity 230 of the outer box 110, a volume of the inner cavity 230 can be reduced, and can be defined as the lining cavity 650. The outer surface 626 (shown in FIG. 6A) of the sidewall liner 610 can face the inner surface 224 of the outer box 110, and the inner surface 624 of the sidewall liner 610 can face the lining cavity 650. According to example aspects, the front lateral side 612 of the sidewall liner 610 can face the front lateral sidewall 212 of the outer box 110, as shown. Similarly, the left lateral side 616 can face the left lateral sidewall 216, the back lateral side 614 can face the back lateral sidewall 214, and the right lateral side 618 can face the right lateral sidewall 218. The bottom liner surface 642 (shown in FIG. 6B) of the bottom wall liner 640 can face the inner surface 224 of the outer box 110, and the top liner surface 744 of the bottom wall liner 640 can face the liner cavity 450, as shown. Specifically, the bottom liner surface 642 of the bottom wall liner 640 can face the bottom sidewall 380 (shown in FIG. 3B) of the outer box 110. In example aspects, each of the lateral sides 612,614,616,618 of the sidewall liner 610 can contact the corresponding lateral sidewalls 212,214,216,218 of the outer box 110, and the bottom liner surface 642 of the bottom wall liner 640 can contact the bottom sidewall 380 of the outer box 110. In example aspects, the bottom wall liner 640 can be inserted through the top opening 232 of the outer box 110, and then the sidewall liner 610 can be inserted through the top opening 232 of the outer box 110, such that the bottom end 622 of the sidewall liner 610 can rest on the top liner surface 744 of the bottom wall liner 640. In other aspects, the sidewall liner 610 and bottom wall liner 640 can be inserted into the inner cavity 230 of the outer box 110 in reverse order.

Figure 8:
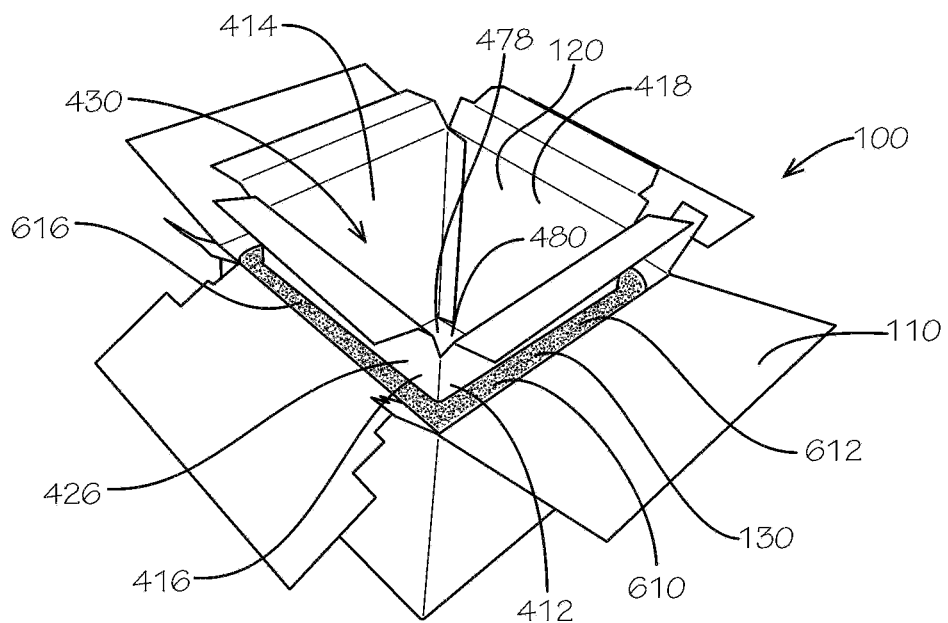
FIG. 8 illustrates a second step in the method of assembling the insulated box assembly of FIG. 1.

FIG. 8 illustrates a second step in assembling the insulated box assembly 100. The inner box 120 can be positioned within the lining cavity 650 (shown in FIG. 6A), such that the outer surface 426 of the inner box 120 can face the inner surface 624 (shown in FIG. 6A) of the sidewall liner 610. According to example aspects, the front lateral sidewall 412 of the inner box 120 can face the front lateral side 612 of the sidewall liner 610, as shown. Similarly, the left lateral sidewall 416 can face the left lateral side 616, the back lateral sidewall 414 can face the back lateral side 614 (shown in FIG. 6A), and the right lateral sidewall 418 can face the right lateral side 618 (shown in FIG. 6A). As such, the sidewall liner 610 can substantially wrap around the lateral sidewalls 412,414,416,418 of the inner box 120. Further, the bottom panels 472,474,476,478 (front, back, and left bottom panels 472,474,476 shown in FIGS. 4A and 4B) of the inner box 120 can be folded to the closed orientation, as described above with reference to FIG. 4B, to define the bottom sidewall 480 of the inner box 120. The bottom sidewall 480 can face the top liner surface 744 (shown in FIG. 7) of the bottom wall liner 640 (shown in FIG. 6B) of the insulating lining 130. In example aspects, each of the lateral sidewalls 412,414,416,418 of the inner box 120 can contact the corresponding lateral sides 612, 614,616,618 of the sidewall liner 610, and the bottom sidewall 480 of the inner box 120 can contact the top liner surface 744 of the bottom wall liner. According to example aspects, the inner box 120 can fit snugly within the lining cavity 650 (shown in FIG. 6A), such that movement of the inner box 120 within the lining cavity 650 is substantially prohibited. In some aspects, contents such as perishable food, or other temperature-sensitive items, can be placed within the storage hollow 430 of the inner box 120 before inserting the inner box 120 into the lining cavity 650, and in other aspects, the contents can be placed within the storage hollow 430 after the inner box 120 is inserted into the lining cavity 650.

Figure 9:
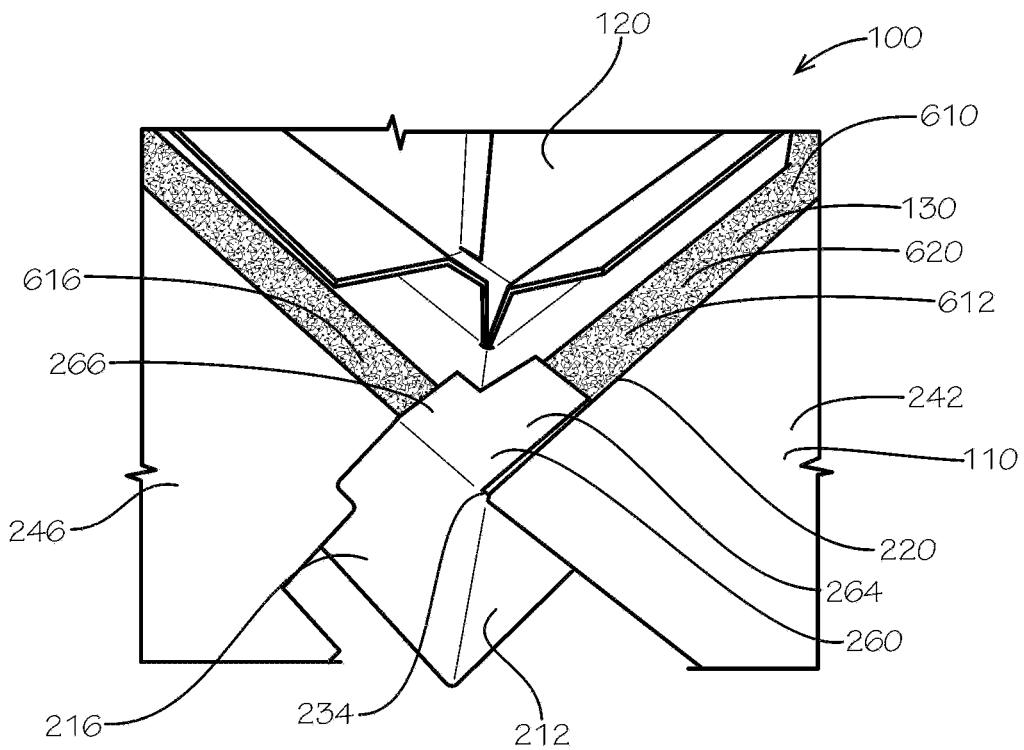
FIG. 9 illustrates a third step in the method of assembling the insulated box assembly of FIG. 1.

FIG. 9 illustrates a third step in assembling the insulated box assembly 100, wherein the first and second cover tabs 260,262 (second cover tab 262 shown in FIG. 2A) of the left and right top panels 246,248 (right top panel 248 shown in FIG. 2A) can be folded towards insulating lining 130 and can generally rest against the top end 620 of the sidewall liner 610 proximate to the top corners 234 at the top end 220 of the outer box 110. FIG. 9 specifically illustrates the first cover tab 260 of the left top panel 246. The first cover tab 260 can be folded such that the leg 264 of the first cover tab 260 generally extends along the front lateral side 612 at the top end 620 of the sidewall liner 610, and the arm 266 of the first cover tab 260 generally extends along the left lateral side 616 at the top end 620 of the sidewall liner 610. Each of the other first and second cover tabs 260,262 can be folded in substantially the same manner.

FIG. 10A illustrates a fourth step, wherein the top flaps 442,444,446,448 of the inner box 120 can be folded away from the storage hollow 430 and towards the outer box 110. For example, the front top flap 442 extending from the front lateral sidewall 412 of the inner box 120 can be folded generally toward the front lateral sidewall 212 of the outer box 110. The first flap section 450 of the front top flap 442 can generally rest against the top end 620 (shown in FIG. 6A) of the sidewall liner 610 (shown in FIG. 6A) proximate to the top end 420 of the inner box 120, and the second flap section 452 (shown in FIG. 4A) of the front top flap 442 can be inserted between the front lateral side 612 (shown in FIG. 6A) of the sidewall liner 610 and the front lateral sidewall 212 of the outer box 110. Each of the right top flap 448, left top flap 446, and back top flap 444 can be folded in substantially the same manner, as shown. The first flap section 450 of the front top flap 442 can overlap the leg 264 (shown in FIG. 2A) of the first cover tab 260 of each of the left and right top panel 246,248, and the back top flap 444 can overlap the leg 264 of each of the second cover tabs 262. The first flap section 450 of the left top flap 446 can overlap the arms 266 (shown in FIG. 2A) of the first and second cover tabs 260,262 of the left top panel 246, and the first flap section 450 of the right top flap 448 can overlap the arms 266 of the first and second cover tabs 260,262 of the right top panel 248. As such, the top end 620 (shown in FIG. 6A) of the sidewall liner 610 (shown in FIG. 6A) can be completely covered by the first and second cover tabs 260,262 of the outer box 110 and the top flaps 442,444,446,448 of the inner box 120, as illustrated.

In other aspects, the first and second cover tabs 260,262 of the outer box 110 and the top flaps 442,444,446,448 of the inner box 120 can be folded in a different fashion. For example, FIG. 10B is a close-up view of the first cover tab 260 adjacent to the back and left top flaps 444,446. As shown, in the present aspect, the back and left top flaps 444,446 can be folded, as described above, before folding the first cover tab 260. The leg 264 of the first cover tab 260 can be inserted under the adjacent back top flap 444, and the arm 266 of the first cover tab 260 can overlap, and may rest on, the adjacent left top flap 446.

FIG. 11 illustrates a fifth step in assembling the insulated box assembly 100. The fifth step can comprise placing the temperature-regulating lid 500 over the top opening 432 (shown in FIG. 4A) of the inner box 120, such that the top opening 432 is completely covered and the storage hollow 430 is completely enclosed. According to example aspects, the wings 550 of the top panel 520 of the temperature-regulating lid 500 can be configured to rest on the front and back top flaps 442,444 (shown in FIG. 4A), respectively, of the inner box 120 to support the temperature-regulating lid 500 at the top end 420 of the inner box 120. In this configuration, the top panel 520 of the temperature-regulating lid 500 can be about flush with the top end 220 of the outer box 110, as shown. In other aspects, the temperature-regulating lid 500 can be rotated about 90°, such that the wings 550 can rest on the left and right top flaps 448,448. The front, back, left, and right side flaps 512,514,516,518 (shown in FIG. 5A) of the temperature-regulating lid 500 can extend into the storage hollow 430 (shown in FIG. 4A) and can face the front, back, left, and right lateral sidewalls 412,414,416,418 (shown in FIG. 4A) of the inner box 120, respectively. According to example aspects, the temperature-regulating lid 500 can be easy removed from the insulated box assembly 100. A user can engage one or both of the cut-outs 552 in the wings 550 with a finger or multiple fingers and can lift the temperature-regulating lid 500 away from the insulated box assembly 100 to access the contents housed in the storage hollow 430 without the need to disassemble the insulated box assembly 100.

Figure 12:
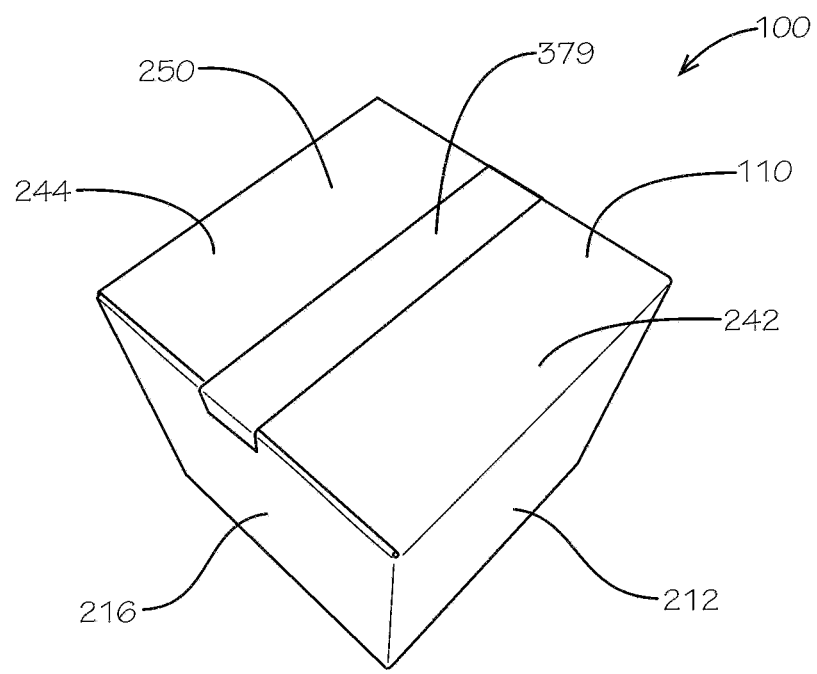
FIG. 12 illustrates a sixth step in the method of assembly the insulated box assembly of FIG. 1 and illustrates the insulated box assembly in an assembled configuration.

FIG. 12 illustrates a sixth and final step in assembling the insulated box assembly 100 and illustrates the insulated box assembly 100 in a fully assembled configuration. With the insulating liner 130 (shown in FIG. 1) and inner box 120 (shown in FIG. 1) received and assembled within the inner cavity 230 (shown in FIG. 2A) of the outer box 110, the top panels 242,244,246,248 (left and right top panels 246,248 shown in FIG. 2A) of the outer box 110 can be folded to the closed orientation, as described above with reference to FIG. 2B, to define the top sidewall 250 of the outer box 110, as shown. The top panels 242,244,246,248 can be fixed in the closed orientation by a fastener, such as tape 379, as illustrated herein. In other aspects, any other suitable fastener, as described above, can be used to fix the top panels 242,244,246,248 in the closed orientation.

Thus, a method for assembling the insulated box assembly 100 can comprise providing an outer box 110, the outer box 110 defining the inner cavity 230, inserting the insulating lining 130 within the inner cavity 230 to define the lining cavity 650, and inserting the inner box 120 into the lining cavity 650. In some aspects, the method can further comprise folding the first and second cover tabs 260,262 over the top end 620 of the sidewall liner 610 and folding the top flaps 442,444,446,448 over the top end 620 of the sidewall liner 610 to fully cover the top end 620 of the sidewall liner 610. According to example aspects, a method for using the insulated box assembly 100 can comprise assembling the insulated box assembly 100, inserting contents into the storage hollow 430 of the inner box 120, and sending the insulated box assembly 100 to a recipient.

Figure 13:
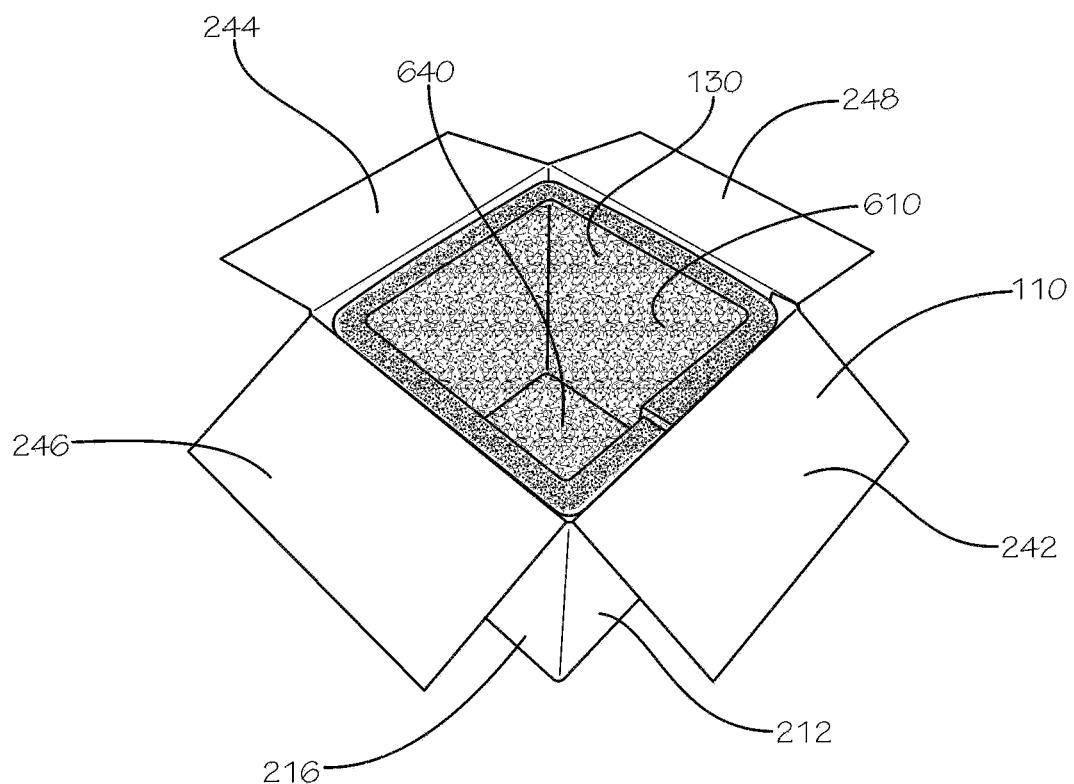
FIG. 13 illustrates another aspect of the outer box, according to the present disclosure.

FIG. 13 illustrates another example aspect of the outer box 110, with the insulating lining 130 positioned in the inner cavity 230. As shown, in the present aspect, the top panels 242,244,246,248 of the outer box 110 do not comprise the first and second cover tabs 260,262 (shown in FIG. 2A). Instead, each of the top panels 242,244,246,248 can define a substantially rectangular shape and can be substantially similar in size and shape to the bottom panels 372, 374,376,378 (shown in FIG. 3A).

Figure 14A:
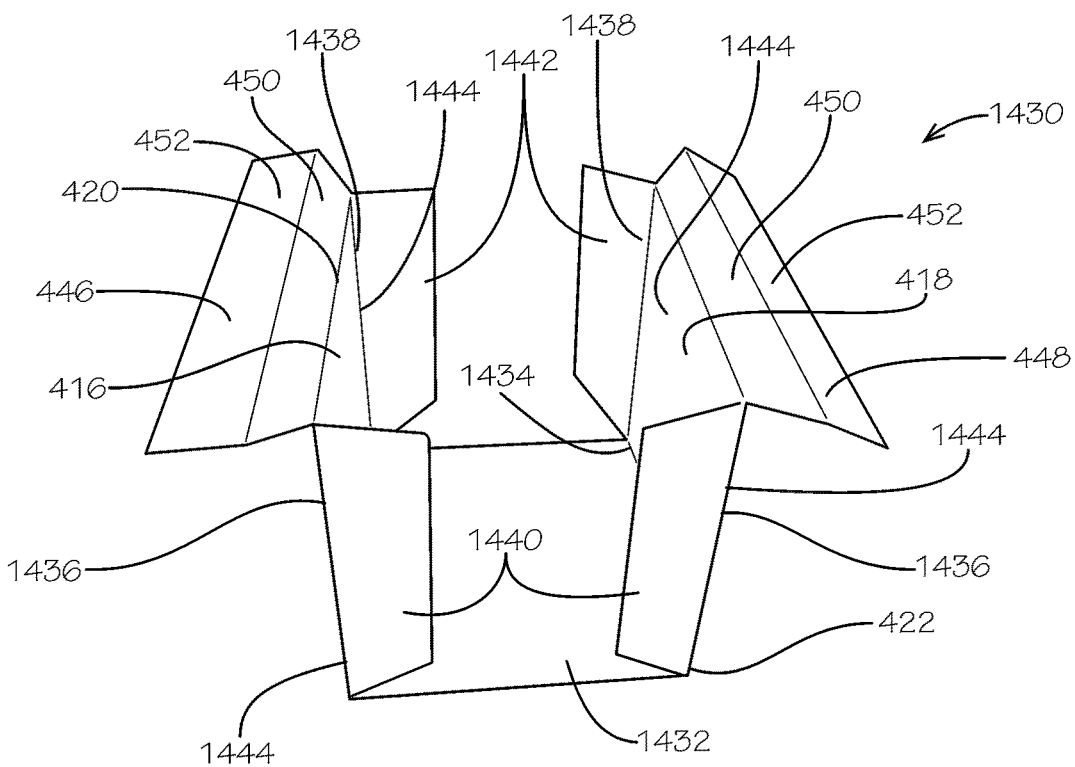
FIG. 14A illustrates a first inner box piece of another aspect of the inner box, according to the present disclosure.
Figure 14B:
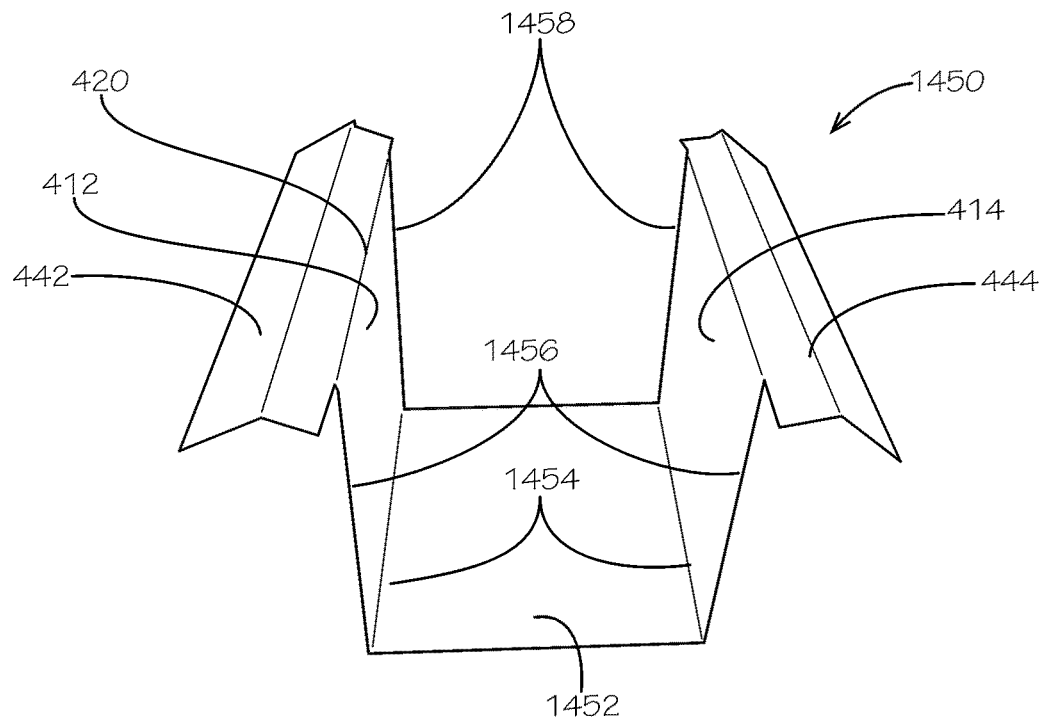
FIG. 14B illustrates a second inner box piece of the other aspect of the inner box, according to the present disclosure.

FIGS. 14A and 14B illustrate another example aspect of the inner box 120 (shown in FIG. 1), wherein the inner box 120 can comprise a first inner box piece 1430, as shown in FIG. 14A, and a second inner box piece 1450, as shown in FIG. 14B. Referring to FIG. 14A, the first inner box piece 1430 can comprise the left lateral sidewall 416, the right lateral sidewall 418 and a first bottom sidewall 1432. Each of the left lateral sidewall 416 and right lateral sidewall 418 can be monolithically formed with the first bottom sidewall 1432 and can be connected to the first bottom sidewall 1432 at a bend line 1434. The left and right lateral sidewalls 416,418 can define the top end 420 and bottom end 422 of the inner box 120. Each of the left lateral sidewall 416 and right lateral sidewall 418 can define a first side 1436 and a second side 1438 opposite the first side 1436. Each of the first and second sides 1436,1438 can extend between the top end 420 and the bottom end 422 of the inner box 120. A first side flap 1440 can extend from the first side 1436 of each of the left and right lateral sidewalls 416,418 and a second side flap 1442 can extend from the second side 1438 of the left and right lateral sidewalls 416,418, as shown. The first and second side flaps 1440,1442 can be connected to the corresponding left and right lateral sidewalls 416,418 at a bend line 1444, as shown, and can fold towards the storage hollow 430 (shown in FIG. 4A).

The first inner box piece 1430 can comprise the left top flap 446 extending from the left lateral sidewall 416 at the top end 420 and the right top flap 448 extending from the right lateral sidewall 418 at the top end 420. In the present aspect, the first flap section 450 of the left and right top flaps 446,448 can taper outward from the top end 420 to the second flap section 452, as shown. As such, in example aspects, a width of the second flap section 452 of the left and right top flaps 446,448 can be greater than a width of the corresponding left and right lateral sidewalls 416,418 at the top end 420 of the inner box 120 (shown in FIG. 1).

FIG. 14B illustrates the second inner box piece 1450 of the inner box 120. The second inner box piece 1450 can comprise the front lateral sidewall 412, the back lateral sidewall 414, and a second bottom sidewall 1452. Each of the front lateral sidewall 412 and back lateral sidewall 414 can be monolithically formed with the second bottom sidewall 1452 and can be connected to the second bottom sidewall 1452 at a bend line 1454. Each of the front lateral sidewall 412 and back lateral sidewall 414 can define a first side 1456 and a second side 1458. The front top flap 442 can extend from the front lateral sidewall 412 at the top end 420, and the back top flap 444 can extend from the back lateral sidewall 414 at the top end 420. Each of the front and back top flaps 442,444 can extend beyond the first and second sides 1456,1458 of the corresponding front and back lateral sidewalls 412,414, such that each of the front and back top flaps 442,444 can define a width greater than a width of the corresponding front and back lateral sidewalls 412,414 at the top end 420.

Figure 15:
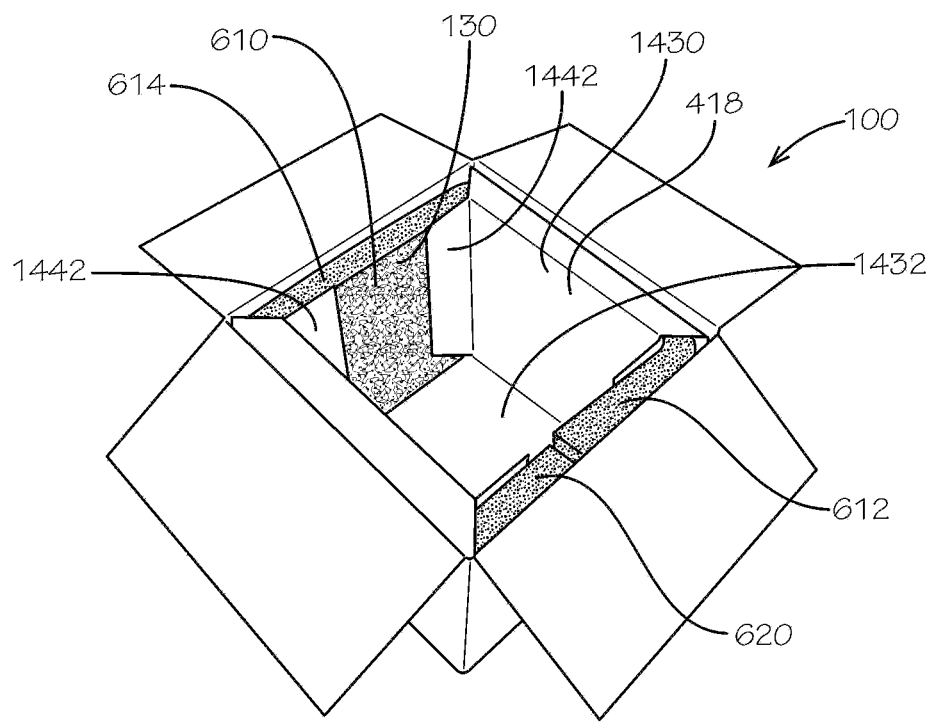
FIG. 15 illustrates the first inner box piece of FIG. 14A assembled with the outer box of FIG. 13.

FIG. 15 illustrates a step in assembling the insulated box assembly 100, wherein the first inner box piece 1430 can be inserted into the lining cavity 650 (shown in FIG. 6A) defined by the insulating lining 130. The left lateral sidewall 416 (shown in FIG. 14A) of the first inner box piece 1430 can face the left lateral side 616 (shown in FIG. 14A) of the sidewall liner 610, the right lateral sidewall 418 of the first inner box piece 1430 can face the right lateral side 618 (shown in FIG. 6A) of the sidewall liner 610, and the first bottom sidewall 1432 of the first inner box piece 1430 can face the bottom wall liner 640 (shown in FIG. 6B). The first and second side flaps 1440,1442 (first side flaps 1440 shown in FIG. 14A) of the left and right lateral sidewalls 416,418 can be folded such that the first side flaps 1440 face the front lateral side 612 of the sidewall liner 610 and the second side flaps 1442 face the back lateral side 614 of the sidewall liner 610. The left and right top flaps 446,448 can be folded over the top end 620 of the sidewall liner 610 as described above with reference to FIG. 10.

Figure 16:
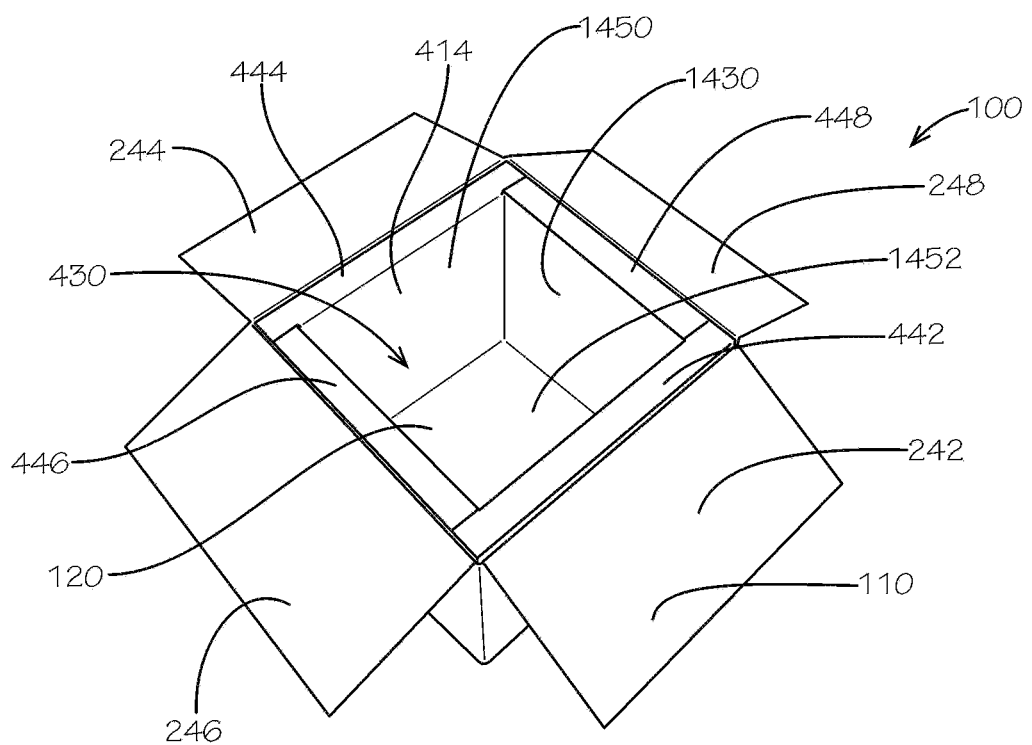
FIG. 16 illustrates the second inner box piece of FIG. 14B assembled with the outer box of FIG. 13 and the first inner box piece of FIG. 14A.

FIG. 16 illustrates a next step in assembling the insulated box assembly 100, wherein the second inner box piece 1450 can be inserted into the lining cavity 650 (shown in FIG. 6A). The front lateral sidewall 412 (shown in FIG. 14B) of the second inner box piece 1450 can face the front lateral side 612 (shown in FIG. 6A) of the sidewall liner 610 (shown in FIG. 6A) and first side flaps 1440 (shown in FIG. 14A). The back lateral sidewall 414 of the second inner box piece 1450 can face the back lateral side 614 (shown in FIG. 6A) of the sidewall liner 610 and the second side flaps 1442 (shown in FIG. 14A). The second bottom sidewall 1452 of the second inner box piece 1450 can face the first bottom sidewall 1432 (shown in FIG. 14A) of the first inner box piece 1430. In other aspects, the first inner box piece 1430 and second inner box piece 1450 can be inserted into the lining cavity 650 in reverse order, such that the second bottom sidewall 1452 of the second inner box piece 1450 faces the bottom wall liner 640, and first bottom sidewall 1432 of the first inner box piece 1430 faces the second bottom sidewall 1452.

The front and back top flaps 442,444 can be folded over the top end 620 (shown in FIG. 6A) of the sidewall liner 610, as described above with reference to FIG. 10. As shown, in the present aspect, the front, back, left, and right top flaps 442,444,446,448 can fully cover the top end 620 of the sidewall liner 610. With both the first and second inner box pieces 1430,1450 assembled in the lining cavity 650, the inner box 120 can be fully assembled and can define the storage hollow 430 for receiving contents therein, such as perishable food or other temperature-sensitive items. According to example aspects, the inner box 120 can fit snugly within the lining cavity 650, such that movement of the inner box 120 within the lining cavity 650 is substantially prohibited.

In some example aspects, the temperature-regulating lid 500 (shown in FIG. 5) can be assembled with the insulated box assembly 100, as described above with reference to FIG. 11. Then, the top panels 242,244,246,248 of the outer box 110 can be folded and secured in the closed orientation, as described above with reference to FIG. 12.

Thus, a method for assembling the insulated box assembly 100 of the present aspect can comprise providing an outer box 110, the outer box 110 defining the inner cavity 230, inserting the insulating lining 130 within the inner cavity 230 to define the lining cavity 650, and inserting the first inner box piece 1430 and the second inner box piece 1450 into the lining cavity 650 to define the storage hollow 430 of the inner box 120, the storage hollow 430 configured to receive contents therein. Example aspects of the method can further comprise folding the top flaps 442,444,446,448 over the top end 620 of the sidewall liner 610 to fully cover the top end 620 of the sidewall liner 610.

Figure 17:
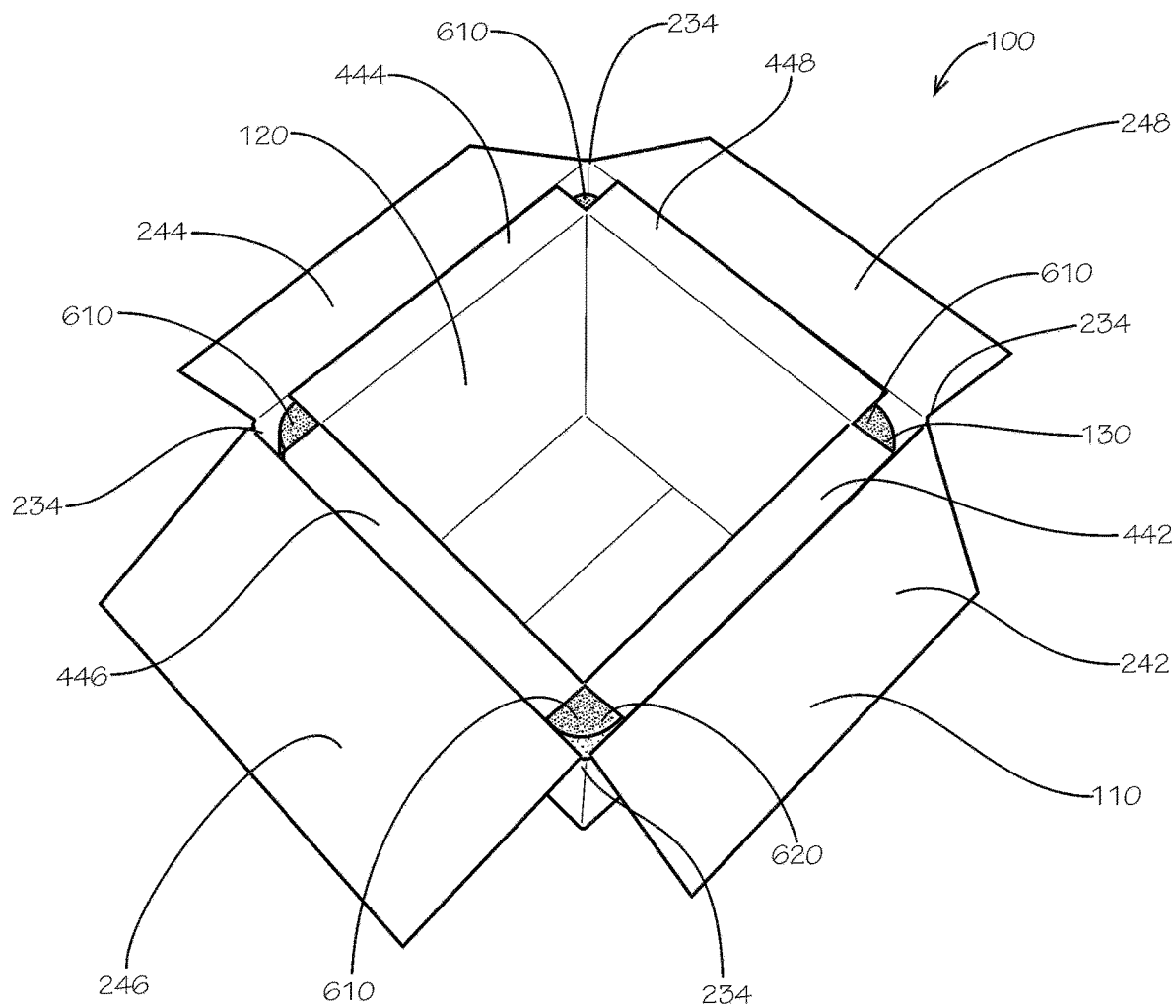
FIG. 17 illustrates the insulated box assembly according to another aspect of the present disclosure.

FIG. 17 illustrates another aspect of the insulated box assembly 100. The insulated box assembly can comprise the outer box 110 of FIG. 13, the insulating lining 130, and the inner box 120 of FIGS. 4A-4B. The top flaps 442,444,446, 448 of inner box 120 can be folded over the top edge 620 of the sidewall liner 610, as described above. As shown, with the top panels 242,244,246,248 of the outer box 110 in the open orientation, the top end 620 of the sidewall liner 610 can be uncovered proximate the top corners 234 of the outer box 110. When the top panels 242,244,246,248 of the outer box 110 are folded and secured in the closed orientation, as described above, the top end 620 of the sidewall liner 610 can be fully covered.

Figure 18:
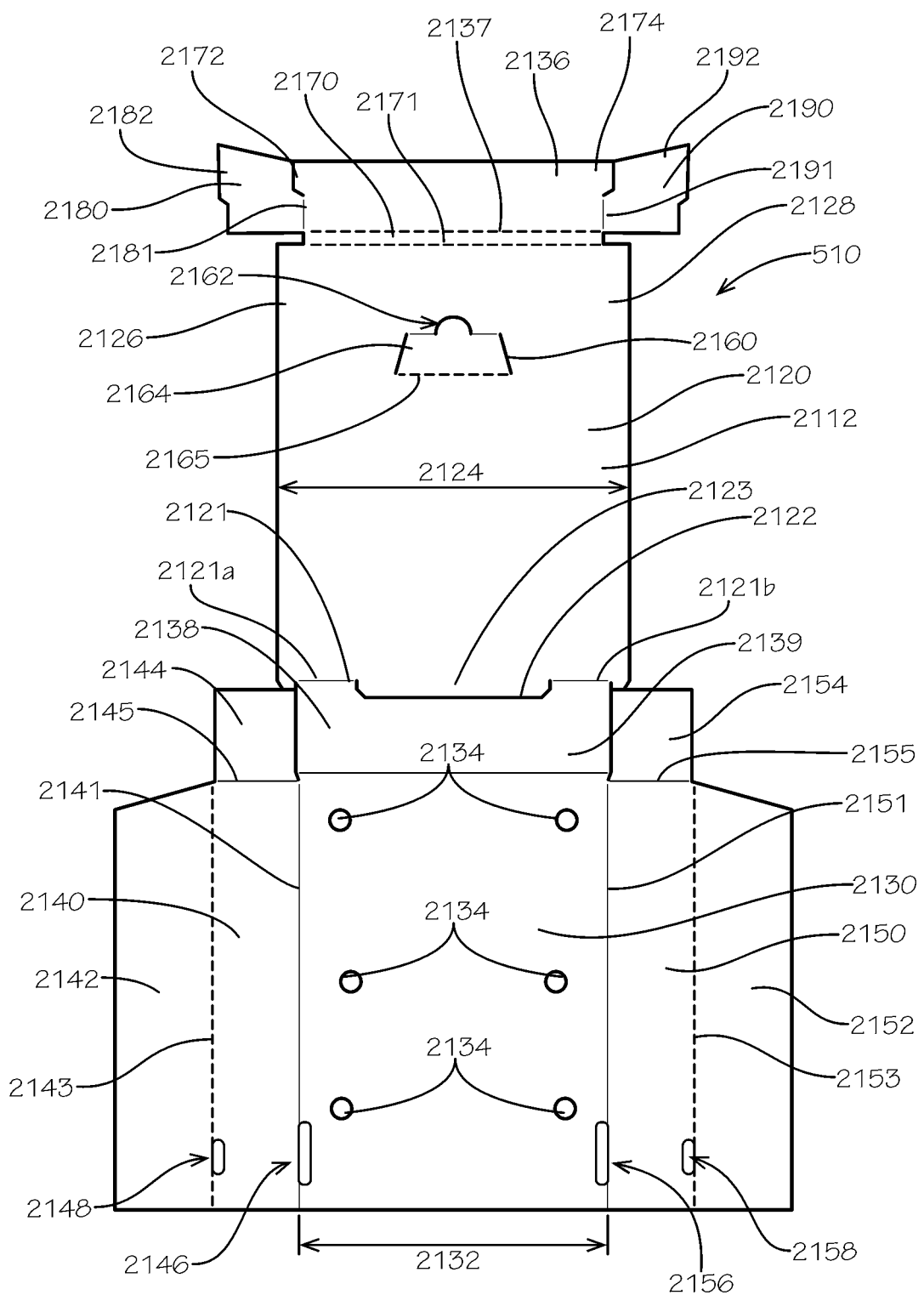
FIG. 18 is a top view of a temperature-regulating lid for a temperature-regulating lid, in accordance with another aspect of the present disclosure, wherein the temperature-regulating lid is in a blank orientation.
Figure 19:
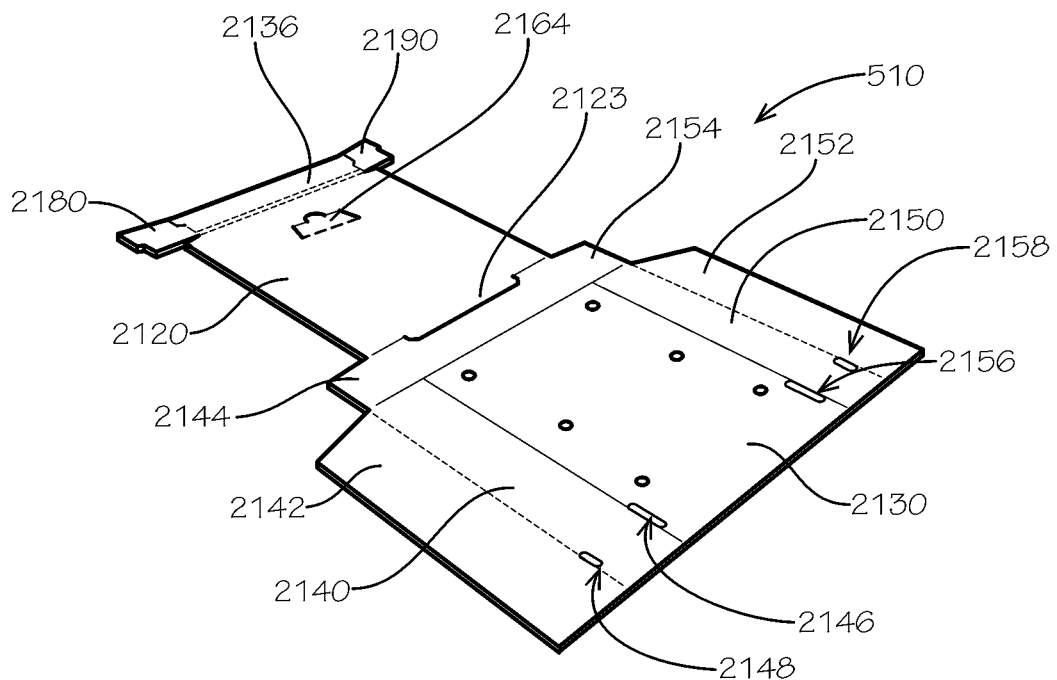
FIG. 19 is a perspective view of the temperature-regulating lid of FIG. 18.
Figure 27:
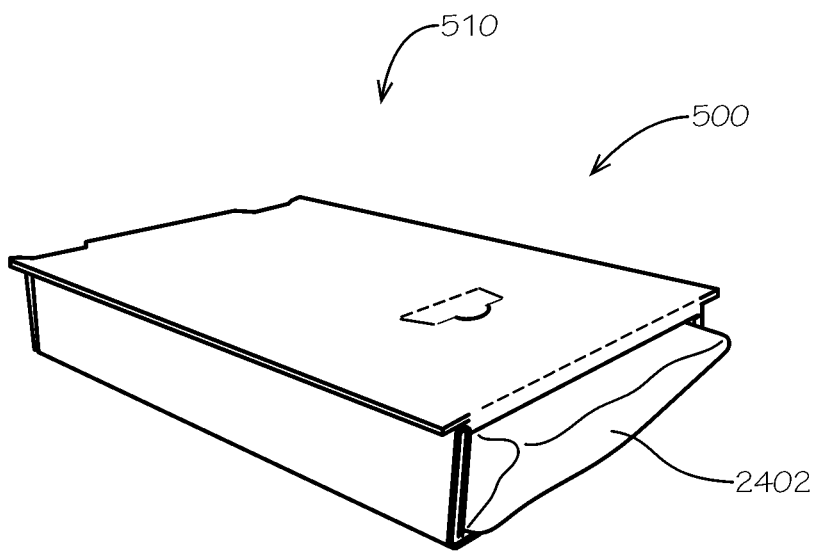
FIG. 27 illustrates a final step in the method of assembling the temperature-regulating lid of FIG. 18, wherein the temperature-regulating lid is assembled with a temperature-regulating insert to form the temperature-regulating lid.

FIGS. 18 and 19 illustrates the lid box 510 for the temperature-regulating lid 500 (shown in FIG. 27), according to another aspect the present disclosure. The lid box 510 can be similar to the lid box 510 shown in FIG. 5A, and the temperature-regulating lid 500 can be similar to the temperature-regulating lid 500 shown in FIG. 5A. Example aspects of the lid box 510 can be oriented in a substantially flat blank orientation, as shown in FIG. 18, and an assembled orientation, as shown in FIG. 27. The lid box 510 can define an inner surface 2112 and an outer surface 2314 (shown in FIG. 20). Example aspects of the lid box 510 can define a top panel 2120 and a bottom panel 2130. In some aspects, as shown, the bottom panel 2130 can define one or more holes 2134 formed therein. The holes 2134 can allow for the passage of air therethrough, as described in further detail below. The lid box 510 can further define a front side panel 2136, a back side panel 2138, a left side panel 2140, a right side panel 2150. Each of the back, left, and right side panels 2138,2140,2150 can be connected to the bottom panel 2130 by a bend line 2139,2141,2151, respectively. The left side panel 2140 can define a first left extension flap 2142 extending therefrom, distal from the bottom panel 2130, and a second left extension flap 2144 extending therefrom, adjacent to the back side panel 2138. The first left extension flap 2142 can be connected to the left side panel 2140 by a bend line 2143, and the second left extension flap 2144 can be connected to the left side panel 2140 by a bend line 2145. Similarly, the right side panel 2150 can define a first right extension flap 2152 extending therefrom, distal from the bottom panel 2130, and a second right extension flap 2154 extending therefrom, adjacent to the back side panel 2138, as shown. The first right extension flap 2152 can be connected to the right side panel 2150 by a bend line 2153, and the second right extension flap 2154 can be connected to the right side panel 2150 by a bend line 2155. As shown, a first left slot 2146 can be formed at the bend line 2141, a second left slot 2148 can be formed at the bend line 2143, a first right slot 2156 can be formed at the bend line 2151, and a second right slot 2158 can be formed at the bend line 2153.

Example aspects of the top panel 2120 can extend from the back side panel 2138 distal from the bottom panel 2130 and can be connected to the back side panel 2138 by a bend line 2121. In some aspects, the lid box 510 can define a tear line 2122 formed proximate an intermediate portion of the bend line 2121. In other aspects, as shown, the tear line 2122 can extend generally between a left side 2121a of the bend line 2121 and a right side 2121b of the bend line 2121. In the present aspect, the tear line 2122 can define a rear wing 2123 of the top panel 2120. In some aspects, the top panel 2120 can define a width 2124 great than a width 2132 of the bottom panel 2130. The opposing portions of the top panel 2120 extending beyond the width 2132 of the bottom panel 2130 can be defined as left and right wings 2126,2128 of the top panel 2120. Example aspects of the left and right wings 2126,2128 can be monolithically formed with the top panel 2120.

In the present aspect, the lid box 510 can define an engagement opening 2160 formed in the top panel 2120. The engagement opening 2160 can be configured to allow the engagement of a user's hand/finger(s) therewith. Example aspects of the engagement opening 2160 can be partially or fully covered by an engagement flap 2164, as shown. For example, in some aspects, as shown, an un-covered portion 2162 of the engagement opening 2160 can remain un-covered by the engagement flap 2164 to facilitate the insertion of a hand/finger(s) into the engagement opening 2160 and/or grasping the engagement flap 2164. Example aspects of the engagement flap 2164 can be connected to the top panel 2120 via a bend line 2165. The bend line 2165 can allow engagement flap 2164 to fold towards or away from an interior cavity 2502 (shown in FIG. 22) of the assembled lid box 510 when manually manipulated by a user. In the present aspect, the un-covered portion 2162 of the engagement opening 2160 can be oriented distal to the bend line 2165.

As shown, the front side panel 2136 can be connected to the top panel 2120 by a connecting strip 2170. In the present aspect, the connecting strip 2170 can be connected to the top panel 2120 by a bend line 2171, and the front side panel 2136 can be connected to the connecting strip 2170 by a bend line 2137. The front side panel 2136 can define a left front tab 2172 and a right front tab 2174, as shown. The lid box 510 can comprise a left front extension flap 2180 connected to the front side panel 2136 at a bend line 2181 proximate the left front tab 2172 and a right front extension flap 2190 connected to the front side panel 2136 at a bend line 2191 proximate the right front tab 2174. As shown, the left front extension flap 2180 can define a left front extension flap tab 2182 distal from the front side panel 2136, and the right front extension flap 2190 can define a right front extension flap tab 2192 distal from the front side panel 2136.

Figure 20:
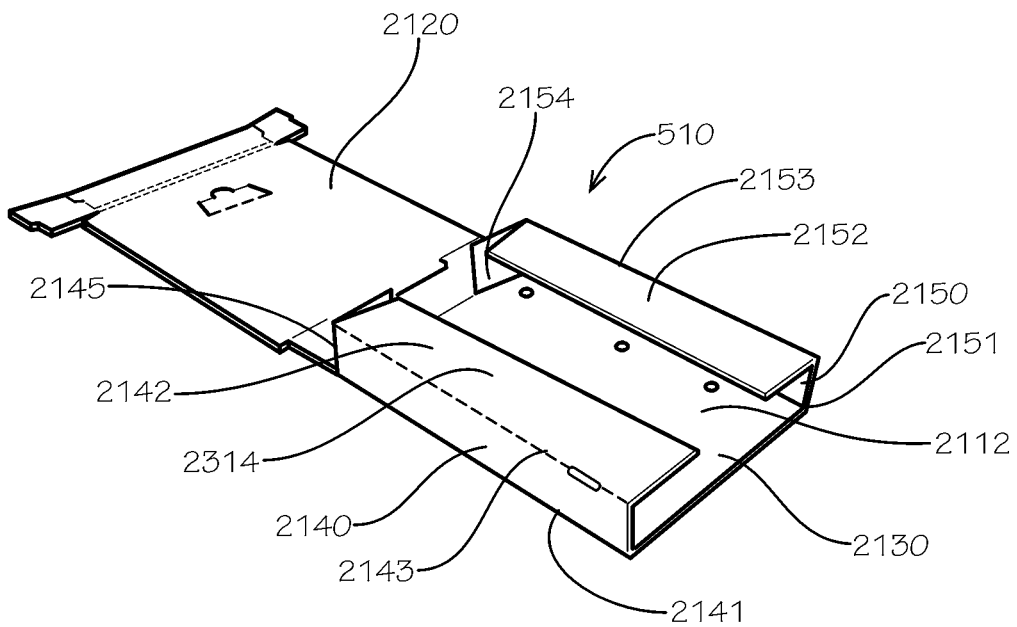
FIG. 20 illustrates a first step in a method of assembling the temperature-regulating lid of FIG. 18.

FIGS. 20-27 illustrate an example aspect of a method of assembling the temperature-regulating lid 500 (shown in FIG. 27). Referring to FIG. 20, a first step in the method of assembling the temperature-regulating lid 500 can comprise folding the left side panel 2140 along the bend line 2141 towards the inner surface 2112 of the lid box 510, such that the left side panel 2140 is oriented at about a right angle relative the bottom panel 2130. The first left extension flap 2142 can also be folded along the bend line 2143 towards the inner surface 2112 of the lid box 510, such that the first left extension flap 2142 can be oriented at about a right angle relative to the left side panel 2140. The second left extension flap 2144 (shown in FIG. 18) can be folded along the bend line 2145 towards the inner surface 2112 of the lid box 510, such that the second left extension flap 2144 can be oriented at about a right angle relative to the left side panel 2140. In other aspects, the left side panel 2140, first left extension flap 2142, and second left extension flap 2144 can be folded in any order that substantially achieves the same orientations. As shown, the right side panel 2150, first right extension flap 2152, and second right extension flap 2154 can be folded in a similar manner.

Figure 21:
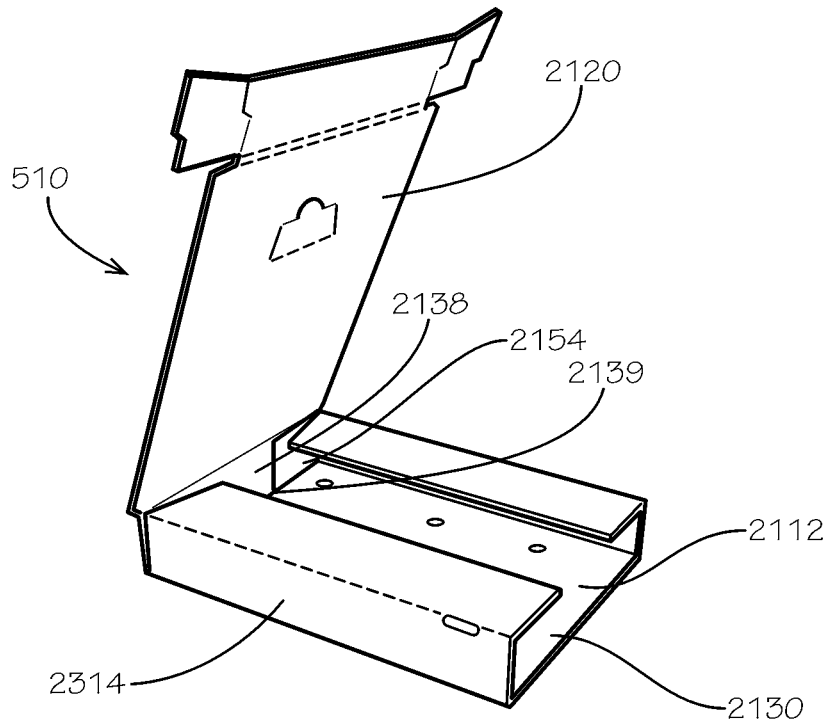
FIG. 21 illustrates a second step in the method of assembling the temperature-regulating lid of FIG. 18.

As shown in FIG. 21, the back side panel 2138 can be folded along the bend line 2139 towards the inner surface 2112 of the lid box 510, such that the back side panel 2138 can be oriented at about a right angle relative to the bottom panel 2130. According to example aspects, the inner surface 2112 of the back side panel 2138 can generally abut the outer surface 2314 of the second left and right extension flaps 2144,2154 (left extension flap 2144 shown in FIG. 18).

Figure 22:
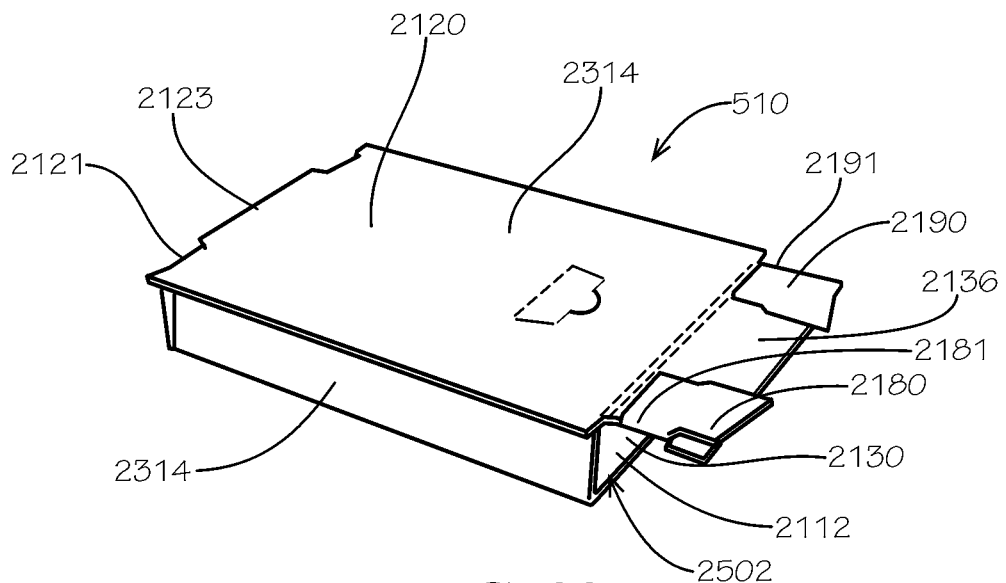
FIG. 22 illustrates a third step in the method of assembling the temperature-regulating lid of FIG. 18.

Referring to FIG. 22, the top panel 2120 can then be folded along the bend line 2121 towards the inner surface 2112 of the lid box 510, such that the top panel 2120 can be orientated at about a right angle relative to the back side panel 2138 (shown in FIG. 18) and about parallel to the bottom panel 2130. According to example aspects, in this orientation, the inner surface 2112 of the top panel 2120 can generally abut the outer surface 2314 of the first left and right extension flaps 2142,2152 (shown in FIG. 18). In this orientation, the lid box 510 can define an interior cavity 2502 having an open end. Next, each of the left front extension flap 2180 and right front extension flap 2190 can be folded approximately 180° at the corresponding bend lines 2181,2191, respectively, towards the outer surface 2314 of the lid box 510, such that each of the left and right front extension flaps 2180,2190 can be oriented about parallel to the front side panel 2136. In other aspects, the left and right front extension flaps 2180,2190 can be folded between about 90°-180°. Furthermore, in other aspects, the back side panel 2138, top panel 2120, and left and right front extension flaps 2180,2190 can be folded in any order that results in substantially the same orientations.

Figure 23:
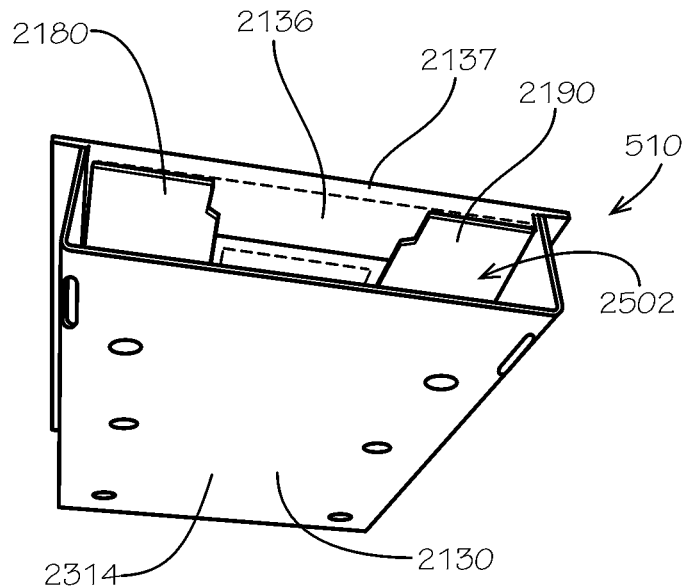
FIG. 23 illustrates a fourth step in the method of assembling the temperature-regulating lid of FIG. 18.

FIG. 23 illustrates a next step in the method of assembling the temperature-regulating lid 500. The front side panel 2136 can be folded approximately 180° at the bend line 2137 into the interior cavity 2502, such that the front side panel 2136 and the left and right front extension flaps 2180,2190 are oriented substantially parallel to the top panel 2120 (shown in FIG. 18). In some aspects, the inner surface 2112 (shown in FIG. 18) of the front side panel 2136 can abut the inner surface 2112 of the top panel 2120. Furthermore, the left front tab 2172 (shown in FIG. 18) can engage the second left slot 2148 (shown in FIG. 18), and the right front tab 2174 (shown in FIG. 18) can engage the second right slot 2158 (shown in FIG. 18).

Figure 24:
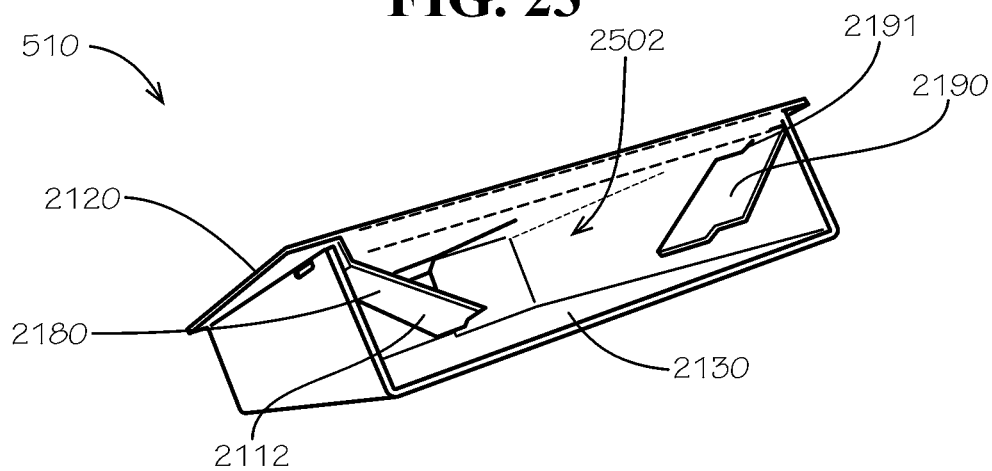
FIG. 24 illustrates a fifth step in the method of assembling the temperature-regulating lid of FIG. 18.
Figure 25:
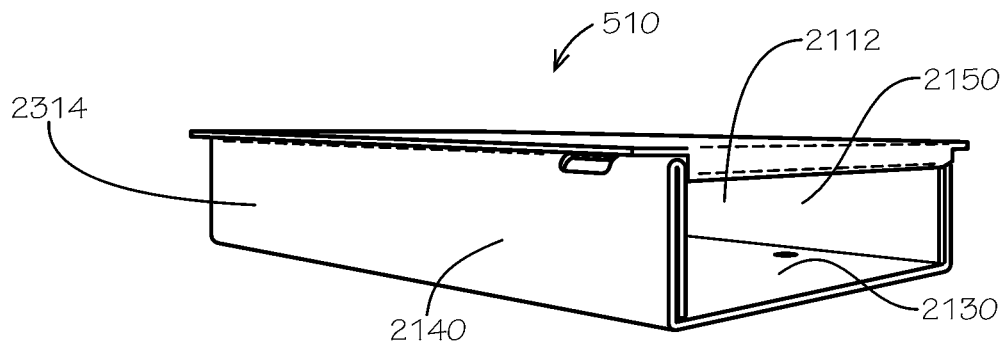
FIG. 25 illustrates a sixth step in the method of assembling the temperature-regulating lid of FIG. 18.
Figure 26:
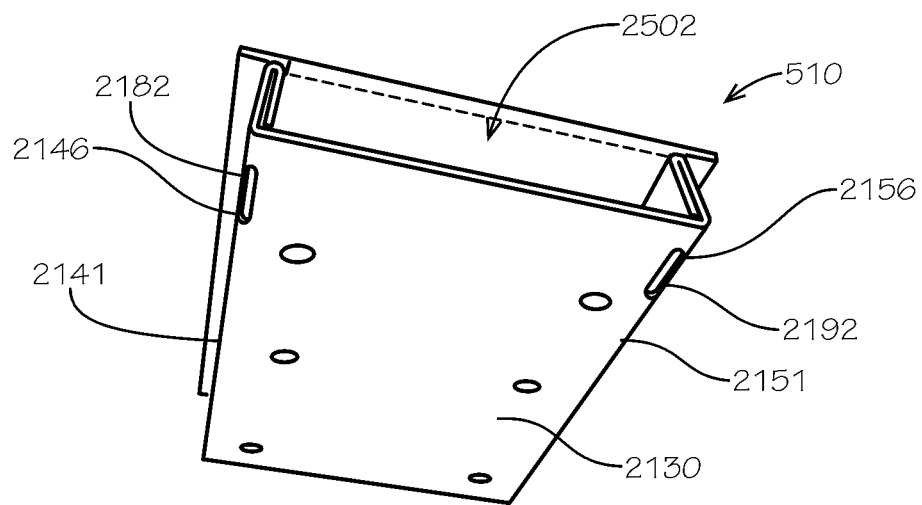
FIG. 26 illustrates a seventh step in the method of assembling the temperature-regulating lid of FIG. 18.

In a next step, as shown in FIG. 24, each of the left front extension flap 2180 and the right front extension flap 2190 can be folded towards the bottom panel 2130. As illustrated in FIG. 25, the left and right front extension flaps 2180,2190 (left front extension flap 2180 shown in FIG. 18) can be folded approximately 90°, such that the left and right front extension flaps 2180,2190 can be oriented at about a right angle relative to the front side panel 2136 (shown in FIG. 18) and top panel 2120. In some aspects, the inner surface 2112 of the left and right front extension flaps 2180,2190 can abut the inner surface 2112 of the left and right side panels 2140,2150, respectively. As shown in FIG. 26, the left front extension flap tab 2182 can engage the first left slot 2146, and the right front extension flap tab 2192 can engage the second right slot 2156 to secure the lid box 510 in the assembled orientation.

Figure 29:
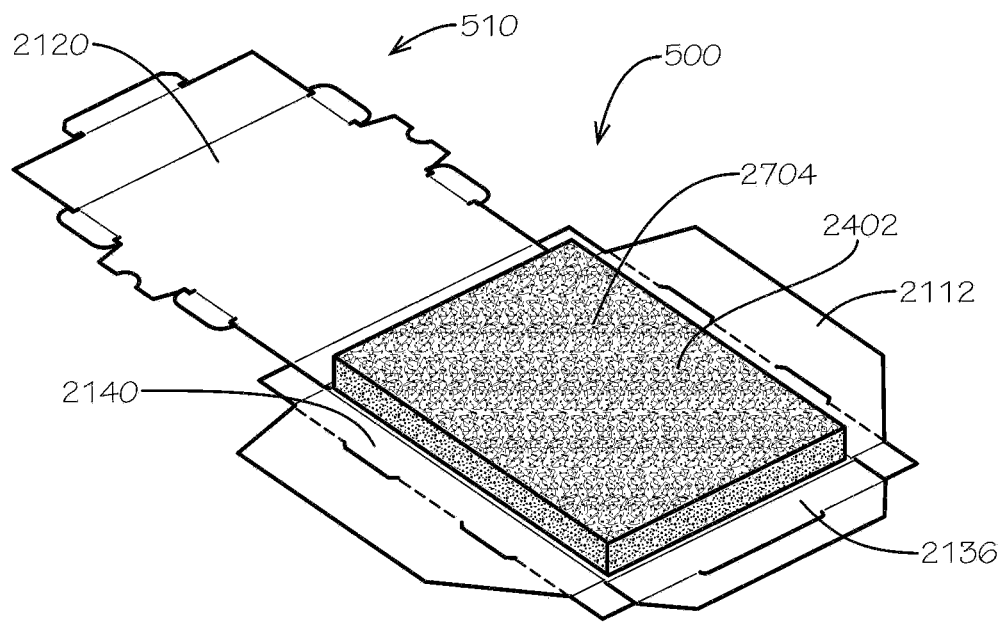
FIG. 29 illustrates a first step of a method of assembly the temperature-regulating lid, according to another aspect of the present disclosure, wherein the temperature-regulating lid comprises the temperature-regulating lid of FIG. 28 and the temperature-regulating insert, according to another aspect.

FIG. 27 illustrates the temperature-regulating lid 500 in the assembled orientation. As shown, a temperature-regulating insert 2402 can be inserted into the cavity 2502 (shown in FIG. 22) of the lid box 510. For example, the temperature-regulating insert 2402 can be a bag of dry ice, as shown. The dry ice can cool the air within the cavity 2502, and the holes 2134 (shown in FIG. 18) in the bottom panel 2130 (shown in FIG. 18) can allow for the passage of the cold air out of the cavity 2502. In other aspects, the temperature-regulating insert 2402 can comprise, for example, R-4 poly-encapsulated thermal 100% recycled cotton, as shown in FIG. 29. Other aspects of the temperature-regulating insert 2402 can comprise, for example, polyester film, such as polyethylene terephthalate (PET) film, foams, pellets, fabrics, nonwovens, polyethylene, polyurethane, polypropylene or any other suitable material that can contribute towards a cushioned and climate controlled protective layer in a box assembly 2800 (shown in FIG. 33A). In some aspects, the temperature-regulating insert 2402, or portions thereof, can be biodegradable and/or compostable.

Figure 28:
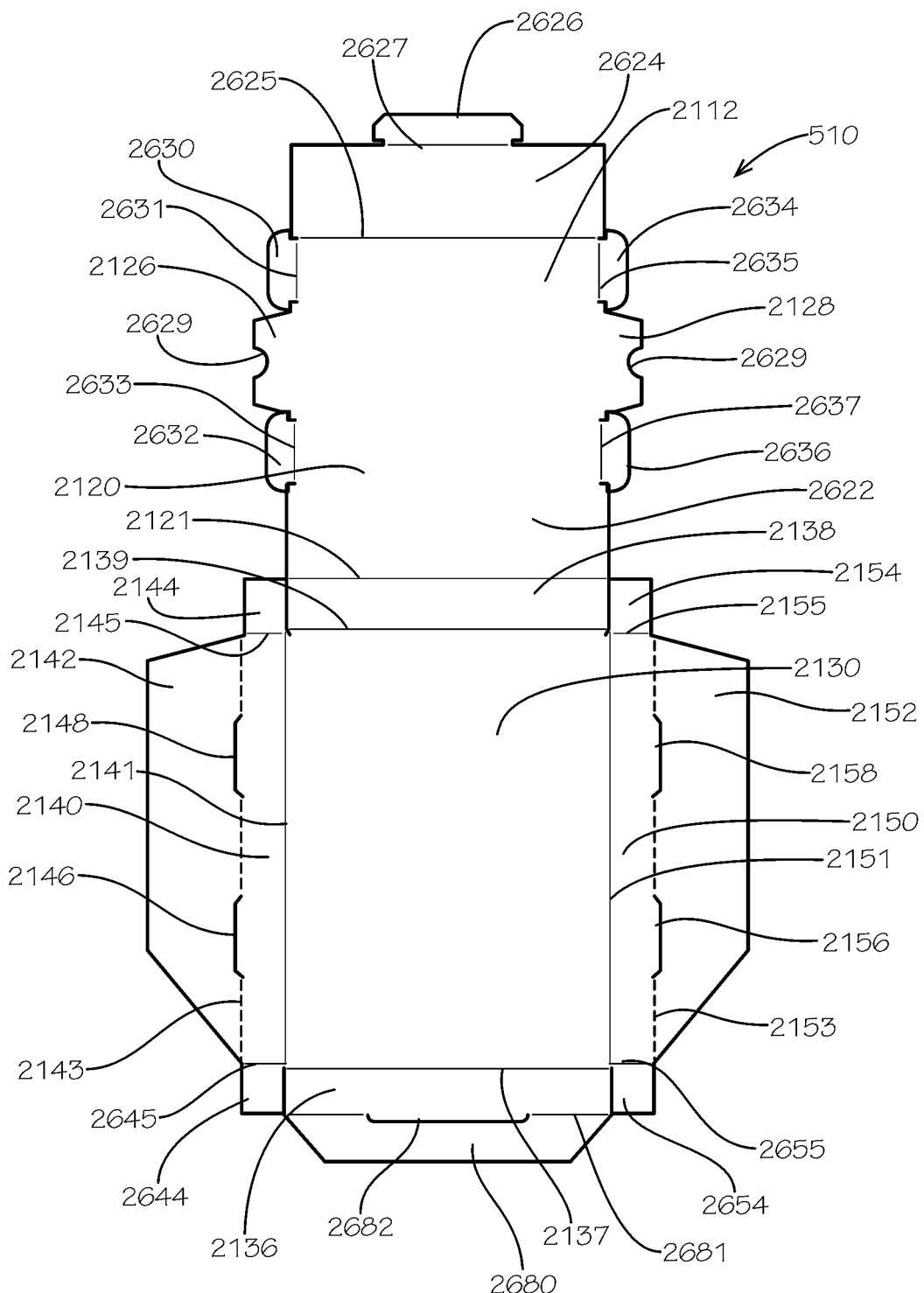
FIG. 28 illustrates a top view of the temperature-regulating lid, in accordance with another aspect of the present disclosure, wherein the temperature-regulating lid in is the blank orientation.

FIG. 28 illustrates another example aspect of the lid box 510 oriented the blank orientation. As shown, example aspects of the lid box 510 can define the top panel 2120, bottom panel 2130, front side panel 2136, back side panel 2138, left side panel 2140, and right side panel 2150. Each of the back, left, and right side panels 2138,2140,2150 can be connected to the bottom panel 2130 by the corresponding bend line 2139,2141,2151. The left and right side panels 2140,2150 can further comprise the corresponding first left and right extension flaps 2142,2152 connected thereto by the corresponding bend lines 2143,2153, and the second left and right extension flaps 2144,2154 connected thereto by the corresponding bend lines 2145,2155. Moreover, the left and right side panels 2140,2150 can comprise third left and right extension flaps 2644,2654 opposite the second left and right extension flaps 2144,2154 and connected thereto by corresponding bend lines 2645,2655. In the present aspect, the first and second left slots 2146,2148 can each be formed at the bend line 2143, and the first and second right slots 2156,2158 can be formed at the bend line 2153. Furthermore, in the present aspect, the front side panel 2136 can be connected to the bottom panel 2130 by the corresponding bend line 2137. The front side panel 2136 can define a front extension flap 2680 extending therefrom distal to the bottom panel 2130 and attached thereto at a bend line 2681. A front slot 2682 can be formed at the bend line 2681 between the front side panel 2136 and the front extension flap 2680.

The top panel 2120 can extend from the back side panel 2138 distal from the bottom panel 2130 and can be connected to the back side panel 2138 by the bend line 2121. In the present aspect, the top panel 2120 can define a primary top panel 2622 and a secondary top panel 2624. The secondary top panel 2624 can be distal from the back side panel 2138 and can be connected to the primary top panel 2622 by a bend line 2625. Further, in example aspects, a secondary top panel locking tab 2626 can extend from the secondary top panel 2624 distal to the primary top panel 2622 and can be connected thereto by a bend line 2627. The primary top panel 2622 can further comprise the left and right wings 2126,2128, as shown, and in the present aspect, each of the left and right wings 2126,2128 can define a cut-out 2629. Moreover, the primary top panel 2622 can comprise first and second left locking tabs 2630,2632 flanking the left wing 2126 and first and second right locking tabs 2634,2637 flanking the right wing 2128. Each of the first and second left locking tabs 2630,2632 can be connected to the primary top panel 2622 by a bend line 2631,2633, respectively, and each of the first and second right locking tabs 2634,2637 can be connected to the primary top panel 2622 by a bend line 2635,12137, respectively.

FIG. 29-32 illustrates another aspect of a method of assembling the temperature-regulating lid 500. Referring to FIG. 29, according to example aspects, the temperature-regulating insert 2402 can define a bottom surface (not shown) and a top surface 2704, which can be substantially planar and parallel to one another. In the present aspect, the temperature-regulating insert 2402 can comprise a pad formed from R-4 poly-encapsulated thermal 100% recycled cotton. In other aspects, the temperature-regulating insert 2402 can comprise any other suitable material, or combinations of materials, as described above. As shown, the temperature-regulating insert 2402 can be received on the inner surface 2112 of the bottom panel 2130 (shown in FIG. 28), such that the bottom surface of temperature-regulating insert 2402 faces the inner surface 2112 of the bottom panel 2130.

In some aspects, such as the aspect depicted in FIG. 29, the temperature-regulating lid 500 can be 100% recyclable. For example, the temperature-regulating lid 500 can be single-stream recyclable wherein all materials comprised by the temperature-regulating lid 500 (including the lid box 510 and the temperature-regulating insert 2402) can be recycled by a single processing train without requiring separation of any materials or components of the temperature-regulating lid 500. In the present aspect, the temperature-regulating lid 500 can be compostable. In the present aspect, the temperature-regulating lid 500 can be repulpable. For example, in the present aspect, the temperature-regulating lid 500, including the lid box 510 and the temperature-regulating insert 2402, can be repulpable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill. which is hereby incorporated in its entirety. Furthermore, in the present aspect, the temperature-regulating lid 500, including the lid box 510 and the temperature-regulating insert 2402, can be recyclable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill.

Recyclable and repulpable insulation materials are further described in U.S. patent application Ser. No. 15/677,738, filed Aug. 15, 2017, U.S. Provisional Patent Application No. 62/375,555, filed Aug. 16, 2016, U.S. Provisional Patent Application No. 62/419,894, filed Nov. 9, 2016, and U.S. Provisional Patent Application No. 62/437,365, filed Dec. 21, 2016, which are each incorporated by reference in their entirety herein.

Figure 30:
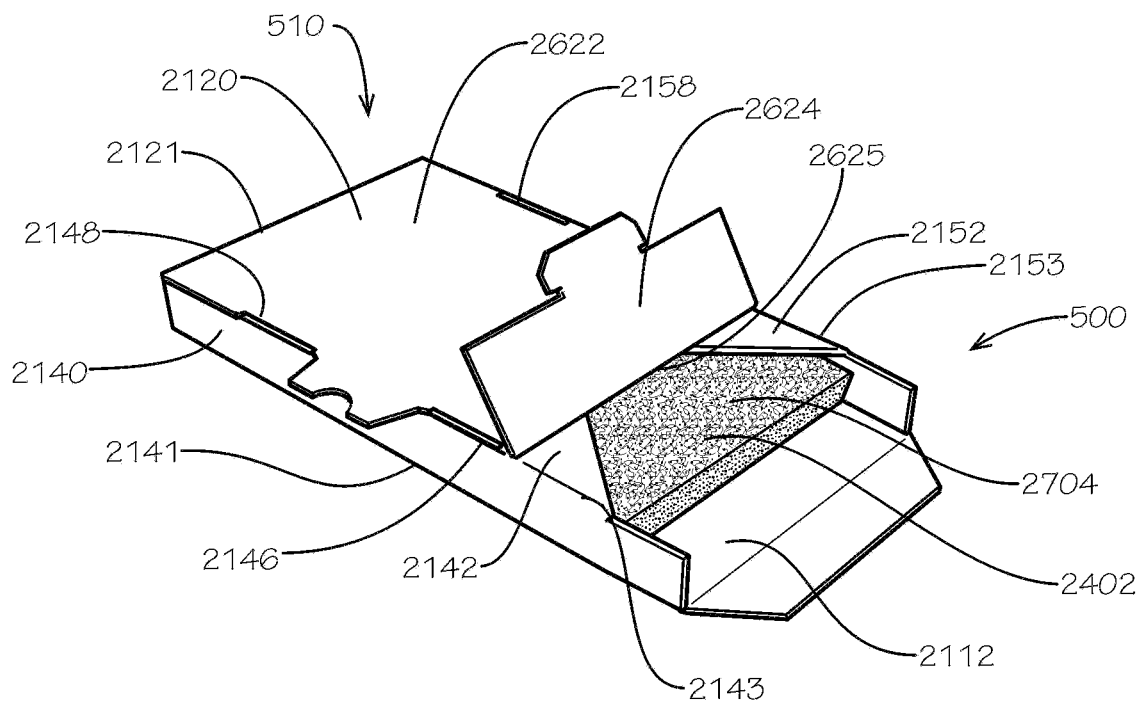
FIG. 30 illustrates a second step of the method of assembling the temperature-regulating lid of FIG. 29.

Referring to FIG. 30, the left and right side panels 2140,2150 (right side panel 2150 shown in FIG. 28) can be folded at the corresponding bend lines 2141,2151 (bend line 2151 shown in FIG. 28. The first left and right extension flaps 2142,2152 can also be folded at the corresponding bend lines 2143,2153, such that the first left and right extension flaps 2142,2152 can lie parallel to, and may rest on, the top surface 2704 of the temperature-regulating insert 2402. The second left and right extension flaps 2144,2154 (shown in FIG. 28) can be folded towards the temperature-regulating insert 2402, and the back side panel 2138 (shown in FIG. 28) can be folded towards the temperature-regulating insert 2402, such that the back side panel 2138 abuts the second left and right extension flaps 2144,2154.

The first and second left locking tabs 2630,2632 (shown in FIG. 28) and first and second right locking tabs 2634,2637 (shown in FIG. 28) can be folded at the corresponding bend lines 2631,2633,2635,12137 (shown in FIG. 28) towards the inner surface 2112 of the primary top panel 2622, such that each of the first and second left locking tabs 2630,2632 and first and second right locking tabs 2634,2637 can be oriented at about 90° relative to the primary top panel 2622. The primary top panel 2622 can be folded at the corresponding bend line 2121 towards the temperature-regulating insert 2402 to generally define the cavity 2502 (shown in FIG. 22) within which the temperature-regulating insert 2402 can be received. In this orientation, the primary top panel 2622 can lie substantially parallel to, and may rest on, the top surface 2704 of the temperature-regulating insert 2402 and/or the first left and right extension flaps 2142,2152. As the primary top panel 2622 is folded towards the temperature-regulating insert 2402, the first and second left locking tabs 2630,2632 can be inserted into the first and second left slots 2146,2148, respectively, and the first and second right locking tabs 2634,2637 can be inserted into the first and second right slots 2156,2158 (first right slot 2156 shown in FIG. 28), respectively, to retain the primary top panel 2622 in the illustrated orientation. As shown, the secondary top panel 2624 can be folded away from temperature-regulating insert 2402 at the bend line 2625.

Figure 31:
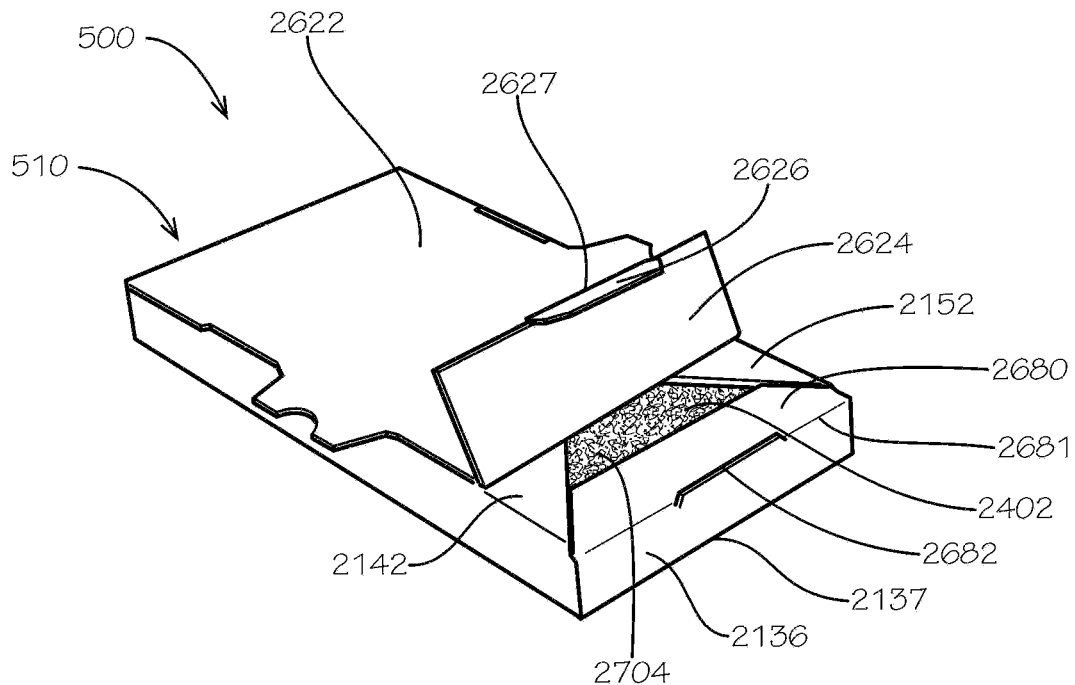
FIG. 31 illustrates a third step of the method of assembling the temperature-regulating lid of FIG. 29.

Referring to FIG. 31, the third left and right extension flaps 2644,2654 (shown in FIG. 28) can be folded towards the temperature-regulating insert 2402. Then, the front side panel 2136 can be folded at the corresponding bend line 2137 towards the temperature-regulating insert 2402, and the front extension flap 2680 can be folded at the corresponding bend line 2681 towards the temperature-regulating insert 2402, such that the front extension flap 2680 can lie parallel to, and may rest on, the top surface 2704 of the temperature-regulating insert 2402. In some aspects, one or more portions of the front extension flap 2680 can be tucked under the first left and right extension flaps 2142,2152 to maintain the front extension flap 2680 in the illustrated orientation. Furthermore, the secondary top panel locking tab 2626 of the secondary top panel 2624 can be folded towards the temperature-regulating insert 2402 at the bend line 2627, such that the secondary top panel locking tab 2626 is oriented at about 90° relative to the secondary top panel 2624, as shown.

Figure 32:
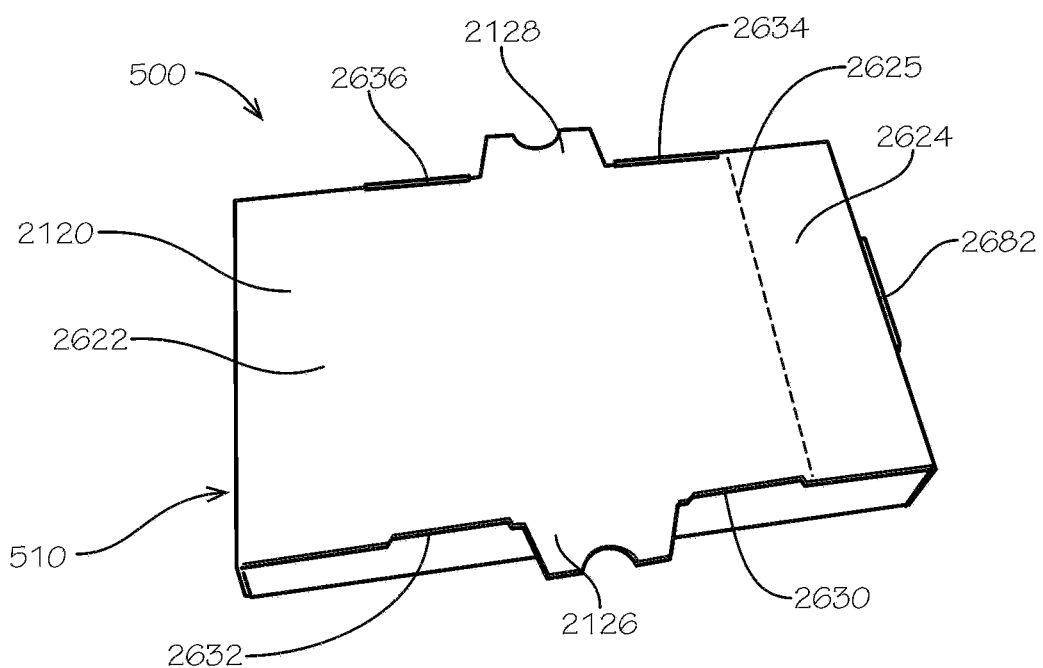
FIG. 32 illustrates a final step in the method of assembly the temperature-regulating lid of FIG. 29.

FIG. 32 illustrates a next and final step in the method of assembling the temperature-regulating lid 500. As shown, the secondary top panel 2624 can be folded at the corresponding bend line 2625 towards the temperature-regulating insert 2402 (shown in FIG. 27). The secondary top panel locking tab 2626 (shown in FIG. 28) can be inserted through the front slot 2682 to retain the temperature-regulating lid 500 in the assembled orientation. In other aspects, the various elements of the lid box 510 can be folded in any order that achieves substantially the same assembled orientation of the temperature-regulating lid 500.

Figure 33:
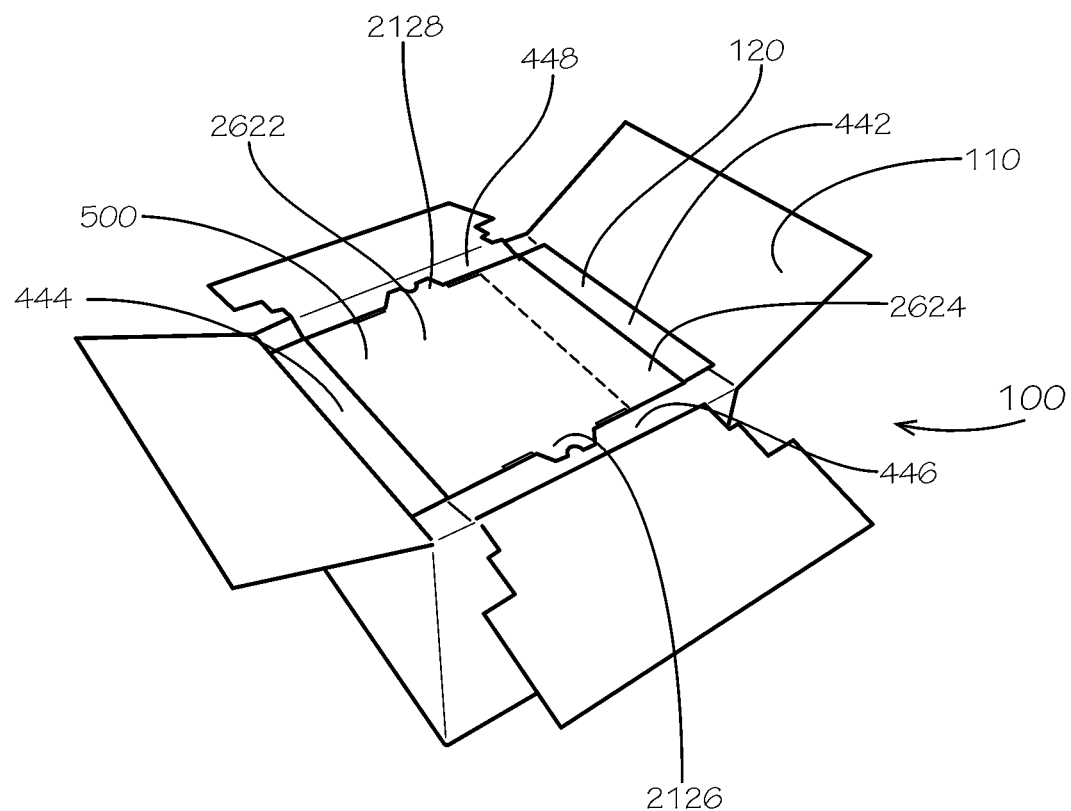
FIG. 33 is a top perspective view of the temperature-regulating lid of FIG. 29 mounted to the insulated box assembly of FIG. 1.

FIG. 33 illustrates the assembled temperature-regulating lid 500 of FIG. 32 mounted with the insulated box assembly 100. The temperature-regulating lid 500 can be placed over the top opening 432 (shown in FIG. 4A) of the inner box 120, such that the top opening 432 is completely covered. As shown, the left wing 2126 can engage the left top flap 446, and the right wing 2128 can engage the opposite right top flap 448 to support the temperature-regulating lid 500 on the inner box 2820. In other aspects, the left and right wings 2126,2128 can engage the opposite front and back top flaps 442,444. In aspects wherein the rear wing 2123 (shown in FIG. 18) is present, the rear wing 2123 can also engage one of the top flaps 442,444,446,448, depending upon the orientation of the temperature-regulating lid 500.

To remove the temperature-regulating lid 500 from the box assembly 100, a user can grasp and lift up on the left wing 2126 and/or the right wing 2128 to lift the temperature-regulating lid 500 away from the box assembly 100. In another aspect, the user can grasp and lift the engagement flap 2164 (shown in FIG. 18), if present, to lift the temperature-regulating lid 500 away from the box assembly 100. In some aspects, the temperature-regulating lid 500 of FIG. 32 can be positioned within the storage hollow 430 of the inner box 120 of the box assembly 100 for storage, as is shown and described further below with reference to FIG. 48, before contents such as food are received therein.

Figure 34:
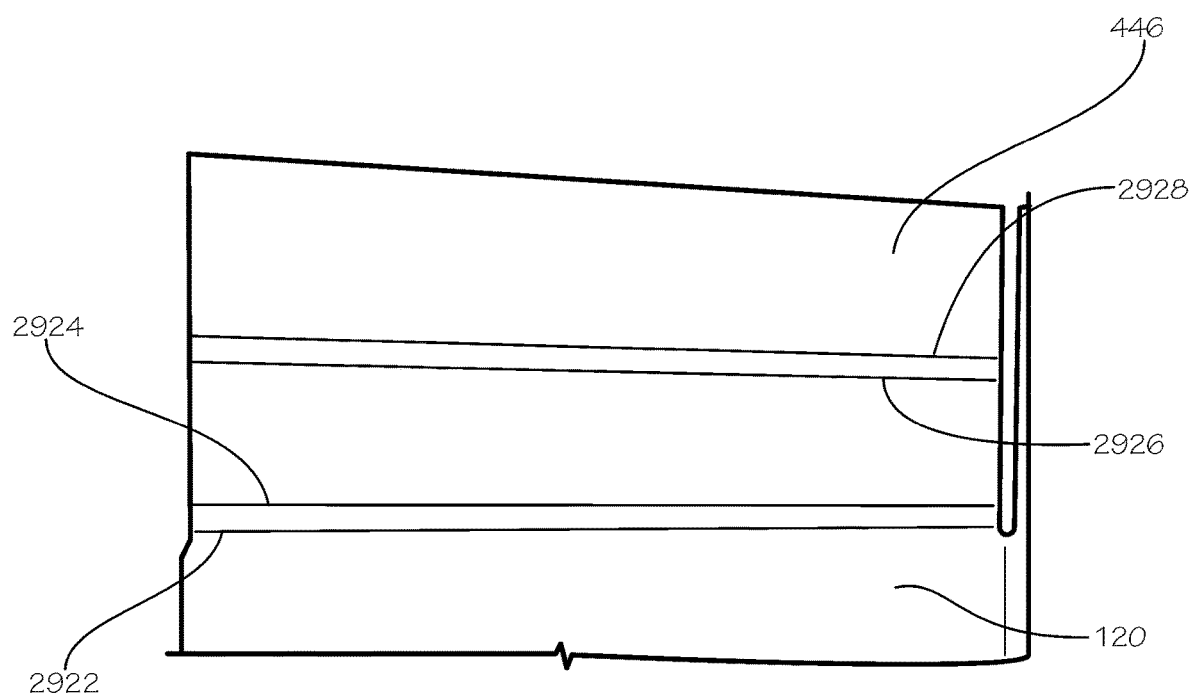
FIG. 34 illustrates a close-up side view of an inner box top panel of the insulated box assembly of FIG. 1.

FIG. 34 illustrates a close up view of the left top flap 446 of the inner box 120, which can be substantially the same as the front, back, and right top flaps 442,444,448 (shown in FIG. 4A). As shown, the left top flap 446 can define a first pair of bend lines 2922,2924 and a second pair of bend lines 2926,2928. In some aspects, when folding the left top flap 446 over the sidewall liner 610 (shown in FIG. 6A) housed between the inner box 120 and outer box 110 (shown in FIG. 1), only some of the bend lines 2922,2924,2926,2928 can be utilized. For example, in one particular aspect, the left top flap 446 can be folded at bend lines 2922 and 2926. In other aspects, any number and combination of the bend lines 2922,2924,2926,2928 can be utilized when folding the left top flap 446 over the sidewall liner 610. Each of the front, back, and right top flaps 442,444,448 can be folded in substantially the same manner as the left top flap 446.

Figure 35:
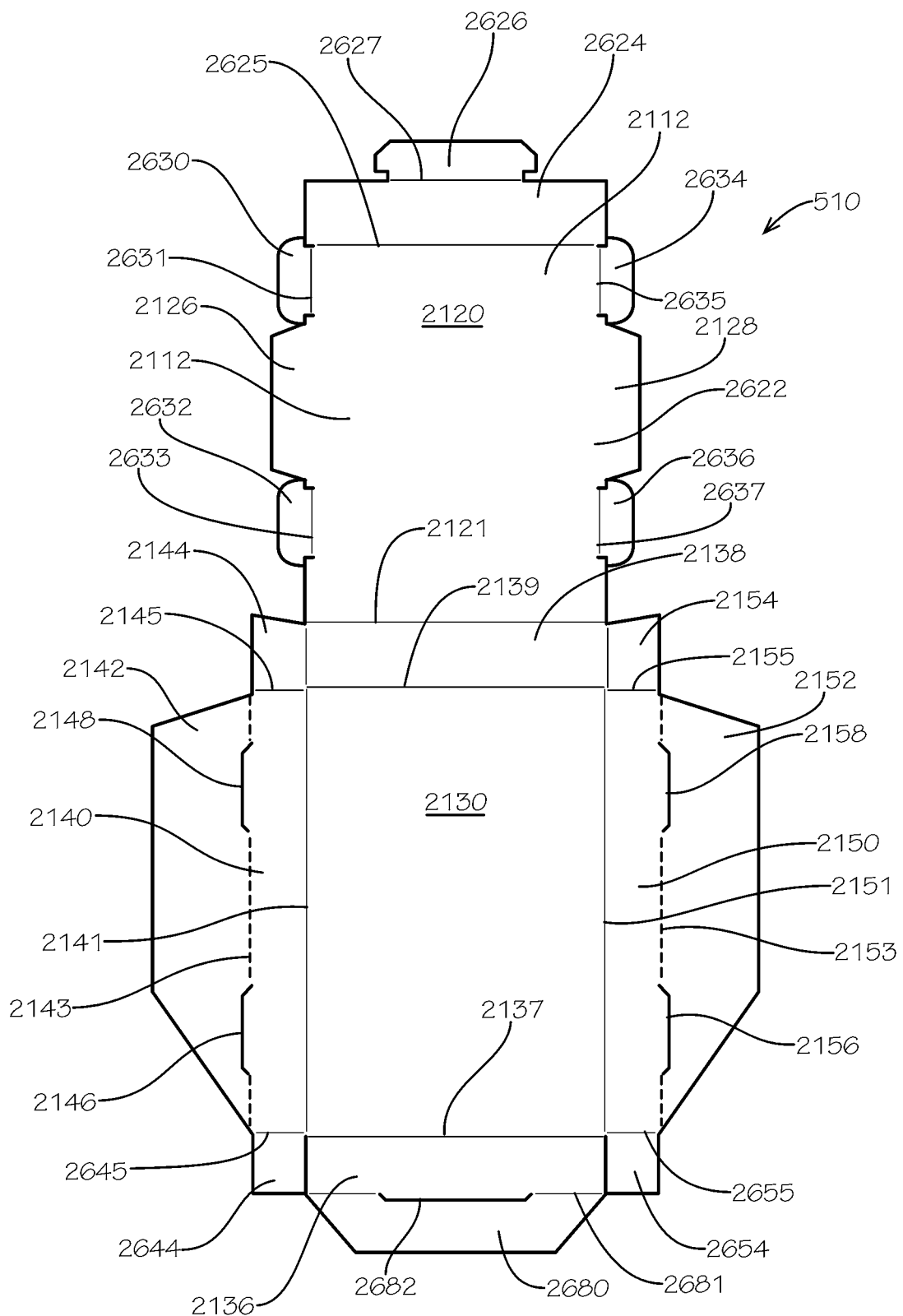
FIG. 35 illustrates a top view of the temperature-regulating lid, in accordance with another aspect of the present disclosure, wherein the temperature-regulating lid in is the blank orientation.
Figure 36:
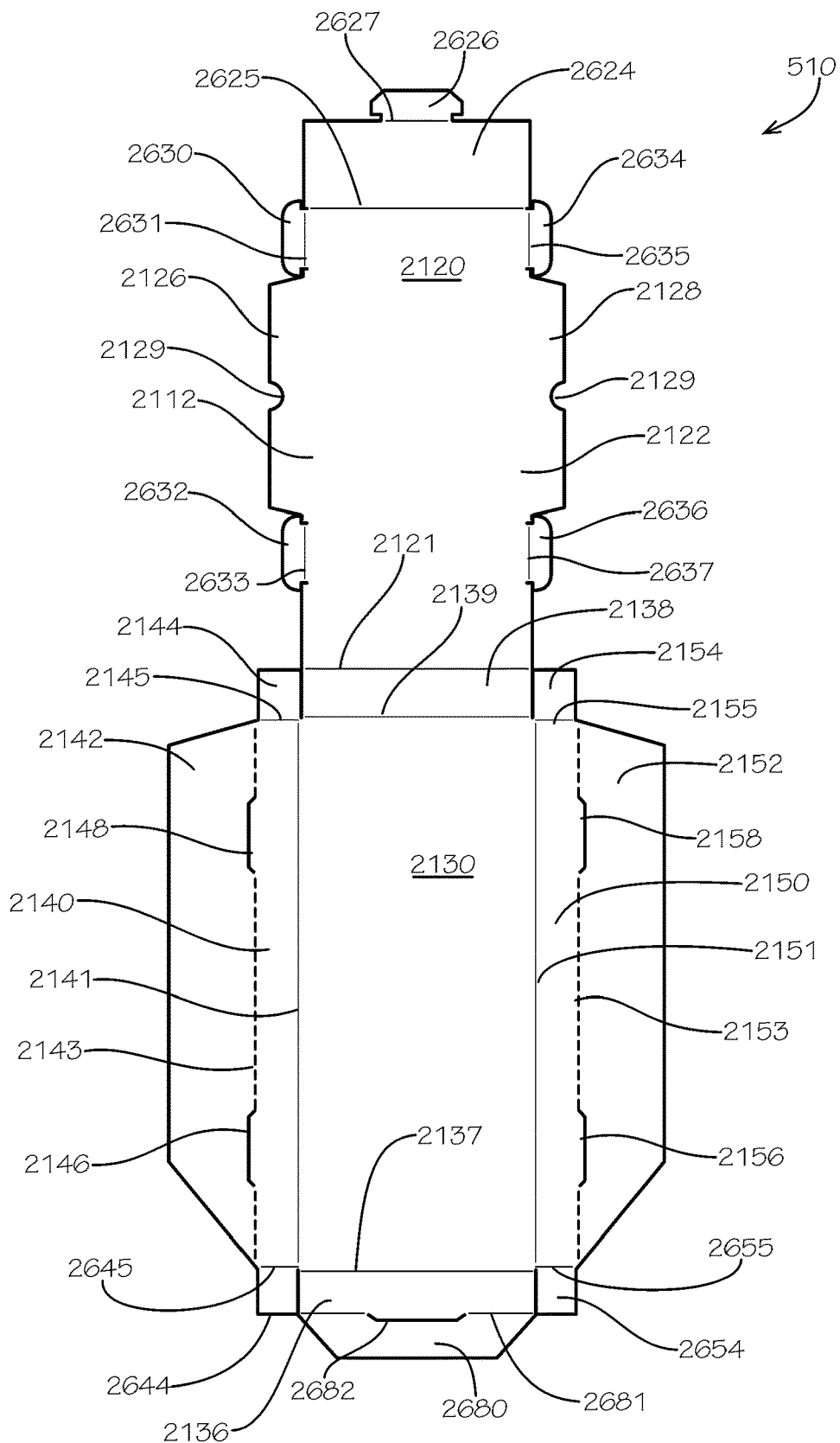
FIG. 36 illustrates a top view of the temperature-regulating lid, in accordance with still another aspect of the present disclosure, wherein the temperature-regulating lid in is the blank orientation.

FIG. 35 illustrates another aspect of the lid box 510 for the temperature-regulating lid 500 (shown in FIG. 27), wherein the lid box 510 is shown in the blank orientation. FIG. 36 illustrates still another aspect of the lid box 510 for the temperature-regulating lid 500, wherein the lid box 510 is shown in the blank orientation.

Figure 37:
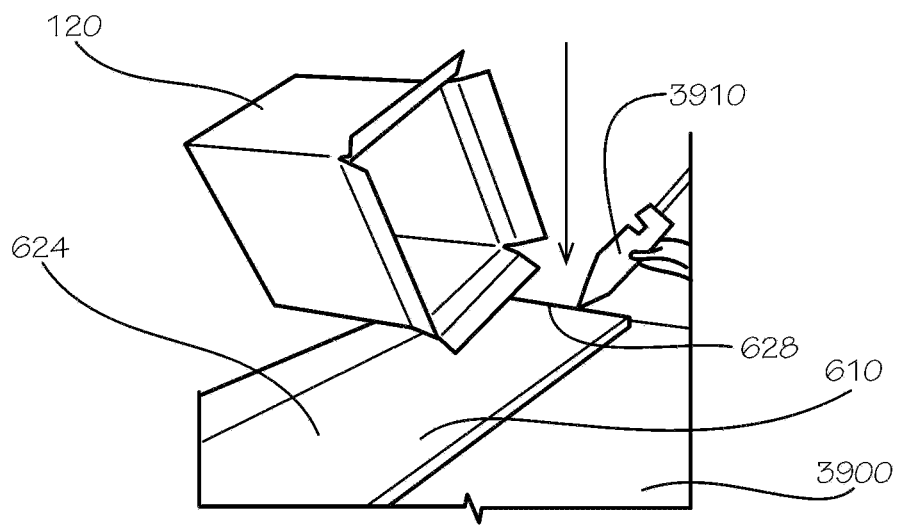
FIG. 37 illustrates a first step in a method of assembling the insulated box assembly of FIG. 1, according to another aspect of the disclosure.
Figure 38:
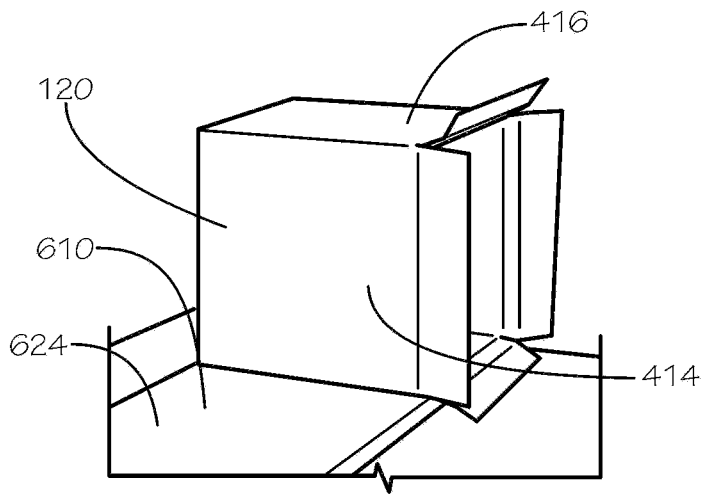
FIG. 38 illustrates a second step in the method of assembling the insulated box assembly of FIG. 1.
Figure 39:
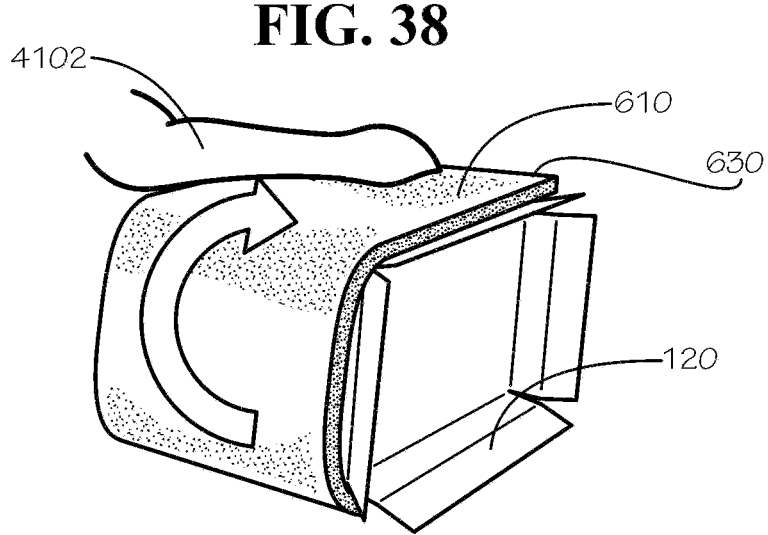
FIG. 39 illustrates a third step in the method of assembling the insulated box assembly of FIG. 1.

A method for assembling the insulated box assembly 100 of FIG. 1 is also disclosed and is illustrated in FIGS. 37-50. Referring to FIG. 37, the method can comprise lying the sidewall liner 610 on a support surface 3900 and applying a first fastener (not shown), such as hot glue any other suitable fastener, to the inner surface 624 of the sidewall liner 610 at the first end 628 and a second fastener (not shown) to the inner surface 624 at the second end 630 (shown in FIG. 6B). For example, in one aspect, hot glue can be applied to the first and second ends 628,630 of the sidewall liner 610 by a hot glue gun 3910. As shown in FIG. 38, the inner box 120 can be placed on the sidewall liner 610 at the first end 628, such that a lateral sidewall of the inner box 120 (such as the front lateral sidewall 412—shown in FIG. 4A) engages the first fastener to attach the inner box 120 to the sidewall liner 610. As shown in FIG. 39, a next step can comprise wrapping the sidewall liner 610 around the remaining lateral sidewalls of the inner box 120 (such as back lateral sidewall 414, a left lateral sidewall 416, and a right lateral sidewall 418—shown in FIG. 4A). The second fastener can engage the inner box 120 to retain the sidewall liner 610 in the wrapped orientation, as shown.

Figure 40:
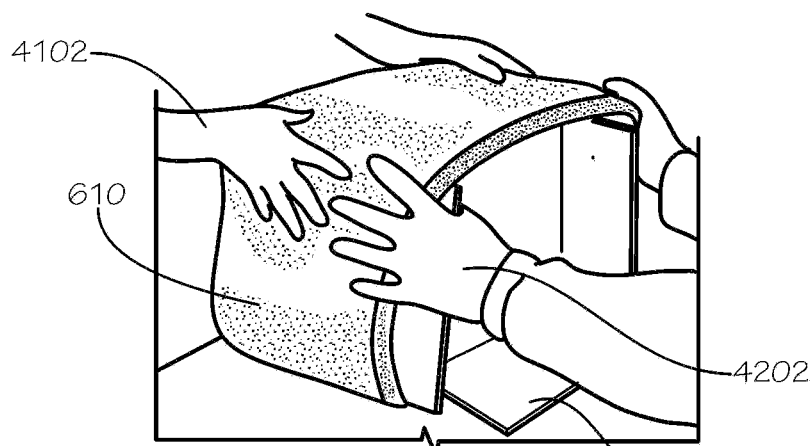
FIG. 40 illustrates a fourth step in the method of assembling the insulated box assembly of FIG. 1.
Figure 41:
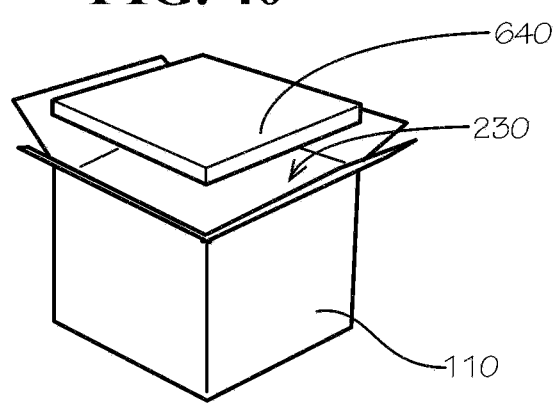
FIG. 41 illustrates a fifth step in the method of assembling the insulated box assembly of FIG. 1.

In some aspects, the steps illustrated in FIG. 37-39 can be performed by a first person 4102. Furthermore, in some aspects, as shown in FIG. 40, the inner box 120 and sidewall liner 610 can next be passed from the first person 4102 to a second person 4202. In other aspects, the first person 4102 can continue assembling the insulated box assembly 100. As shown in FIG. 41, the bottom wall liner 640 can be inserted into the inner cavity 230 of the outer box 110, and can rest on the bottom sidewall 380 (shown in FIG. 3B) of the outer box 110. This step can be performed before, during, or after, any of the steps illustrated in FIGS. 37-40.

Figure 42:
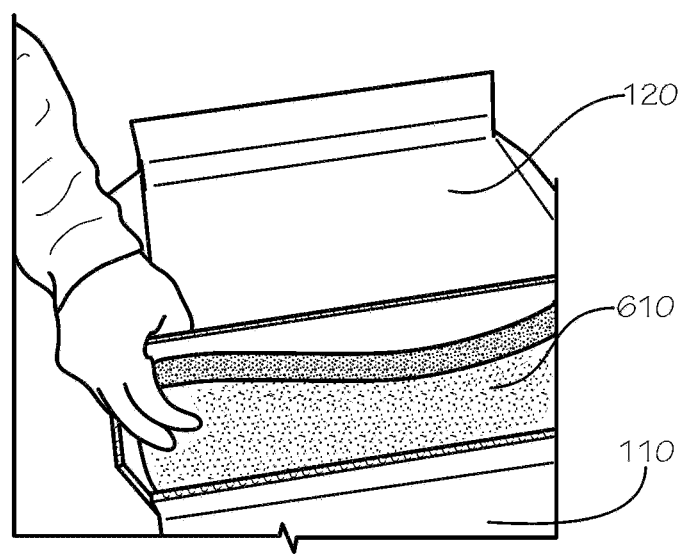
FIG. 42 illustrates a sixth step in the method of assembling the insulated box assembly of FIG. 1.
Figure 43:
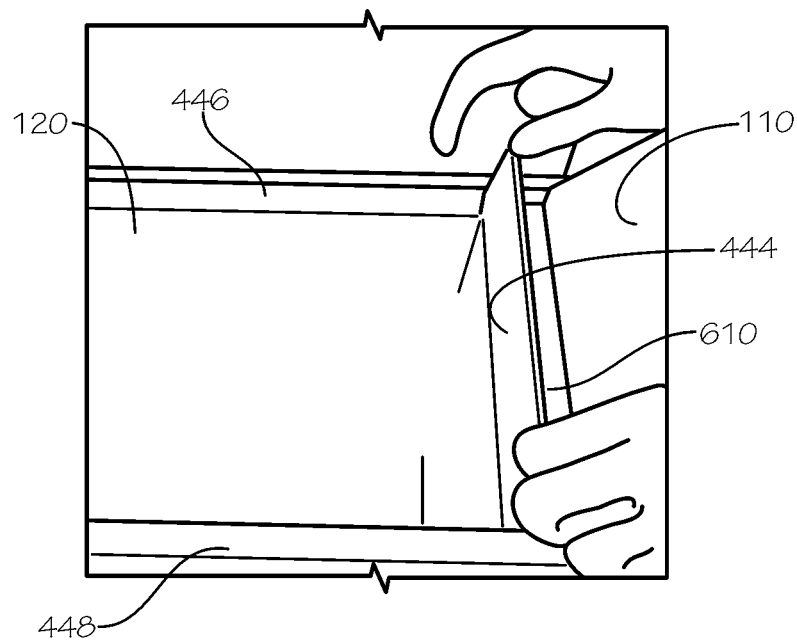
FIG. 43 illustrates a seventh step in the method of assembling the insulated box assembly of FIG. 1.
Figure 44:
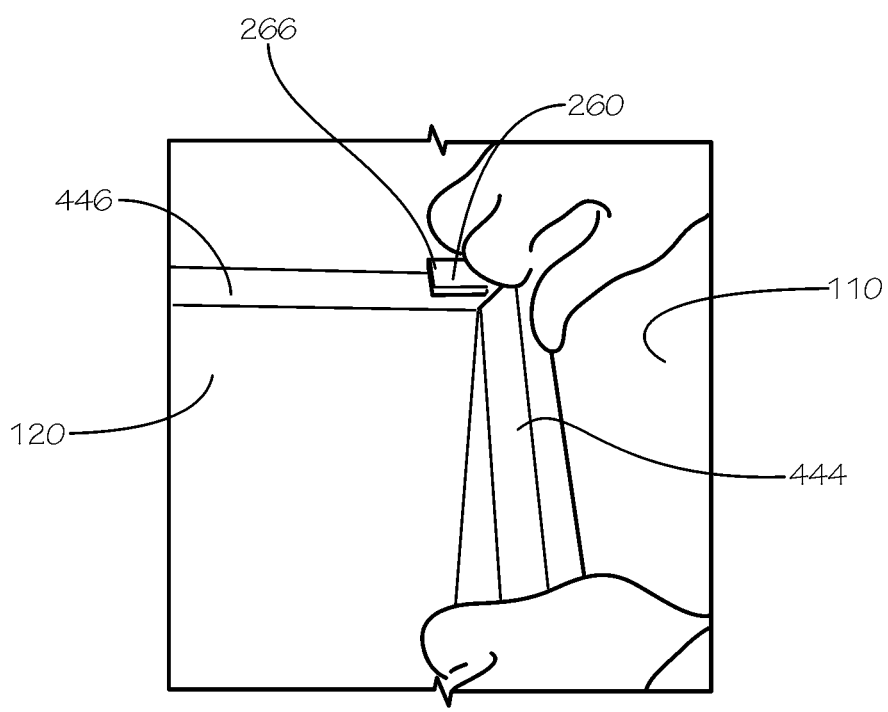
FIG. 44 illustrates an eighth step in the method of assembling the insulated box assembly of FIG. 1.
Figure 45:
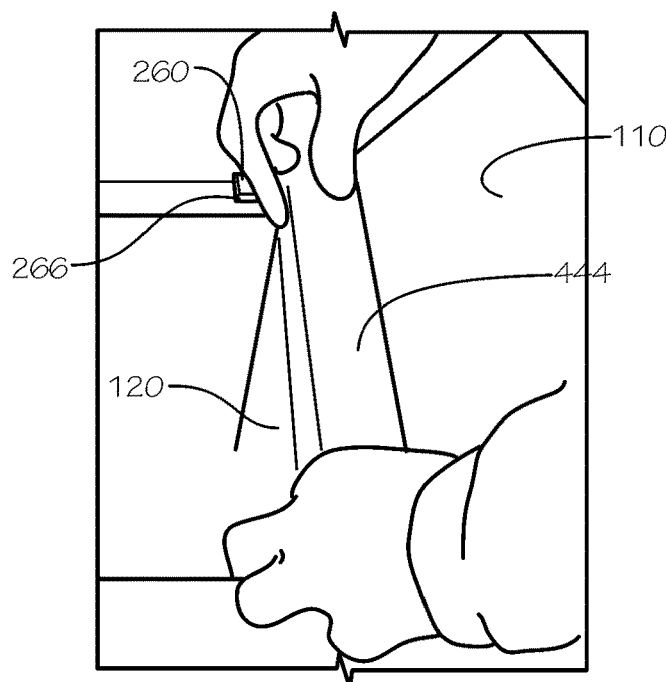
FIG. 45 illustrates a ninth step in the method of assembling the insulated box assembly of FIG. 1.
Figure 46:
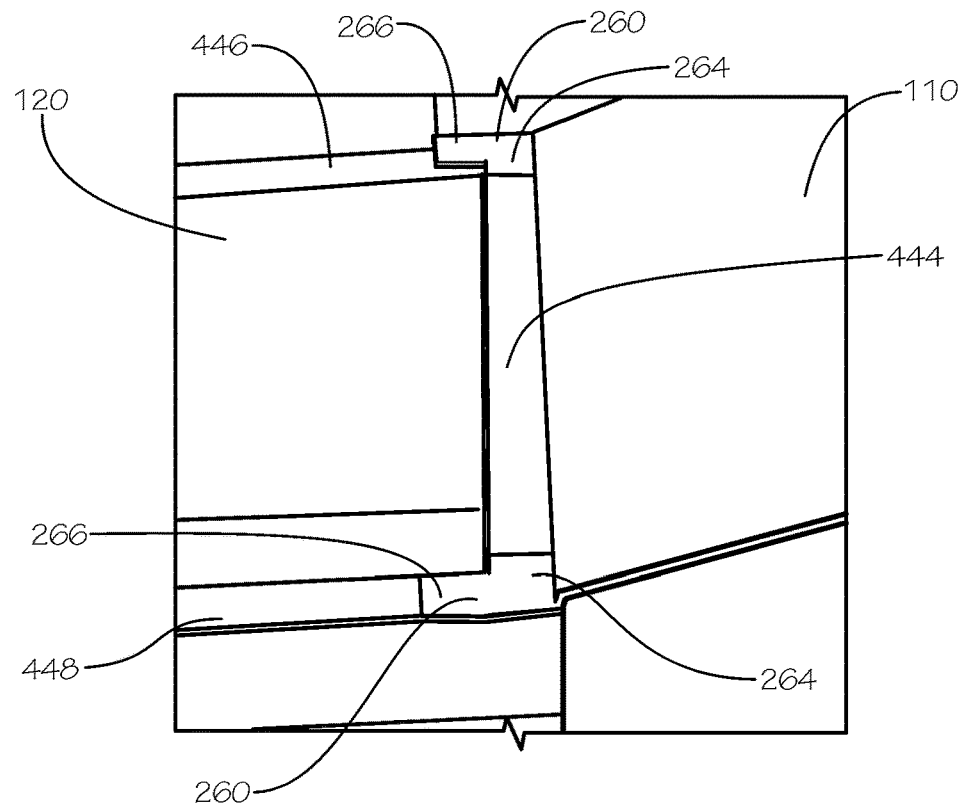
FIG. 46 illustrates a tenth step in the method of assembling the insulated box assembly of FIG. 1.

Referring to FIG. 42, the inner box 120 and sidewall liner 610 can then be inserted into the inner cavity 230 (shown in FIG. 2) of the outer box 110 until the bottom sidewall 480 (shown in FIG. 4B) of the inner box 120 engages the bottom wall liner 640 (shown in FIG. 6A) received in the inner cavity 230. FIGS. 43-46 illustrate the steps of folding the top flaps 442,444,446,448 of the inner box 120 over the sidewall liner 610 and positioning the first and second cover tabs 260,262 of outer box 110. According to example aspects, the left and right top flaps 446,448 can be folded over the sidewall liner 610. The first and second cover tabs 260,262 can then be folded towards the sidewall liner 610 such that the leg 264 of each cover tab 260,262 extends under the adjacent front or back top flap 442,444, and the arm 266 of each cover tab 260,262 can rest on top of the adjacent left or right top flap 446,448. The front and back top flaps 442,444 can then be folded over the sidewall liner 610, such that the legs 264 of the cover tabs 260,262 are positioned between the sidewall liner 610 and the adjacent front or back top flap 442,444. In other aspects, the arms 266 of each cover tab 260,262 can also be received between the sidewall liner 610 and the adjacent left or right top flap 446,448. In still another aspect, the arms 266 of each cover tab 260,262 can also be received between the sidewall liner 610 and the adjacent left or right top flap 446,448, and the leg 264 of each cover tab 260,262 can rest on top of the adjacent front or back to flap 442,444.

Figure 47:
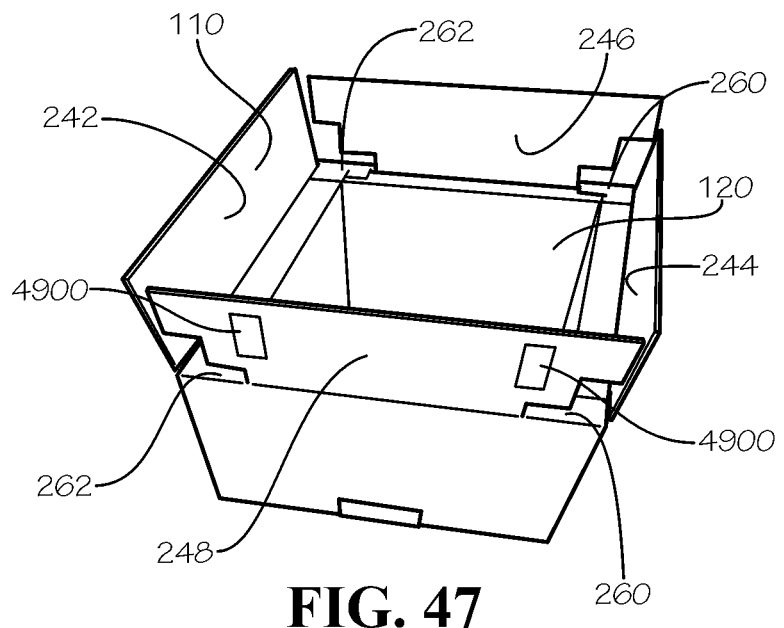
FIG. 47 illustrates an eleventh a second step in the method of assembling the insulated box assembly of FIG. 1.
Figure 48:
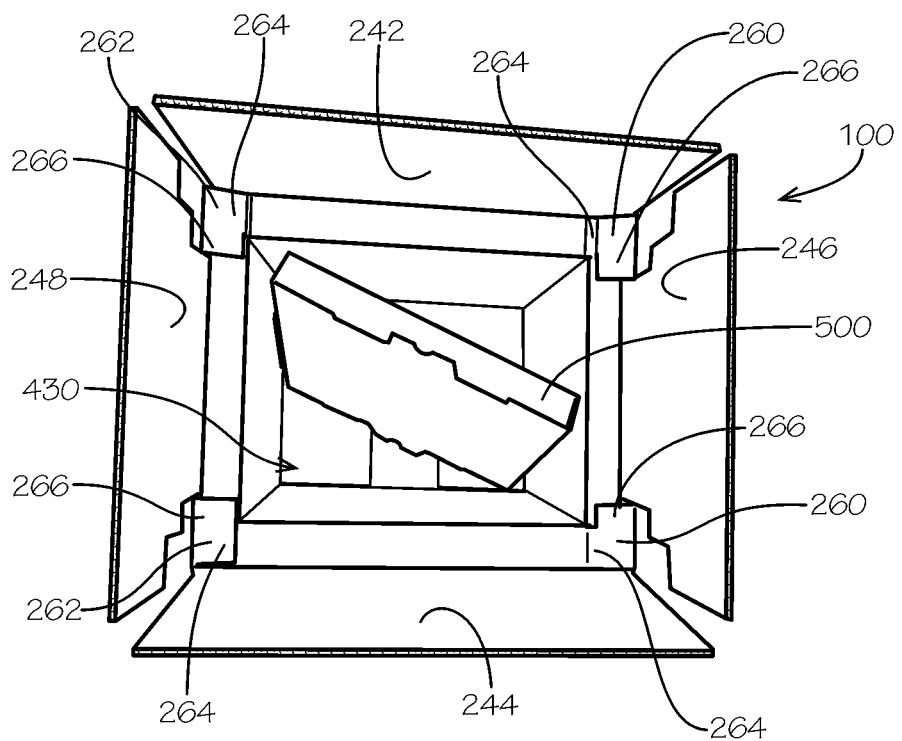
FIG. 48 illustrates a twelfth step in the method of assembling the insulated box assembly of FIG. 1.
Figure 49:
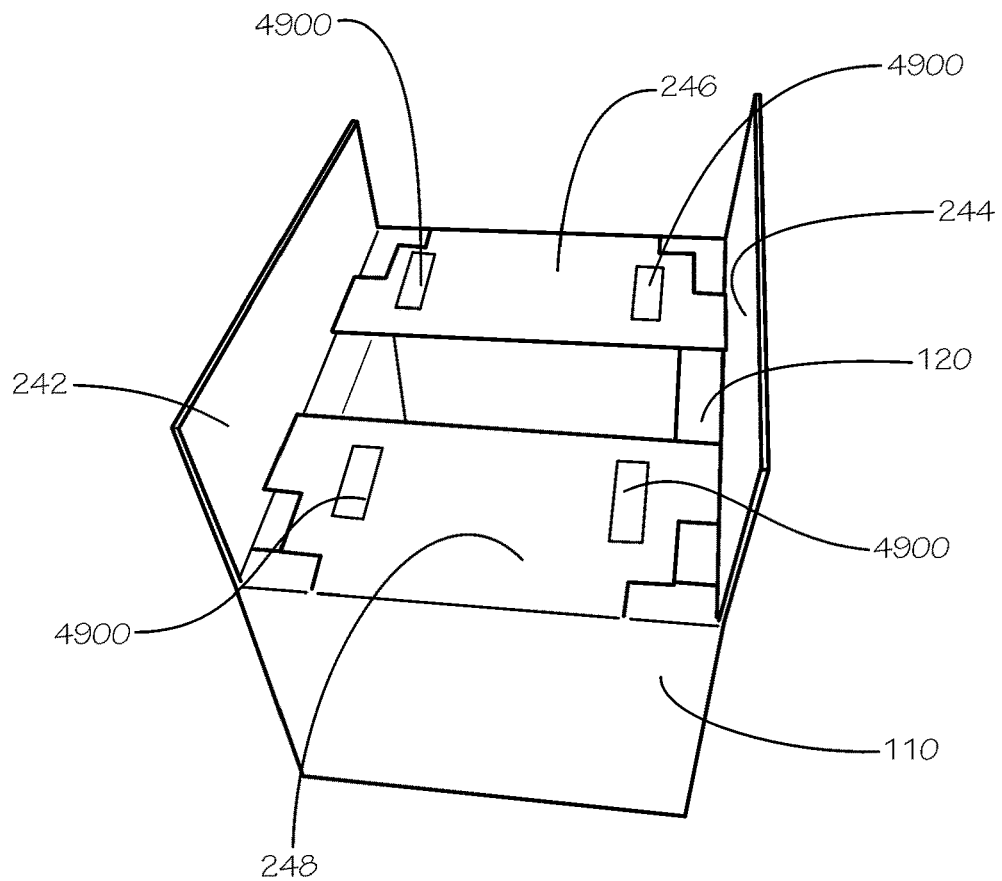
FIG. 49 illustrates a thirteenth step in the method of assembling the insulated box assembly of FIG. 1.
Figure 50:
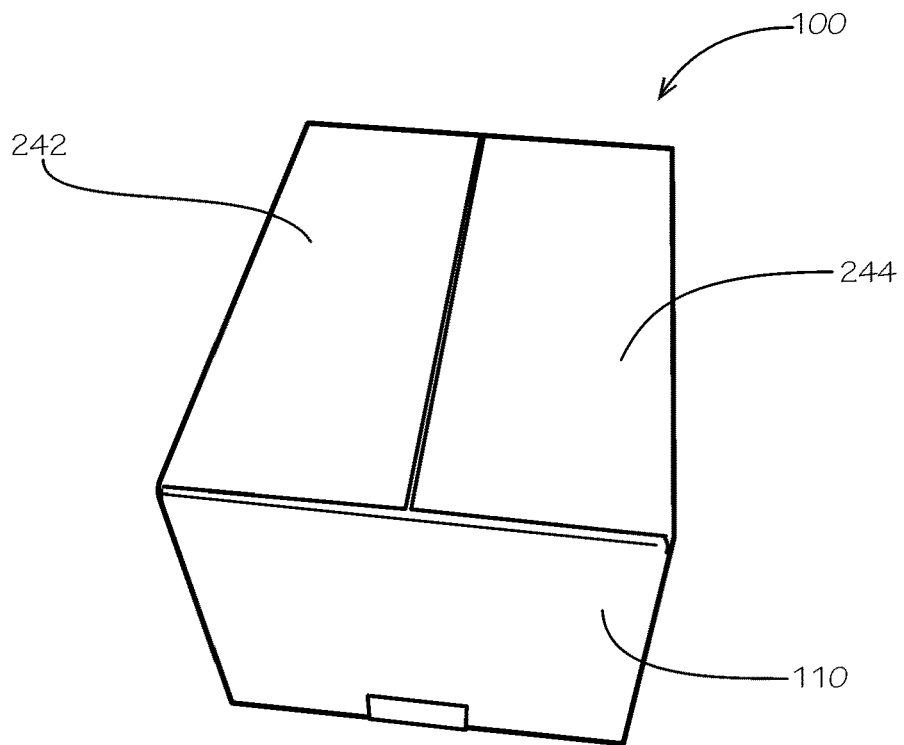
FIG. 50 illustrates a final step in the method of assembling the insulated box assembly of FIG. 1.
Figure 51:
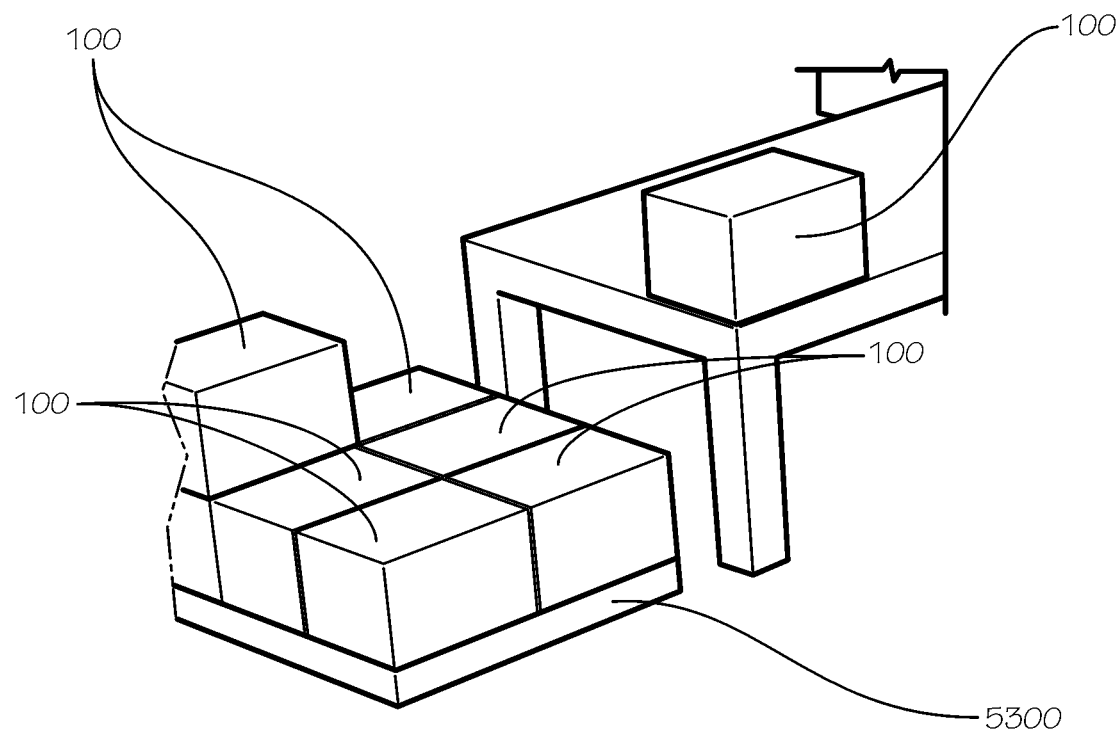
FIG. 51 illustrates a plurality of the assembled insulated box assemblies of FIG. 52 stacked on a pallet.

As shown in FIG. 47, fasteners 4900, such as strips of adhesive for example, can be applied to the left top panel 246 and right top panel 248 of the outer box 110. In some aspects, as shown in FIG. 48, the temperature-regulating lid 500 or temperature-regulating lid 500 (shown in FIG. 5A) can be received in the storage hollow 430, as shown. In other aspects, the temperature-regulating lid 500 or temperature-regulating lid 500 can be mounted to the insulated box assembly 100, as described above. FIG. 49 illustrates a next step wherein the left and right top panels 246,248 are folded towards the inner box 120. As shown in FIG. 50, the front top panel 242 and back top panel 244 can then be folded towards the left and right top panels 246,248 (shown in FIG. 2A) and can engage the fasteners 4900 (shown in FIG. 47) to retain the insulated box assembly 100 in the assembled orientation, as shown. FIG. 51 illustrates stacking the assembled insulated box assemblies 100 on a pallet 5300.

Figure 52:
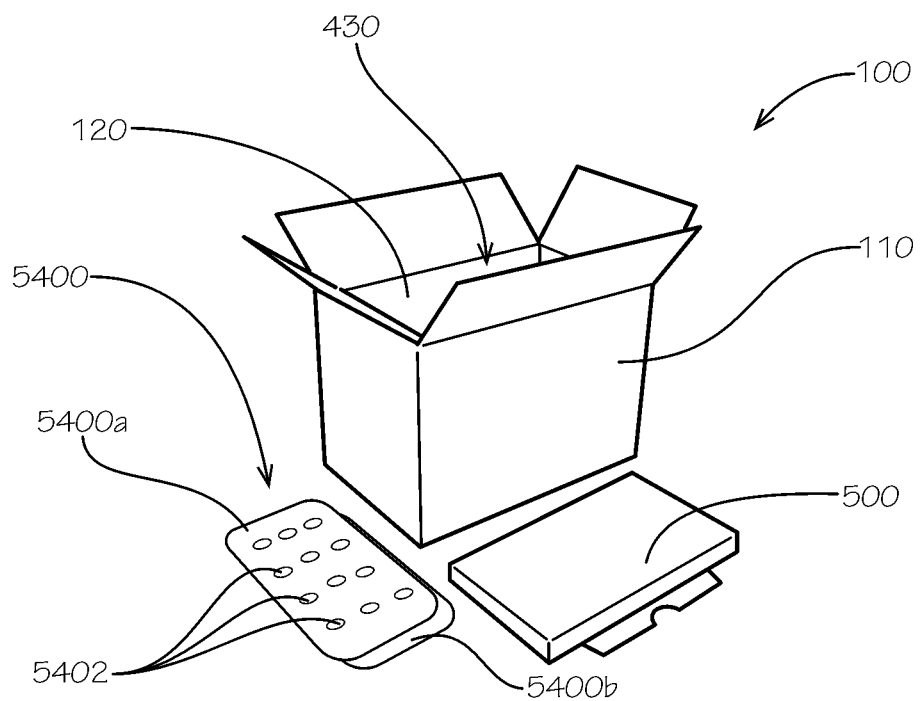
FIG. 52 illustrates the insulated box assembly, according to another aspect of the present disclosure.

Referring to FIG. 52, some aspects of the insulated box assembly 100 can comprise slotted inserts 5400, as shown, for use with dry ice (not shown). For example, in one particular aspect, dry ice can be inserted in the storage hollow 430 of the inner box 120 and a first slotted insert 5400a can be received thereon. Contents such as perishable food, or other temperature-sensitive items, can then be placed within the storage hollow 430 on top of the slotted insert 5400a. Another slotted insert 5400b can be placed on top of the contents within the storage hollow 430, and additional dry ice can be placed on top of the slotted insert 5400b. In some aspects, the temperature-regulating lid 500 can be placed on top of the additional dry ice and the insulated box assembly 100 can be sealed closed, such that the contents of the storage hollow are retained within the insulated box assembly 100. According to example aspects, the dry ice can cool the air around it. Each of the slotted inserts 5400a,b can comprise one or more slots 5402 or holes through which cold air can pass to cool the contents of the storage hollow 430. The slotted inserts 5400a,b can also protect the contents from contacting the dry ice. Other example aspects of the insulated box assembly 100 can comprise more or fewer slotted inserts 5400.

Figure 53:
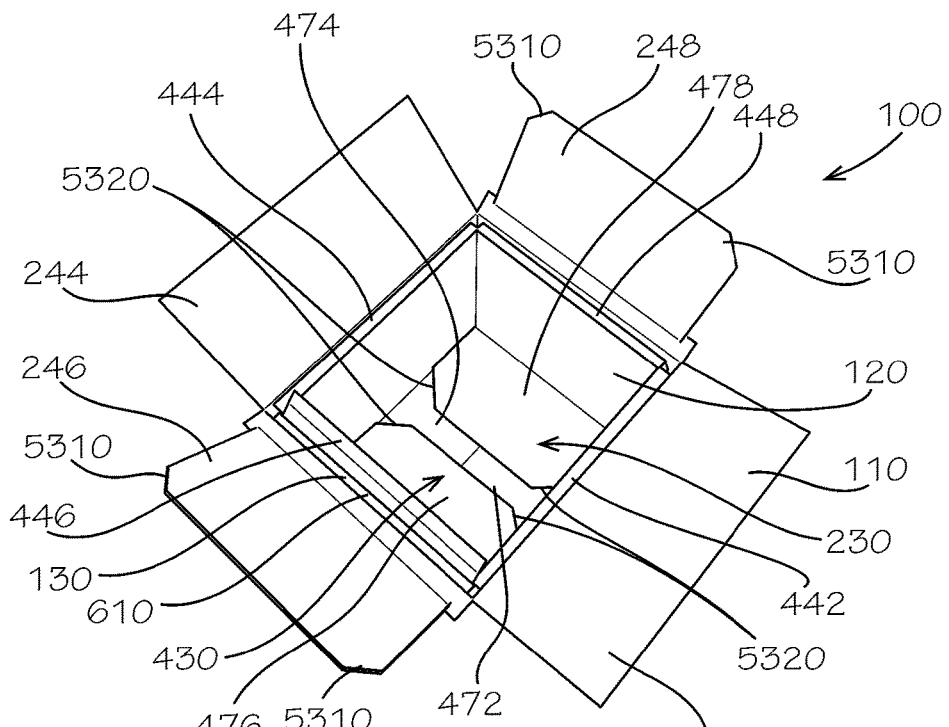
FIG. 53 is a top view of the insulated box assembly, according to another aspect of the present disclosure.

FIG. 53 illustrates another aspect of the insulated box assembly 100. As shown, the insulated box assembly 100 comprises the outer box 110, the inner box 120, and the insulating lining 130 received therebetween. The outer box 110 can comprise the top panels 242,244,246,248 and the bottom panels 372,374,376,378 (shown in FIG. 3A). According to example aspects, each of the left and right top panels 246,248 can define a pair of chamfered distal corners 5310. In some aspects, the chamfered distal corners 5310 can indicate that the left and right top panels 246,248 can be folded first when folding the top panels 242,244,246,248 towards the inner cavity 230. The inner box 120 can comprise the top flaps 442,444,446,448 and the bottom panels 472,474,476,478. As shown, in the present aspect, each of the left and right bottom panels 476,478 can also define a pair of chamfered distal corners 5320. The left and right bottom panels 476,478 can be folded towards the storage hollow 430, and the front and back bottom panels 472,474 can be folded towards the storage hollow 430 thereafter, such that the front and back bottom panels 472,474 can be oriented below the left and right bottom panels 476,478, relative to the orientation shown. As such, in some aspects, the chamfered distal corners 5320 can be provided to indicate that the left and right bottom panels 476,478 can be folded first. Furthermore, as shown, in the present aspect, the sidewall liner 610 of the insulating lining 130 can define a thickness that can be less than a thickness of the sidewall liner 610 shown in FIG. 1.

Figure 54:
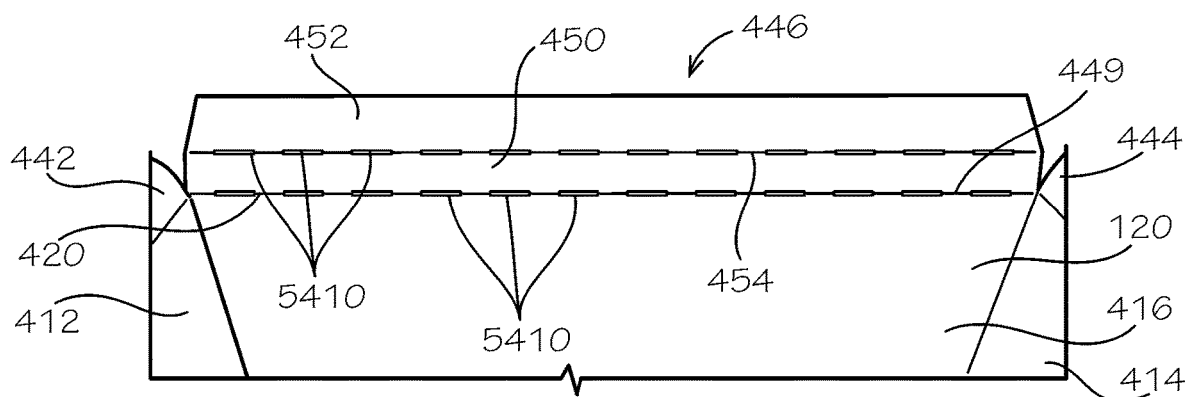
FIG. 54 is a top perspective view of a top flap of the inner box of the insulated box assembly of FIG. 53.

FIG. 54 illustrates a close-up view of the left top flap 446 of the inner box 120, which can also be representative of the front, back, and right top flaps 442,444,448 (right top flap 448 shown in FIG. 53). As shown, the left top flap 446 can define the first flap section 450 and the second flap section 452. The first flap section 450 can be connected to the left lateral sidewall 416 at the top end 420 of the inner box 120 at the bend line 449. The second flap section 452 can be connected to the first flap section 450 at the bend line 454 distal from the left lateral sidewall 416. As shown, in the present aspect, each of the bend lines 449,454 can be formed by a series of perforations 5410. The perforations 5410 can facilitate folding at the bend lines 449,454.

Figure 55:
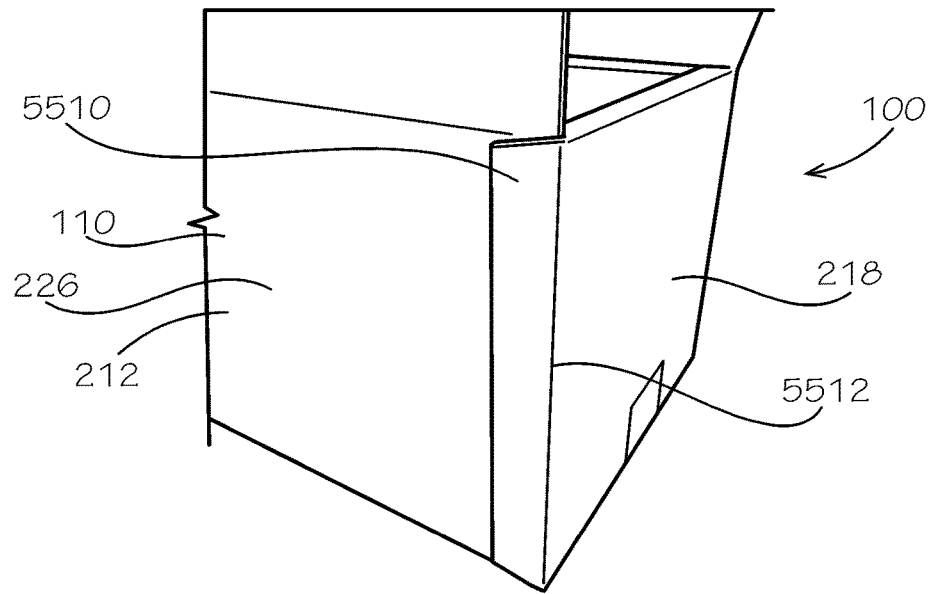
FIG. 55 is a side view of the insulated box assembly of FIG. 53.

FIG. 55 is a side view of the insulated box assembly 100 showing the front and right lateral sidewalls 212,218 of the outer box 110. As shown, a connector strip 5510 can extend from a first side of the right lateral sidewall 218 proximate the front lateral sidewall 212, and the connector strip 5510 can be connected to the right lateral sidewall 218 at a bend line 5512. The connector strip 5510 can be configured to fold along the bend line 5512, such that the connector strip 5510 can abut the outer surface 226 of the outer box 110 at the front lateral sidewall 212. The connector strip 5510 can be secured to the front lateral sidewall 212 with a fastener (not shown), such as, for example, staples, stitching, an adhesive such as glue, or the like, which can retain the lateral sidewalls 212,214,216,218 (back and left lateral sidewalls 214,216 shown in FIG. 2A) in the assembled configuration shown in FIG. 53.

Figure 56:
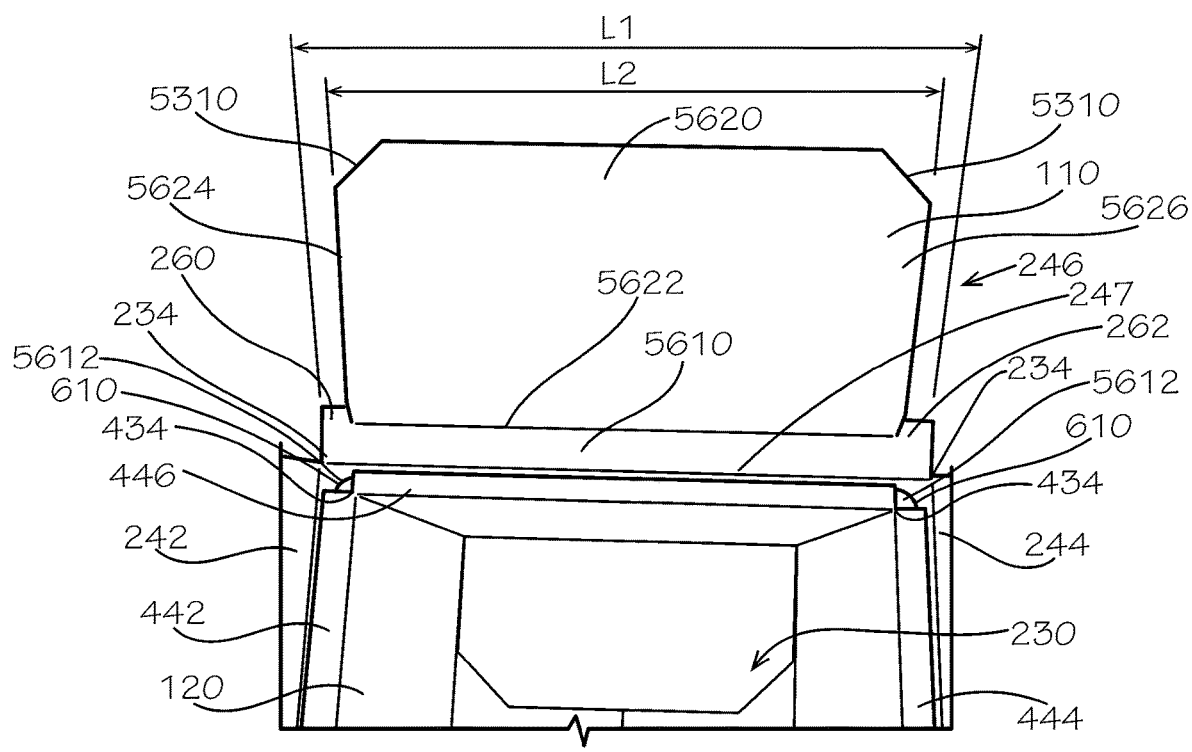
FIG. 56 is a top view of a top panel of the outer box of the insulated box assembly of FIG. 53 in an unfolded orientation.

FIG. 56 illustrates a close-up view of the left top panel 246 of the outer box 110, which can also be representative of the right top panel 248 (shown in FIG. 53), before the left top panel 246 is folded towards the inner cavity 230. As shown, when the top flaps 442,444,446,448 (right top flap 448 shown in FIG. 53) of the inner box 120 are folded over the sidewall liner 610, top corner portions 5612 of the sidewall liner 610 proximate to the top corners 234,434 of the outer and inner boxes 110,120 can be exposed, as shown. As described above, the left top panel 246 can be connected to the left lateral sidewall 216 (shown in FIG. 2A) at the bend line 247. In the present aspect, the left top panel 246 can define a first panel section 5610 proximate to the left lateral sidewall 216 and a second panel section 5620 distal to the left lateral sidewall 216, as shown. The second panel section 5620 can be connected to the first panel section 5610 at a bend line 5622, such that the second panel section 5620 can fold relative to the first panel section 5610. According to example aspects, the first panel section 5610 can define a length $L_1$ that can be greater than a length $L_2$ of the second panel section 5620. The first cover tab 260 can extend from the first panel section 5610 partially alongside a first end 5624 of the second panel section 5620, and the second cover tab 262 can extend partially alongside a second end 5626 of the second panel section 5620. In the present aspect, each of the first and second cover tabs 260,262 can be substantially rectangular in shape, as opposed to the L-shaped cover tabs 260,262 described with respect to FIG. 2A. In other aspects, the cover tabs 260,262 can define any other suitable shape.

Figure 57:
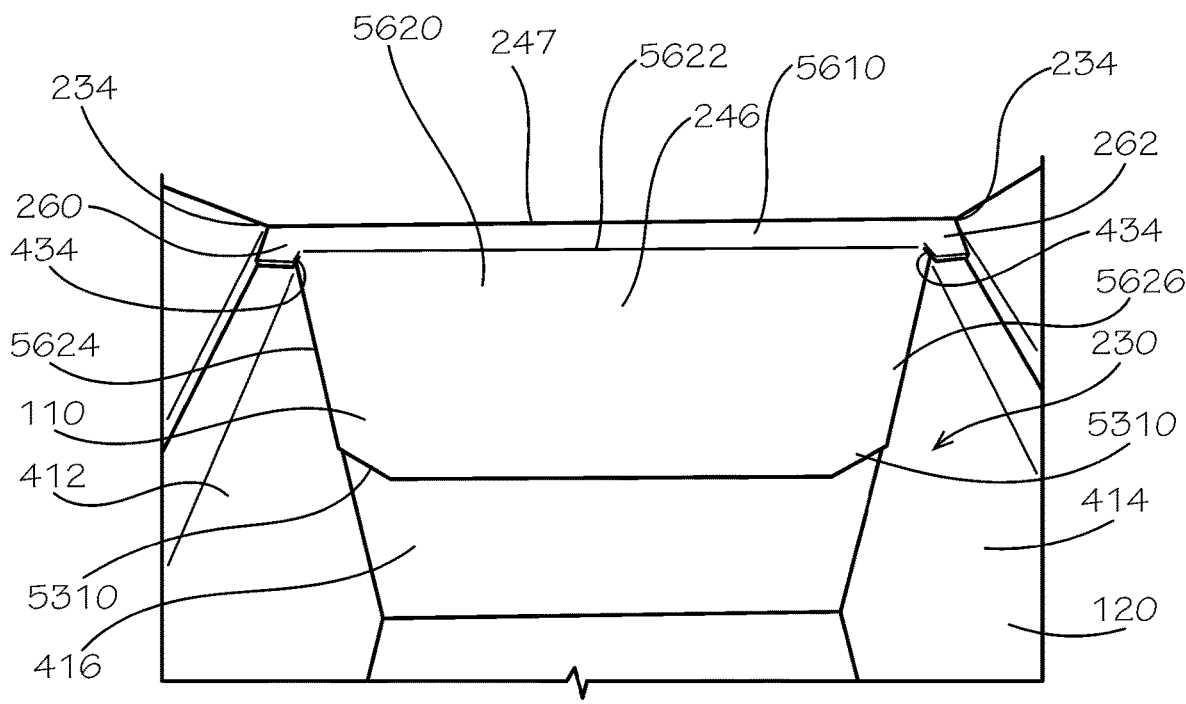
FIG. 57 is a top perspective view of the top panel of FIG. 56 in a folded orientation.

FIG. 57 illustrates the left top panel 246 folded over the sidewall liner 610 (shown in FIG. 53) and towards the inner cavity 230. The first panel section 5610 of the left top panel 246 can be folded such that it is oriented substantially perpendicular to the left lateral sidewall 216 (shown in FIG. 2A) and, in some aspects, the first panel section 5610 can rest on the first flap section 450 (shown in FIG. 54A) of the left top flap 446 (shown in FIG. 53). The first cover tab 260 and second cover tab 262 can cover the exposed top corner portions 5612 of the sidewall liner 610 proximate the corresponding top corners 234,434. The second panel section 5620 can be wedged in between the front and back lateral sidewalls 412,414 of the inner box 120 and folded to be about perpendicular to the first panel section 5610, as shown. In this orientation, the first end 5624 of the second panel section 5620 can abut the front lateral sidewall 412 and the second end 5626 of the second panel section 5620 can abut the back lateral sidewall 414, such that the second panel section 5620 is retained between the front and back lateral sidewalls 412,414 of the inner box 120. According to example aspects, the right top panel 248 (shown in FIG. 53) can be folded in substantially the same manner.

Figure 58:
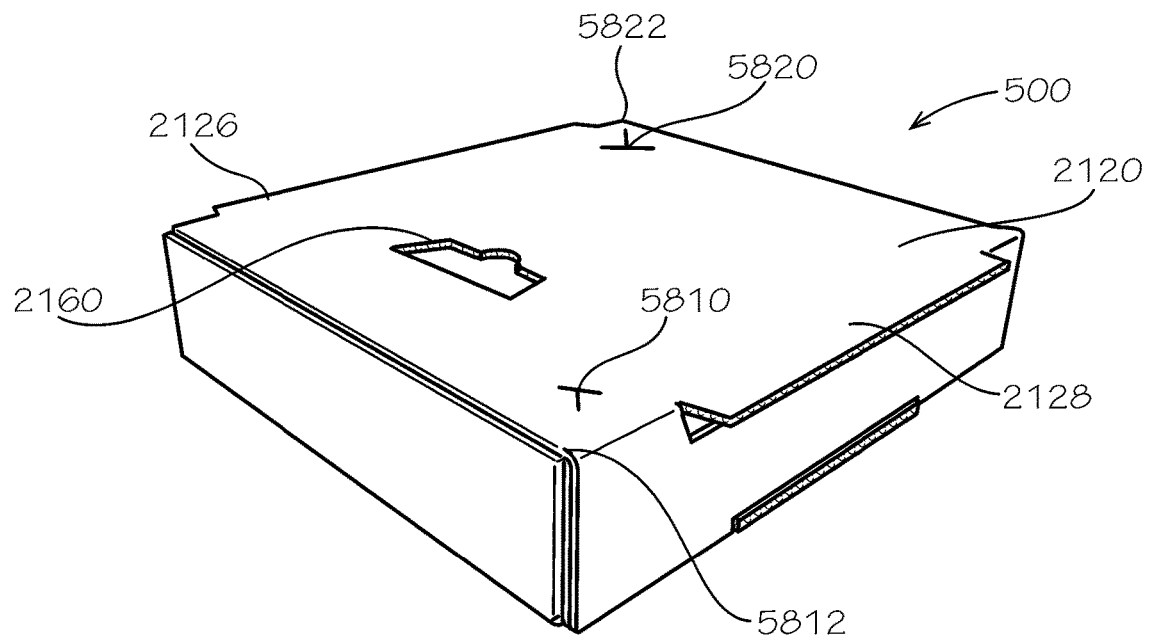
FIG. 58 is a top perspective view of the temperature-regulating lid according to another aspect of the present disclosure.
Figure 59:
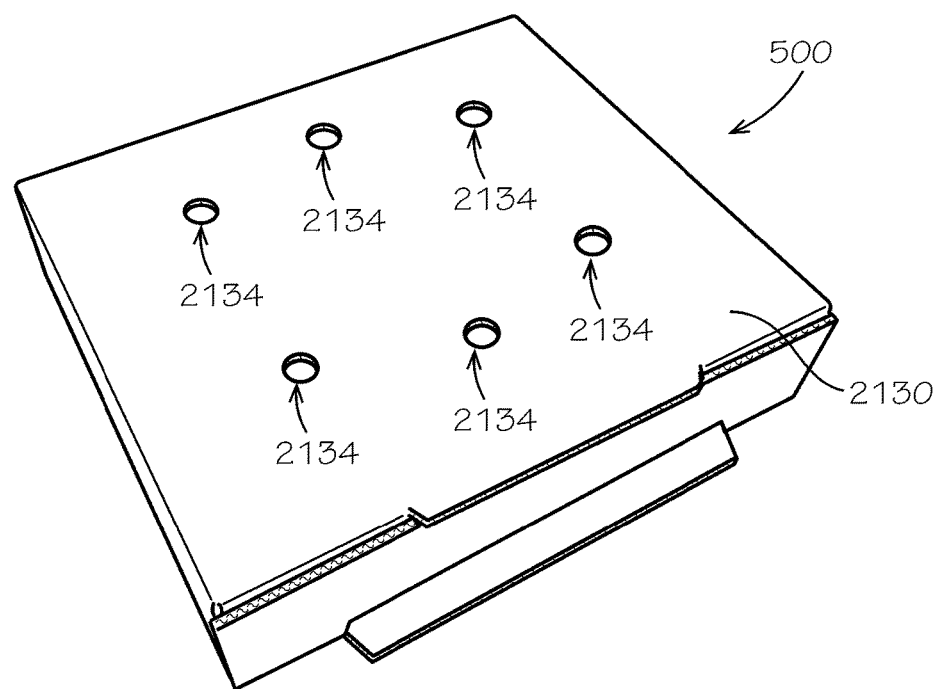
FIG. 59 is a bottom perspective view of the temperature-regulating lid of FIG. 58.

FIG. 58 illustrates the temperature-regulating lid 500 in the assembled orientation, according to another example aspect of the disclosure. Example aspects of the temperature-regulating lid 500 can define the top panel 2120 and the bottom panel 2130 (shown in FIG. 59). The top panel 2120 can define the left and right wings 2126,2128 extending therefrom. The top panel 2120 can further define the engagement opening 2160 formed therethrough, which can be configured to allow the engagement of a user's hand/finger(s) therewith. In the present aspect, a first T-shaped slit 5810 can be formed proximate to a first corner 5812 of the top panel 2120, and a second T-shaped slit 5820 can be formed proximate to a second corner 5822 of the top panel 2120 diagonally opposite from the first corner 5812. According to example aspects, a card (not shown) including indicia thereon can engage the first and second T-shaped slits 5820,5822. For example, opposing corners of the card can be tucked in to the opposing first and second T-shaped slits 5820,5822 to retain the card on the temperature-regulating lid 500. In one aspect, the card can be a recipe card. The recipe card can detail a recipe for preparing food contents received within the insulated box assembly 100 (shown in FIG. 1). In other aspects, the card can be a contents card detailing the contents received within the insulated box assembly 100, while in still other aspects, the indicia can represent any other information generally related to the insulated box assembly 100 or the contents therein. In some aspects, the indicia can be printed on the card, while in other aspects, the indicia can be formed on or attached to the card by any other suitable means known in the art. Furthermore, the card can be formed from printing paper, card stock, construction paper, or any other suitable paper or other material known in the art. FIG. 59 illustrates the bottom panel 2130 of the temperature-regulating lid 500. In some aspects, as shown, the bottom panel 2130 can define the one or more holes 2134 formed therein. The holes 2134 can allow for the passage of air therethrough, as described above.

Figure 60:
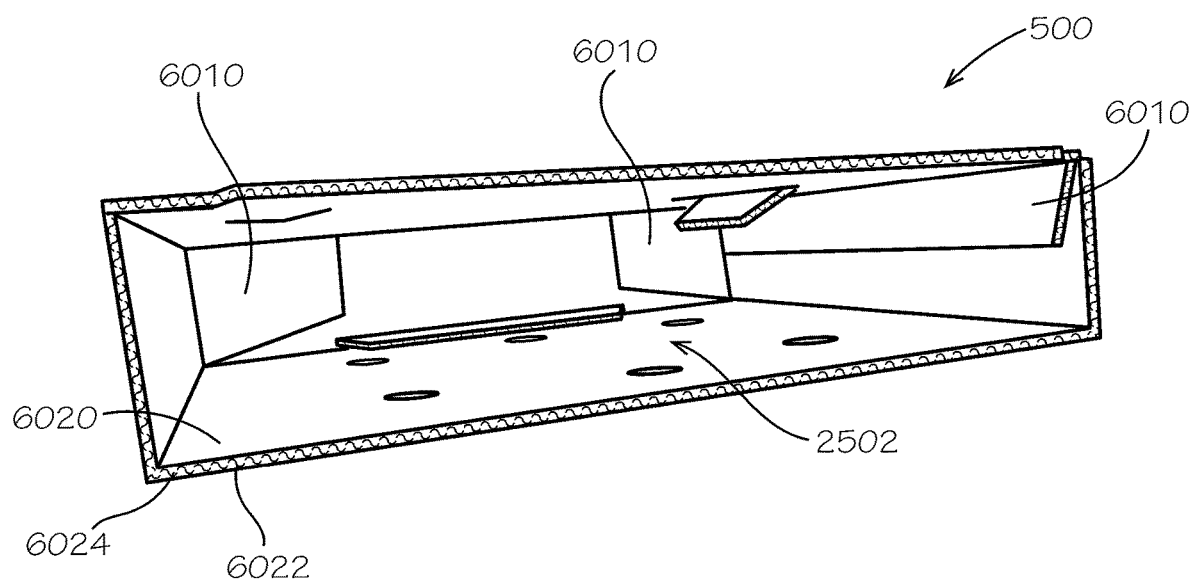
FIG. 60 is a front view of the temperature-regulating lid of FIG. 58.

FIG. 60 is a front view of the temperature-regulating lid 500, showing the interior cavity 2502 defined in the assembled orientation. According to example aspects, the temperature-regulating insert 2402 (shown in FIG. 27) can be received within the interior cavity 2502. In some aspects, the temperature-regulating insert 2402 can be a bag of dry ice, a cotton pad, or any other suitable insert. Furthermore, as shown, the temperature-regulating lid 500 of the present aspect can define various connecting flaps 6010. The connecting flaps 6010 can be secured to corresponding elements of the temperature-regulating lid 500 by a fastener (not shown) to retain the temperature-regulating lid 500 in the assembled orientation. In the present aspect, the fastener can be an adhesive, such as glue. In other aspects, the fastener can be any other suitable fastener, including, but not limited to, hook and loop fasteners, staples, stitching, or the like. As also shown in FIG. 60, example aspects of the temperature-regulating lid 500 can be formed from a corrugated fiberboard material comprising a first linerboard 6020, a second linerboard 6022, and a fluted corrugated sheet 6024 therebetween.

Figure 61:
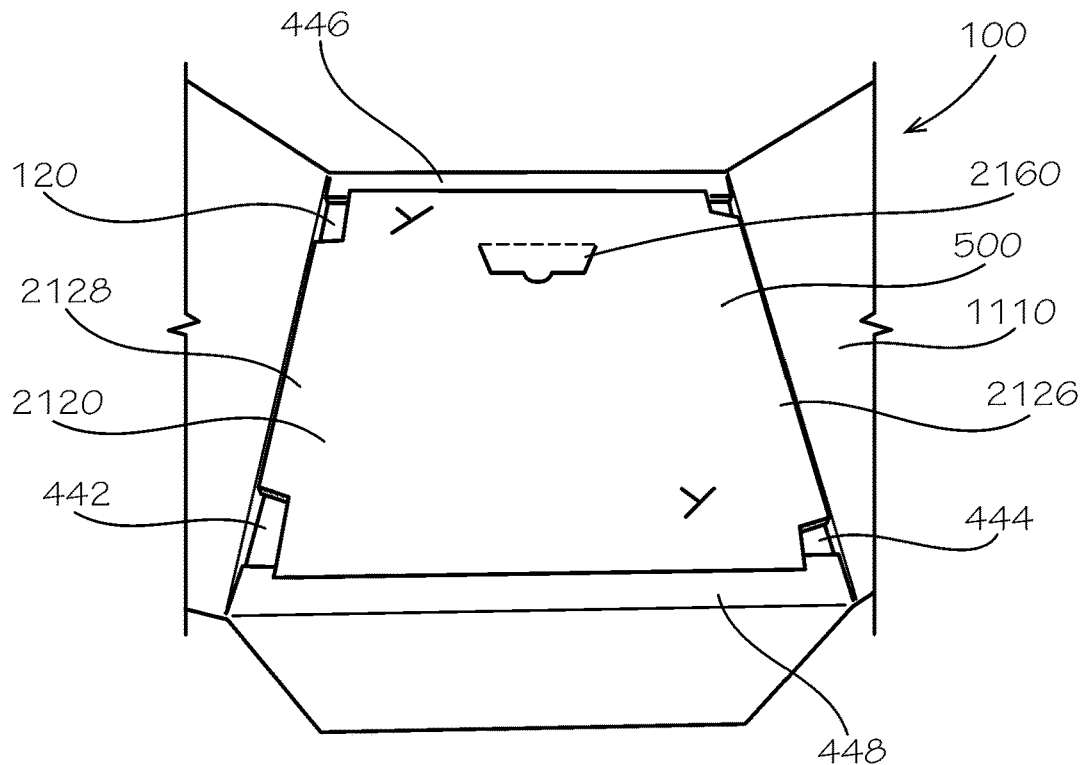
FIG. 61 is a top perspective view of the temperature-regulating lid of FIG. 58 assembled with the insulated box assembly of FIG. 53.

FIG. 61 illustrates the temperature-regulating lid 500 of FIGS. 58-60 mounted on the insulated box 100 assembly of FIG. 53. As shown, in the present aspect, the left wing 2126 of the temperature-regulating lid 500 can be supported on the back top flap 444 of the inner box 120 and the right wing 2128 of the temperature-regulating lid 500 can be supported on the front top flap 442 of the inner box 120, such that the storage hollow 430 (shown in FIG. 4A) is completely enclosed. In other aspects, depending upon the shape of temperature-regulating lid, the left and right wings 2126, 2128 can be supported on the left and right top flaps 446,448 of the inner box 120. The top panel 2120 of the temperature-regulating lid 500 can face outward from the storage hollow 430, such that a user can engage the engagement opening 2160 to remove the temperature-regulating lid 500 from the insulated box assembly 100. In other aspects, the temperature-regulating lid 500 can be removed by gripping one or both of the left and right wings 2126,2128 and pulling the temperature-regulating lid 500 away from the insulated box assembly 100.

Figure 62:
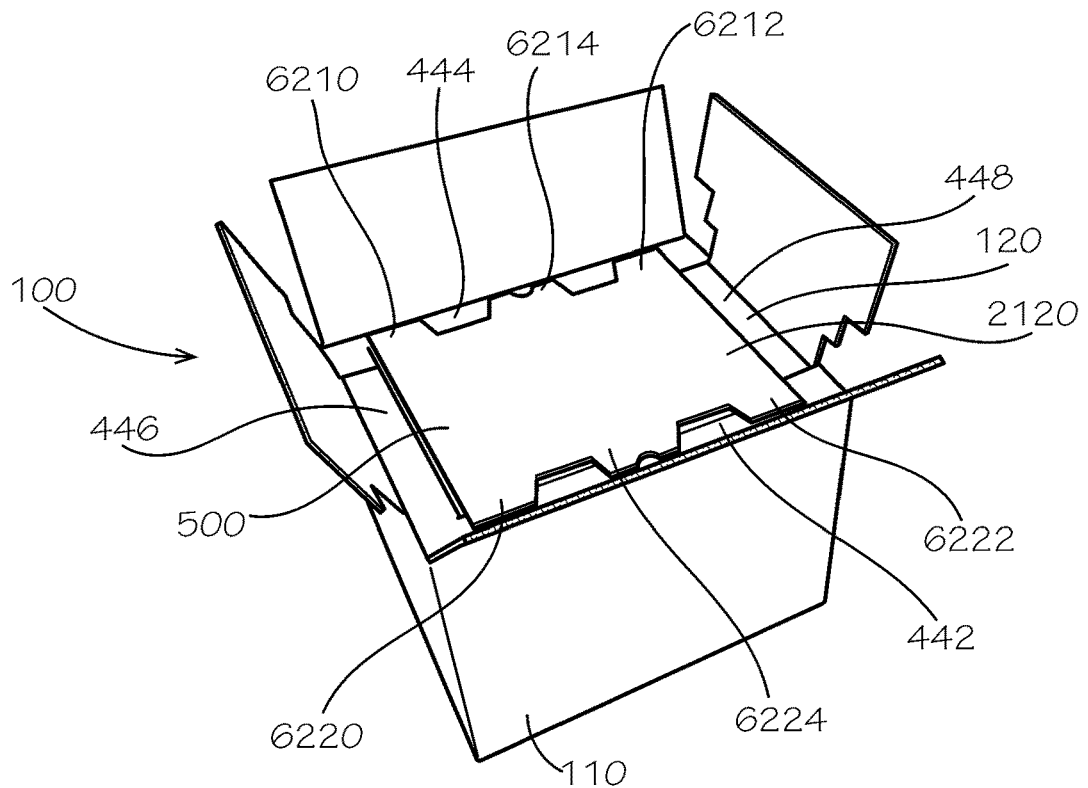
FIG. 62 is a top perspective view of the insulated box assembly according to another aspect of the present disclosure.

FIG. 62 illustrates the insulated box assembly 100 and the temperature-regulating lid 500 therefor, according to another aspect. In the present aspect, the top panel 2120 of the temperature-regulating lid 500 can define a first left wing 6210, a second left wing 6212, and a third left wing 6214 therebetween, as shown. The top panel 2120 can also define a first right wing 6220, a second right wing 6222, and a third right wing 6224 therebetween. In the present aspect, the first left wing 6210, second left wing 6212, and third left wing 6214 can be supported on the back top flap 444 of the inner box 120 when the temperature-regulating lid 500 is mounted on the insulated box assembly 100. Furthermore, the first right wing 6220, second right wing 6222, and third right wing 6224 can be supported on the front top flap 442. In other aspects, the first, second, and third left wings 6210, 6212,6214 can be supported on the left top flap 446, and the first, second, and third right wings 6220,6222,6224 can be supported on the right top flap 448.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible That which is claimed is:

1. An insulated box assembly comprising:
    an outer box comprising a plurality of outer lateral sidewalls, the outer lateral sidewalls defining an inner surface, the inner surface defining an inner cavity;
    an inner box, wherein the inner box is a monolithic inner box comprising an inner bottom sidewall and a plurality of inner lateral sidewalls, the monolithic inner box received in the inner cavity, the inner lateral sidewalls defining an outer surface;
    a monolithic sidewall liner received in the inner cavity between the outer lateral sidewalls and the inner lateral sidewalls, the sidewall liner defining a first end and a second end, the sidewall liner further defining a liner outer surface extending from the first end to the second end and an uninterrupted liner inner surface opposite the liner outer surface and extending from the first end to the second end, the liner outer surface facing the inner surface of the outer lateral sidewalls, and the liner inner surface facing the outer surface of the inner lateral sidewalls; and
    a lid assembly disposed within the inner cavity, the lid assembly comprising a lid box and a lid liner, wherein a portion of a lid box is disposed between the lid liner and the monolithic sidewall liner, such that the lid liner is not in contact with the monolithic sidewall liner.

2. The insulated box assembly of claim 1, wherein the liner inner surface is fastened to at least one of the inner lateral sidewalls to secure the sidewall liner thereto.

3. The insulated box assembly of claim 1, wherein;
    the inner lateral sidewalls define an inner surface opposite the outer surface; and
    the inner surface of the inner lateral sidewalls defines a storage hollow configured to receive contents therein.

4. The insulated box assembly of claim 1, wherein each of the inner lateral sidewalls comprises corrugated fiberboard.

5. The insulated box assembly of claim 1, wherein the first end is folded towards the second end to wrap the sidewall liner around the inner lateral sidewalls.

6. The insulated box assembly of claim 1, wherein the plurality of outer lateral sidewalls define a plurality of vertical outer edges, and the sidewall liner is bent into at least one of the vertical outer edges.

7. The insulated box assembly of claim 6, wherein the sidewall liner is bent to define a plurality of lateral liner sides, each of the lateral liner sides oriented between a corresponding one of the inner lateral sidewalls and a corresponding one of the outer lateral sidewalls.

8. The insulated box assembly of claim 7, wherein the liner inner surface defines a curved inner bend between each adjacent pair of the lateral liner sides, and the liner outer surface defines a curved outer bend between each adjacent pair of the lateral liner sides, wherein the curved inner bends confront the inner lateral sidewalls and the curved outer bends confront the outer lateral sidewalls.

9. The insulated box assembly of claim 8, wherein:
    each of the curved outer bends is oriented at a corresponding one of the vertical outer edges;
    the plurality of inner lateral sidewalls define a plurality of vertical inner edges; and
    each of the curved inner bends is oriented at a corresponding one of the vertical inner edges.

10. The insulated box assembly of claim 1, further comprising a bottom wall liner, the bottom wall liner defining a top liner surface and a bottom liner surface.

11. The insulated box assembly of claim 10, wherein:
    the sidewall liner defines a top end and a bottom end opposite the top end; and
    the bottom end of the sidewall liner faces the top liner surface of the bottom wall liner.

12. The insulated box assembly of claim 10, wherein the outer box further comprises an outer bottom sidewall, the top liner surface facing the inner bottom sidewall of the monolithic inner box and the bottom liner surface facing the outer bottom sidewall of the outer box.

13. The insulated box assembly of claim 12, wherein:
    the outer lateral sidewalls are monolithically formed with the outer bottom sidewall such that the outer box is a monolithic outer box.

14. The insulated box assembly of claim 1, wherein the lid liner received is within the lid box, the lid box supported on a top end of the monolithic sidewall liner and disposed within the inner cavity.

15. The insulated box assembly of claim 14, wherein the monolithic inner box comprises at least one top flap folded over the top end of the monolithic sidewall liner, the at least one top flap disposed between the lid box and the monolithic sidewall liner.

16. A method of assembling an insulated box assembly comprising:
    providing an outer box defining an inner cavity, an inner box defining a storage hollow, and an insulating lining comprising a resilient monolithic sidewall liner, the resilient sidewall liner defining a liner outer surface and an uninterrupted liner inner surface, each of the liner outer surface and liner inner surface extending from a first end of the sidewall liner to a second end of the sidewall liner;
    wrapping the sidewall liner around the inner box to position the first end adjacent to the second end, the liner inner surface facing the inner box;
    attaching the liner inner surface to the inner box;
    inserting the inner box and sidewall liner into the inner cavity of the outer box, the sidewall liner oriented between the inner box and the outer box, the liner outer surface facing the outer box, wherein the inner box is a monolithic inner box comprising an inner bottom sidewall and a plurality of inner lateral sidewalls; and
    inserting a lid assembly into the inner cavity of the outer box, the lid assembly comprising a lid box and a lid liner, wherein a portion of a lid box is disposed between the lid liner and the sidewall liner, such that the lid liner is not in contact with the sidewall liner.

17. The method of claim 16, wherein attaching the liner inner surface to the monolithic inner box comprising attaching the liner inner surface at each of the first end and the second end to the monolithic inner box proximate to a vertical edge of the monolithic inner box.

18. The method of claim 16, further comprising inserting a bottom wall liner into the inner cavity of the outer box, the bottom wall liner defining a top liner surface and a bottom liner surface.

19. The method of claim 18, wherein the sidewall liner defines a top end and a bottom end opposite the top end, and the bottom end of the sidewall liner faces the top liner surface of the bottom wall liner.

20. The method of claim 16, wherein wrapping the sidewall liner around the monolithic inner box comprises bending the sidewall liner to define a plurality of lateral liner sides, the liner inner surface defining a curved inner bend between each adjacent pair of the lateral liner sides.

21. The method of claim 16, wherein the lid liner is received within the lid box, the lid box supported on a top end of the sidewall liner and disposed within the inner cavity.

22. The method of claim 21, wherein the monolithic inner box comprises at least one top flap folded over the top end of the sidewall liner, the at least one top flap disposed between the lid box and the sidewall liner.

\* \* \* \* \*